United States Patent
Jhang et al.

(10) Patent No.: US 11,378,779 B2
(45) Date of Patent: Jul. 5, 2022

(54) OPTICAL IMAGING LENS

(71) Applicant: Genius Electronic Optical (Xiamen) Co., Ltd., Fujian (CN)

(72) Inventors: Jia-Sin Jhang, Taichung (TW); Feng Chen, Fujian (CN); Ming Yang, Fujian (CN)

(73) Assignee: Genius Electronic Optical (Xiamen) Co., Ltd., Fujian (CN)

( * ) Notice: Subject to any disclaimer, the term of this patent is extended or adjusted under 35 U.S.C. 154(b) by 406 days.

(21) Appl. No.: 16/718,202

(22) Filed: Dec. 18, 2019

(65) Prior Publication Data

US 2021/0141192 A1 May 13, 2021

(30) Foreign Application Priority Data

Nov. 13, 2019 (CN) .......................... 201911105614.5

(51) Int. Cl.
*G02B 9/62* (2006.01)
*G02B 13/18* (2006.01)
*G02B 5/00* (2006.01)
*G02B 3/02* (2006.01)
*G02B 3/04* (2006.01)
*G02B 27/00* (2006.01)

(52) U.S. Cl.
CPC .............. *G02B 9/62* (2013.01); *G02B 13/18* (2013.01); *G02B 3/02* (2013.01); *G02B 3/04* (2013.01); *G02B 5/005* (2013.01); *G02B 27/0025* (2013.01)

(58) Field of Classification Search
CPC .......... G02B 9/62; G02B 13/18; G02B 5/005; G02B 3/02; G02B 3/04; G02B 27/0025
USPC .......................... 359/713, 740, 756, 759, 760
See application file for complete search history.

(56) References Cited

U.S. PATENT DOCUMENTS

| | | | | |
|---|---|---|---|---|
| 11,119,295 | B2* | 9/2021 | Jhang ...................... | G02B 3/04 |
| 2014/0327808 | A1* | 11/2014 | Chen ................... | G02B 13/0045 359/756 |
| 2015/0062405 | A1* | 3/2015 | Chen ..................... | H04N 5/2254 359/757 |
| 2015/0062406 | A1* | 3/2015 | Chen ................... | G02B 13/0045 359/738 |
| 2015/0062407 | A1* | 3/2015 | Chen ................... | G02B 13/0045 359/738 |
| 2015/0070578 | A1* | 3/2015 | Chen ........................ | G02B 9/62 359/756 |
| 2015/0070579 | A1* | 3/2015 | Chen ................... | G02B 13/0045 359/756 |
| 2015/0070784 | A1* | 3/2015 | Chen ........................ | G02B 9/62 359/713 |

(Continued)

FOREIGN PATENT DOCUMENTS

CN 109270665 A * 1/2019

*Primary Examiner* — Evelyn A Lester
(74) *Attorney, Agent, or Firm* — Winston Hsu

(57) ABSTRACT

An optical imaging lens includes a first lens element to a sixth lens element. The third lens element has negative refracting power and a periphery region of the image-side surface of the third lens element is convex. An optical axis region of the image-side surface of the fourth lens element is convex, an optical axis region of the image-side surface of the fifth lens element is convex, and an optical axis region of the object-side surface of the sixth lens element is concave to satisfy $v2+v3+v4+v6 \leq 130.000$ and $(T1+T4+G45)/(G12+T2+G34) \geq 2.500$.

20 Claims, 43 Drawing Sheets

(56) References Cited

U.S. PATENT DOCUMENTS

| | | | |
|---|---|---|---|
| 2016/0119510 A1* | 4/2016 | Chen | G02B 7/021 |
| | | | 359/740 |
| 2016/0119519 A1* | 4/2016 | Chen | G02B 7/021 |
| | | | 359/759 |
| 2017/0235103 A1* | 8/2017 | Lai | G02B 27/0025 |
| | | | 359/713 |
| 2017/0329109 A1* | 11/2017 | Kubota | G02B 9/62 |
| 2018/0059372 A1* | 3/2018 | Cheng | G02B 13/0045 |
| 2018/0067283 A1* | 3/2018 | Jhang | G02B 5/005 |
| 2018/0172954 A1* | 6/2018 | Bone | G02B 13/0045 |
| 2018/0172955 A1* | 6/2018 | Bone | G02B 3/04 |
| 2019/0302414 A1* | 10/2019 | Jhang | G02B 9/62 |
| 2019/0302417 A1* | 10/2019 | Liao | G02B 13/0045 |
| 2019/0302418 A1* | 10/2019 | Liao | G02B 13/0045 |
| 2019/0302419 A1* | 10/2019 | Jhang | G02B 9/62 |
| 2021/0199923 A1* | 7/2021 | Jhang | G02B 9/62 |
| 2021/0199924 A1* | 7/2021 | Jhang | G02B 13/04 |
| 2021/0333513 A1* | 10/2021 | Hu | G02B 27/0025 |
| 2022/0011539 A1* | 1/2022 | Zhang | G02B 3/04 |
| 2022/0082792 A1* | 3/2022 | Chen | G02B 27/0025 |

\* cited by examiner

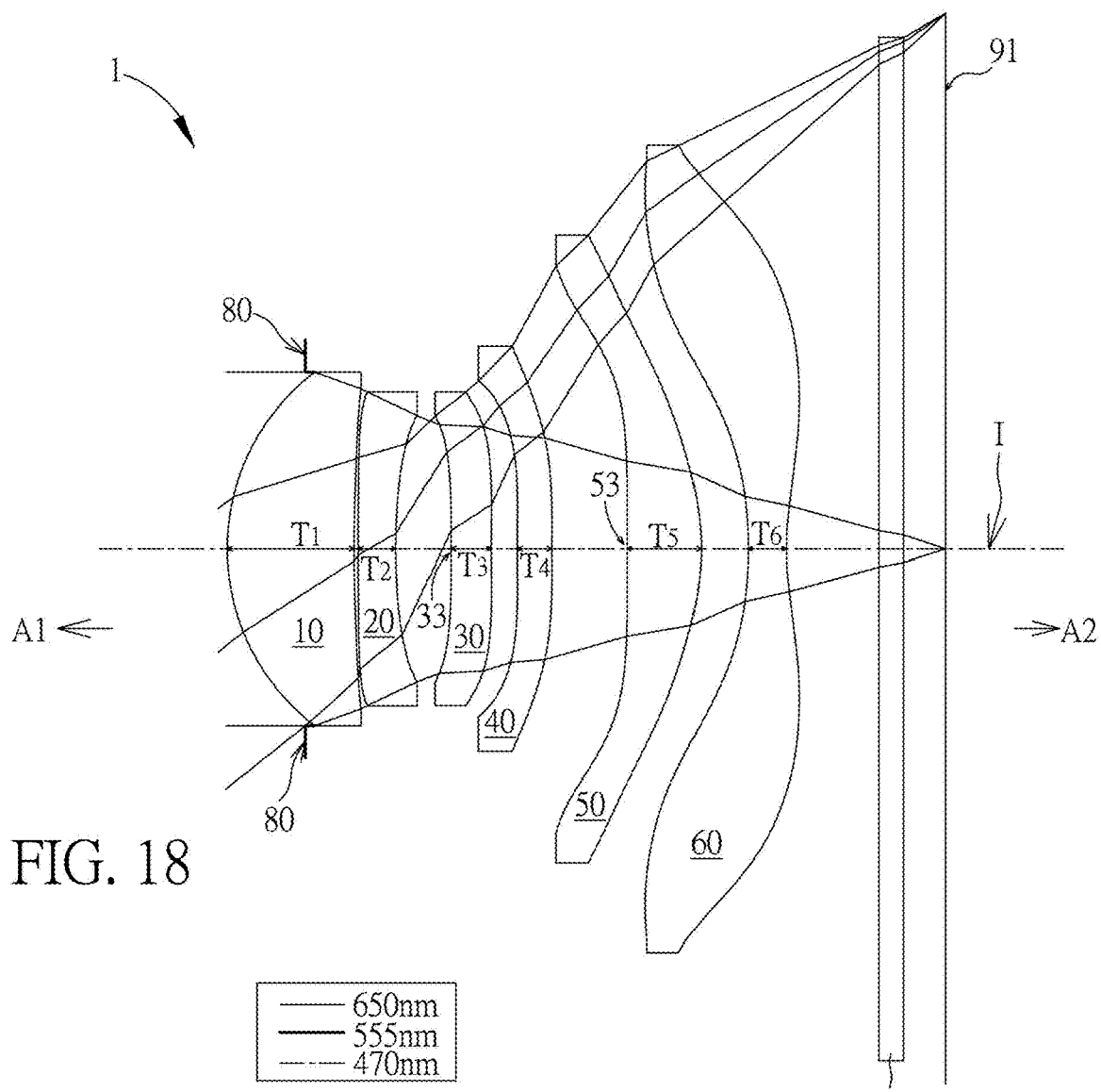
FIG. 18
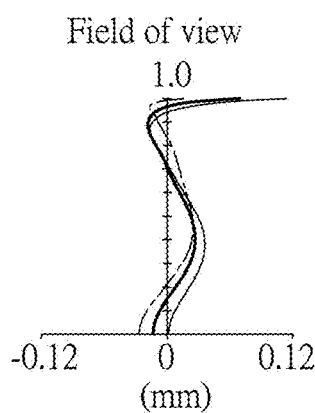
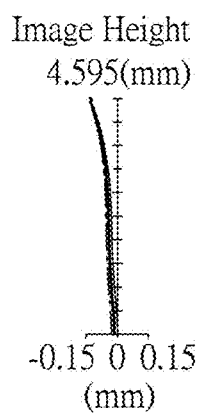
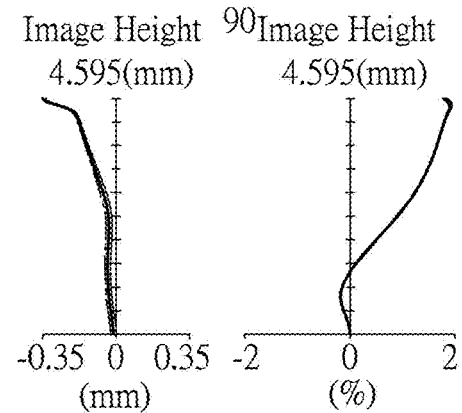
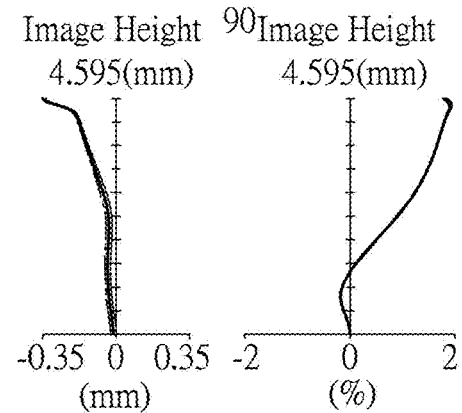
FIG. 19A   FIG. 19B   FIG. 19C   FIG. 19D

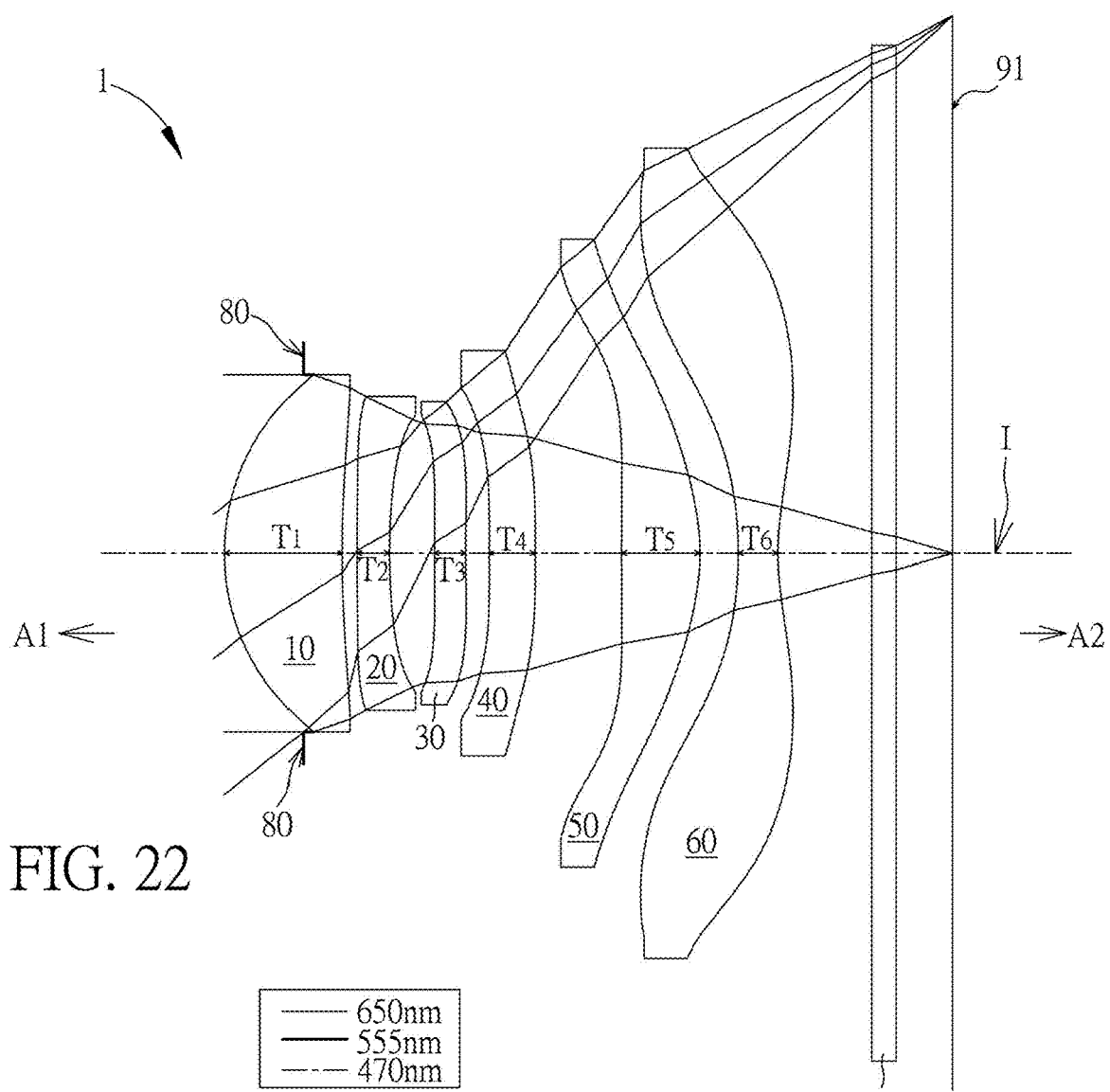
FIG. 22
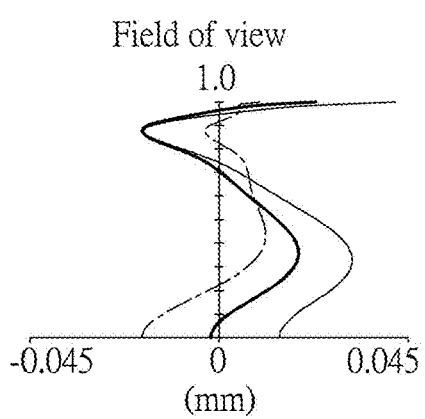
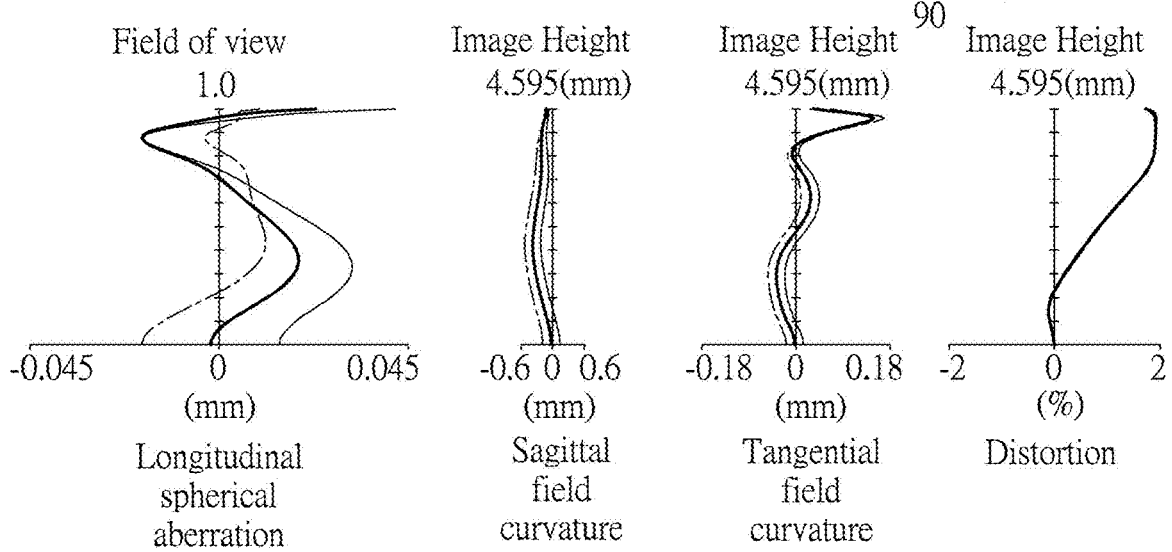
FIG. 23A   FIG. 23B   FIG. 23C   FIG. 23D

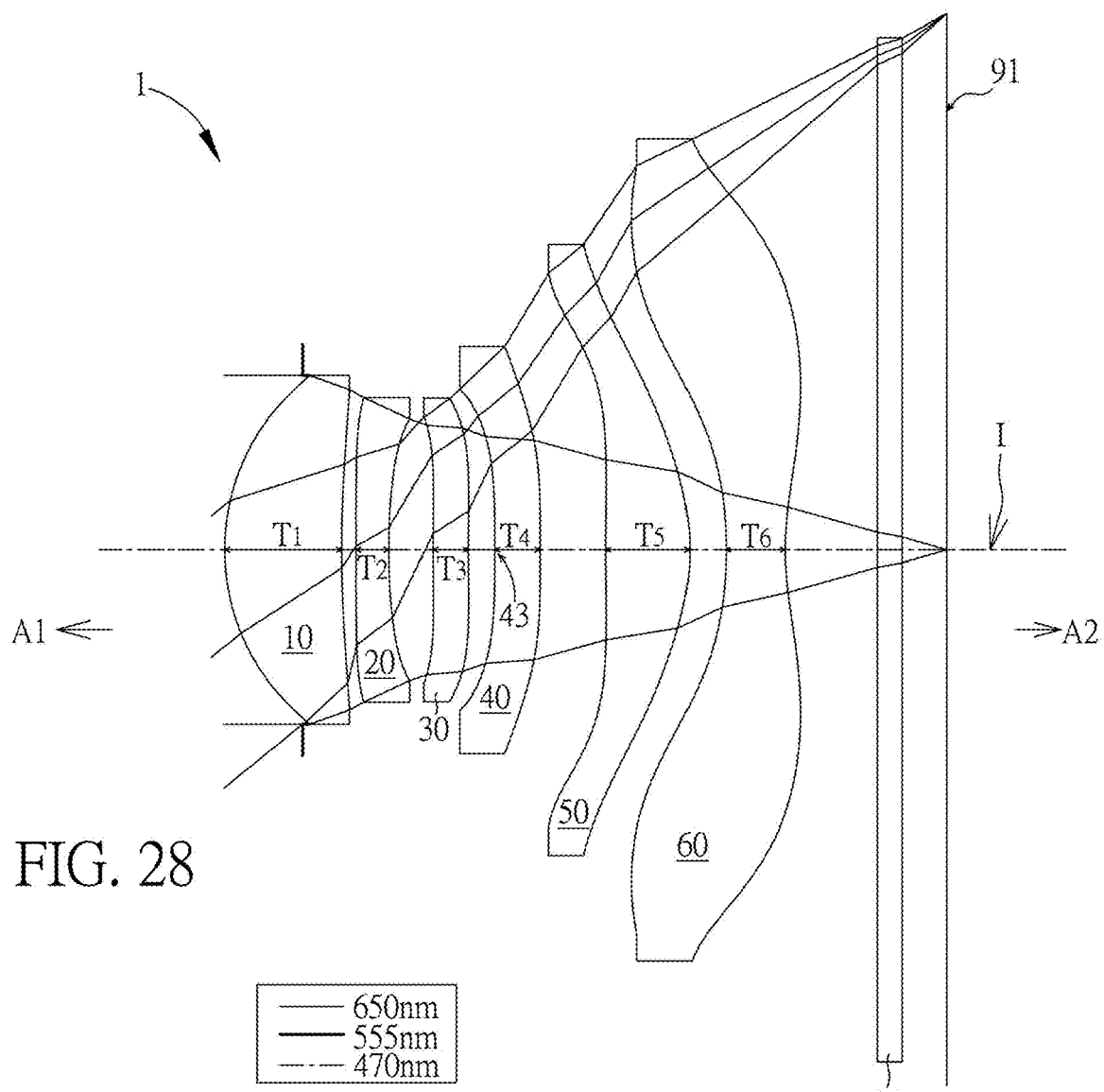
FIG. 28
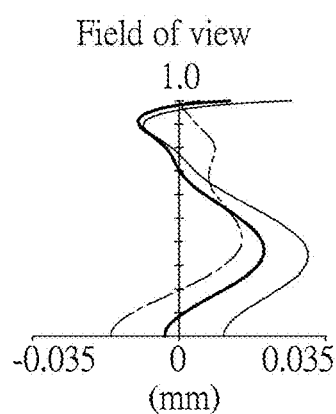
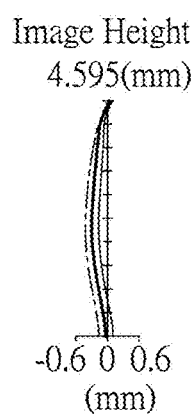
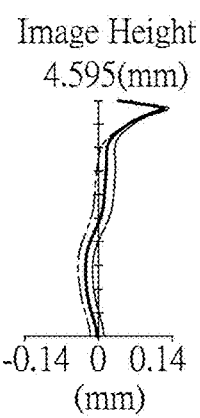
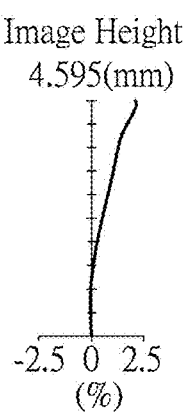
FIG. 29A    FIG. 29B    FIG. 29C    FIG. 29D

| First Embodiment | | | | | | |
|---|---|---|---|---|---|---|
| EFL=5.535mm, HFOV=39.082 Degrees, TTL=6.169mm, Fno=1.850, ImgH=4.595mm | | | | | | |
| No. | Radius (mm) | Aperture Stop Distance/ Lens Thickness/ Air Gap (mm) | material | Refractive Index | Abbe No. | Focal length (mm) |
| Object | INFINITY | INFINITY | | | | |
| 80 Ape. Stop | INFINITY | -0.671 | | | | |
| 11 First Lens | 1.887 | 0.970 | T1 | plastic | 1.545 | 55.987 | 4.174 |
| 12 | 8.938 | 0.124 | G12 | | | |
| 21 Second Lens | 42.690 | 0.307 | T2 | plastic | 1.671 | 19.243 | -9.533 |
| 22 | 5.594 | 0.370 | G23 | | | |
| 31 Third Lens | 25.278 | 0.301 | T3 | plastic | 1.661 | 20.373 | -73.992 |
| 32 | 16.638 | 0.301 | G34 | | | |
| 41 Fourth Lens | 30.403 | 0.268 | T4 | plastic | 1.661 | 20.373 | 45.548 |
| 42 | -55005.827 | 0.594 | G45 | | | |
| 51 Fifth Lens | 3305.224 | 0.764 | T5 | plastic | 1.545 | 55.987 | 3.435 |
| 52 | -1.877 | 0.294 | G56 | | | |
| 61 Sixth Lens | -3.638 | 0.471 | T6 | plastic | 1.545 | 55.987 | -2.570 |
| 62 | 2.390 | 0.795 | G6F | | | |
| 90 Filter | INFINITY | 0.210 | | 1.517 | 64.167 | |
| | INFINITY | 0.398 | | | | |
| 91 Image Plane | INFINITY | 0.000 | | | | |

FIG. 32

| No. | K | $a_2$ | $a_4$ | $a_6$ | $a_8$ | $a_{10}$ |
|---|---|---|---|---|---|---|
| 11 | 0.000000E+00 | 0.000000E+00 | -2.476393E-03 | 8.178248E-03 | -1.106647E-02 | 1.023949E-02 |
| 12 | 0.000000E+00 | 0.000000E+00 | -2.767525E-02 | 2.788560E-02 | -1.964119E-02 | 8.452962E-03 |
| 21 | 0.000000E+00 | 0.000000E+00 | -3.445926E-02 | 7.240310E-02 | -5.594066E-02 | 2.488771E-02 |
| 22 | 1.890915E+01 | 0.000000E+00 | -1.997632E-02 | 5.802558E-02 | -4.769668E-02 | 2.035488E-02 |
| 31 | 0.000000E+00 | 0.000000E+00 | -8.359805E-02 | 3.737607E-02 | -2.050258E-02 | -4.814165E-02 |
| 32 | 0.000000E+00 | 0.000000E+00 | -1.017316E-01 | 7.674544E-02 | -7.893938E-02 | 3.424596E-02 |
| 41 | 0.000000E+00 | 0.000000E+00 | -1.171272E-01 | 4.636209E-02 | -1.149714E-02 | -6.337511E-03 |
| 42 | 0.000000E+00 | 0.000000E+00 | -9.861481E-02 | 4.048532E-02 | -2.424623E-02 | 1.578874E-02 |
| 51 | 0.000000E+00 | 0.000000E+00 | -9.318498E-03 | -1.213859E-02 | 3.098852E-03 | -3.881624E-04 |
| 52 | -5.860273E+00 | 0.000000E+00 | 2.036753E-03 | -7.467855E-03 | 1.801445E-03 | -1.217943E-04 |
| 61 | 0.000000E+00 | 0.000000E+00 | -3.865587E-02 | 1.158665E-02 | -3.476609E-05 | -2.821065E-04 |
| 62 | -1.556101E+01 | 0.000000E+00 | -4.661888E-02 | 1.583330E-02 | -4.261482E-03 | 8.109093E-04 |

| No. | $a_{12}$ | $a_{14}$ | $a_{16}$ | $a_{18}$ | $a_{20}$ |
|---|---|---|---|---|---|
| 11 | -5.933170E-03 | 1.978877E-03 | -3.053507E-04 | | |
| 12 | -1.845656E-03 | 3.470107E-05 | 3.905679E-05 | | |
| 21 | -3.358022E-03 | -1.144582E-03 | 4.301579E-04 | | |
| 22 | 4.348200E-03 | -9.383356E-03 | 3.586592E-03 | | |
| 31 | 8.213810E-02 | -5.368530E-02 | 1.342735E-02 | | |
| 32 | 3.760808E-03 | -1.060245E-02 | 3.291144E-03 | | |
| 41 | 6.374547E-03 | -2.422082E-03 | 3.000293E-04 | | |
| 42 | -5.757118E-03 | 9.753269E-04 | -5.992472E-05 | | |
| 51 | 2.921350E-05 | 3.708086E-06 | 7.268958E-08 | -2.157486E-07 | 1.723974E-08 |
| 52 | 2.546786E-05 | -4.846825E-06 | -7.546564E-07 | 2.265579E-07 | -1.310203E-08 |
| 61 | 3.851716E-05 | -1.816979E-06 | -1.615169E-08 | 4.086508E-09 | -9.364500E-11 |
| 62 | -1.083566E-04 | 9.759580E-06 | -5.603535E-07 | 1.872646E-08 | -2.811660E-10 |

FIG. 33

| Second Embodiment |||||||
|---|---|---|---|---|---|---|
| EFL=5.401mm, HFOV=39.826 Degrees, TTL=6.151mm, Fno=1.850, ImgH=4.595mm |||||||
| No. | | Radius (mm) | Aperture Stop Distance/ Lens Thickness/ Air Gap (mm) | material | Refractive Index | Abbe No. | Focal length (mm) |
| | Object | INFINITY | INFINITY | | | | |
| 80 | Ape. Stop | INFINITY | -0.671 | | | | |
| 11 | First Lens | 1.937 | 0.938 | T1 | plastic | 1.545 | 55.987 | 4.269 |
| 12 | | 9.472 | 0.139 | G12 | | | | |
| 21 | Second Lens | 49.794 | 0.304 | T2 | plastic | 1.671 | 19.243 | -9.609 |
| 22 | | 5.744 | 0.375 | G23 | | | | |
| 31 | Third Lens | 31.428 | 0.301 | T3 | plastic | 1.671 | 19.276 | -66.926 |
| 32 | | 18.491 | 0.289 | G34 | | | | |
| 41 | Fourth Lens | 21.151 | 0.376 | T4 | plastic | 1.567 | 37.490 | 37.091 |
| 42 | | -39651.146 | 0.558 | G45 | | | | |
| 51 | Fifth Lens | 19.417 | 0.742 | T5 | plastic | 1.545 | 55.987 | 3.330 |
| 52 | | -1.980 | 0.341 | G56 | | | | |
| 61 | Sixth Lens | -3.615 | 0.419 | T6 | plastic | 1.545 | 55.987 | -2.490 |
| 62 | | 2.270 | 0.795 | G6F | | | | |
| 90 | Filter | INFINITY | 0.210 | | 1.517 | 64.167 | |
| | | INFINITY | 0.365 | | | | |
| 91 | Image Plane | INFINITY | 0.000 | | | | |

FIG. 34

| No. | K | $a_2$ | $a_4$ | $a_6$ | $a_8$ | $a_{10}$ |
|---|---|---|---|---|---|---|
| 11 | 0.000000E+00 | 0.000000E+00 | -2.020276E-03 | 8.166914E-03 | -1.082243E-02 | 1.027217E-02 |
| 12 | 0.000000E+00 | 0.000000E+00 | -2.622719E-02 | 2.899913E-02 | -1.981756E-02 | 8.257573E-03 |
| 21 | 0.000000E+00 | 0.000000E+00 | -3.552684E-02 | 7.221995E-02 | -5.611954E-02 | 2.468599E-02 |
| 22 | 1.893240E+01 | 0.000000E+00 | -2.398020E-02 | 5.575671E-02 | -4.723693E-02 | 2.032443E-02 |
| 31 | 0.000000E+00 | 0.000000E+00 | -9.098677E-02 | 3.486171E-02 | -1.909056E-02 | -4.903494E-02 |
| 32 | 0.000000E+00 | 0.000000E+00 | -1.062015E-01 | 7.788855E-02 | -7.794765E-02 | 3.457010E-02 |
| 41 | 0.000000E+00 | 0.000000E+00 | -9.998473E-02 | 5.056938E-02 | -1.064975E-02 | -5.975708E-03 |
| 42 | 0.000000E+00 | 0.000000E+00 | -9.022047E-02 | 4.171076E-02 | -2.384943E-02 | 1.591995E-02 |
| 51 | 0.000000E+00 | 0.000000E+00 | -1.254571E-02 | -1.216395E-02 | 3.133307E-03 | -3.859454E-04 |
| 52 | -7.340533E+00 | 0.000000E+00 | 3.085923E-03 | -7.624610E-03 | 1.782696E-03 | -1.252754E-04 |
| 61 | 0.000000E+00 | 0.000000E+00 | -3.883904E-02 | 1.159137E-02 | -3.443809E-05 | -2.820427E-04 |
| 62 | -1.485745E+01 | 0.000000E+00 | -4.554291E-02 | 1.582095E-02 | -4.262396E-03 | 8.108377E-04 |
| No. | $a_{12}$ | $a_{14}$ | $a_{16}$ | $a_{18}$ | $a_{20}$ | |
| 11 | -5.955618E-03 | 1.988265E-03 | -2.978696E-04 | | | |
| 12 | -1.874855E-03 | 5.741988E-05 | 4.453999E-05 | | | |
| 21 | -3.509775E-03 | -1.149775E-03 | 4.648754E-04 | | | |
| 22 | 3.988567E-03 | -9.780350E-03 | 3.454464E-03 | | | |
| 31 | 8.229148E-02 | -5.407963E-02 | 1.353587E-02 | | | |
| 32 | 3.978575E-03 | -1.061442E-02 | 3.280673E-03 | | | |
| 41 | 6.542959E-03 | -2.440875E-03 | 3.256754E-04 | | | |
| 42 | -5.735955E-03 | 9.723310E-04 | -6.306177E-05 | | | |
| 51 | 2.903406E-05 | 3.635541E-06 | 6.214388E-08 | -2.158715E-07 | 1.769128E-08 | |
| 52 | 2.545486E-05 | -4.833657E-06 | -7.474759E-07 | 2.262453E-07 | -1.301348E-08 | |
| 61 | 3.852090E-05 | -1.816653E-06 | -1.614019E-08 | 4.086352E-09 | -9.380900E-11 | |
| 62 | -1.083615E-04 | 9.759514E-06 | -5.603678E-07 | 1.872680E-08 | -2.810230E-10 | |

FIG. 35

| Third Embodiment | | | | | | |
|---|---|---|---|---|---|---|
| EFL=5.464mm, HFOV=39.365 Degrees, TTL=6.127mm, Fno=1.850, ImgH=4.595mm | | | | | | |
| No. | | Radius (mm) | Aperture Stop Distance/ Lens Thickness/ Air Gap (mm) | material | Refractive Index | Abbe No. | Focal length (mm) |
| | Object | INFINITY | INFINITY | | | | |
| 80 | Ape. Stop | INFINITY | -0.671 | | | | |
| 11 | First Lens | 1.884 | 0.994 | T1 | plastic | 1.545 | 55.987 | 4.170 |
| 12 | | 8.855 | 0.103 | G12 | | | |
| 21 | Second Lens | 47.205 | 0.346 | T2 | plastic | 1.671 | 19.243 | -9.409 |
| 22 | | 5.600 | 0.334 | G23 | | | |
| 31 | Third Lens | 16.584 | 0.318 | T3 | plastic | 1.661 | 20.373 | -95.396 |
| 32 | | 13.055 | 0.294 | G34 | | | |
| 41 | Fourth Lens | 28.058 | 0.309 | T4 | plastic | 1.661 | 20.373 | 41.296 |
| 42 | | -1513.426 | 0.631 | G45 | | | |
| 51 | Fifth Lens | -3386.038 | 0.695 | T5 | plastic | 1.545 | 55.987 | 3.515 |
| 52 | | -1.919 | 0.316 | G56 | | | |
| 61 | Sixth Lens | -3.637 | 0.439 | T6 | plastic | 1.545 | 55.987 | -2.560 |
| 62 | | 2.369 | 0.795 | G6F | | | |
| 90 | Filter | INFINITY | 0.210 | | 1.517 | 64.167 | |
| | | INFINITY | 0.343 | | | | |
| 91 | Image Plane | INFINITY | 0.000 | | | | |

FIG. 36

| No. | K | $a_2$ | $a_4$ | $a_6$ | $a_8$ | $a_{10}$ |
|---|---|---|---|---|---|---|
| 11 | 0.000000E+00 | 0.000000E+00 | -2.798644E-03 | 8.148666E-03 | -1.105663E-02 | 1.023908E-02 |
| 12 | 0.000000E+00 | 0.000000E+00 | -2.801408E-02 | 2.790032E-02 | -1.959458E-02 | 8.479894E-03 |
| 21 | 0.000000E+00 | 0.000000E+00 | -3.520356E-02 | 7.193884E-02 | -5.600203E-02 | 2.490176E-02 |
| 22 | 1.898292E+01 | 0.000000E+00 | -2.044496E-02 | 5.777369E-02 | -4.804330E-02 | 2.028073E-02 |
| 31 | 0.000000E+00 | 0.000000E+00 | -8.106113E-02 | 3.725502E-02 | -2.073539E-02 | -4.814473E-02 |
| 32 | 0.000000E+00 | 0.000000E+00 | -1.031854E-01 | 7.690263E-02 | -7.904532E-02 | 3.413631E-02 |
| 41 | 0.000000E+00 | 0.000000E+00 | -1.161156E-01 | 4.540853E-02 | -1.146191E-02 | -6.313179E-03 |
| 42 | 0.000000E+00 | 0.000000E+00 | -9.421433E-02 | 4.075030E-02 | -2.423980E-02 | 1.579531E-02 |
| 51 | 0.000000E+00 | 0.000000E+00 | -8.946724E-03 | -1.215621E-02 | 3.092260E-03 | -3.891012E-04 |
| 52 | -6.598842E+00 | 0.000000E+00 | 8.887781E-04 | -7.456958E-03 | 1.802506E-03 | -1.217706E-04 |
| 61 | 0.000000E+00 | 0.000000E+00 | -3.872423E-02 | 1.158383E-02 | -3.483835E-05 | -2.821055E-04 |
| 62 | -1.645880E+01 | 0.000000E+00 | -4.657540E-02 | 1.583389E-02 | -4.261443E-03 | 8.109119E-04 |
| No. | $a_{12}$ | $a_{14}$ | $a_{16}$ | $a_{18}$ | $a_{20}$ | |
| 11 | -5.933877E-03 | 1.978765E-03 | -3.054913E-04 | | | |
| 12 | -1.830222E-03 | 3.849363E-05 | 3.891748E-05 | | | |
| 21 | -3.348839E-03 | -1.142232E-03 | 4.297352E-04 | | | |
| 22 | 4.299659E-03 | -9.350668E-03 | 3.623882E-03 | | | |
| 31 | 8.227343E-02 | -5.367920E-02 | 1.332667E-02 | | | |
| 32 | 3.691617E-03 | -1.062570E-02 | 3.305711E-03 | | | |
| 41 | 6.405210E-03 | -2.414317E-03 | 2.966987E-04 | | | |
| 42 | -5.754161E-03 | 9.761614E-04 | -5.976634E-05 | | | |
| 51 | 2.911323E-05 | 3.700778E-06 | 7.307001E-08 | -2.152845E-07 | 1.737256E-08 | |
| 52 | 2.547011E-05 | -4.846057E-06 | -7.544808E-07 | 2.265900E-07 | -1.309677E-08 | |
| 61 | 3.851747E-05 | -1.816949E-06 | -1.614843E-08 | 4.086717E-09 | -9.363100E-11 | |
| 62 | -1.083564E-04 | 9.759589E-06 | -5.603531E-07 | 1.872645E-08 | -2.811690E-10 | |

FIG. 37

| | | Fourth Embodiment | | | | | |
|---|---|---|---|---|---|---|---|
| | | EFL=5.544mm, HFOV=38.927 Degrees, TTL=6.249mm, Fno=1.850, ImgH=4.595mm | | | | | |
| No. | | Radius (mm) | Aperture Stop Distance/ Lens Thickness/ Air Gap (mm) | | material | Refractive Index | Abbe No. | Focal length (mm) |
| | Object | INFINITY | INFINITY | | | | | |
| 80 | Ape. Stop | INFINITY | -0.671 | | | | | |
| 11 | First Lens | 1.907 | 0.981 | T1 | plastic | 1.545 | 55.987 | 4.154 |
| 12 | | 9.775 | 0.127 | G12 | | | | |
| 21 | Second Lens | 33.284 | 0.308 | T2 | plastic | 1.671 | 19.243 | -10.135 |
| 22 | | 5.671 | 0.401 | G23 | | | | |
| 31 | Third Lens | 24.561 | 0.400 | T3 | plastic | 1.661 | 20.373 | -56.396 |
| 32 | | 14.763 | 0.229 | G34 | | | | |
| 41 | Fourth Lens | 157.199 | 0.345 | T4 | plastic | 1.661 | 20.373 | 206.375 |
| 42 | | -1107.721 | 0.482 | G45 | | | | |
| 51 | Fifth Lens | -369.482 | 0.748 | T5 | plastic | 1.545 | 55.987 | 3.358 |
| 52 | | -1.827 | 0.313 | G56 | | | | |
| 61 | Sixth Lens | -3.642 | 0.505 | T6 | plastic | 1.545 | 55.987 | -2.606 |
| 62 | | 2.452 | 0.795 | G6F | | | | |
| 90 | Filter | INFINITY | 0.210 | | | 1.517 | 64.167 | |
| | | INFINITY | 0.406 | | | | | |
| 91 | Image Plane | INFINITY | 0.000 | | | | | |

FIG. 38

| No. | K | $a_2$ | $a_4$ | $a_6$ | $a_8$ | $a_{10}$ |
|---|---|---|---|---|---|---|
| 11 | 0.000000E+00 | 0.000000E+00 | -2.863103E-03 | 8.131300E-03 | -1.110182E-02 | 1.023010E-02 |
| 12 | 0.000000E+00 | 0.000000E+00 | -2.655682E-02 | 2.796675E-02 | -1.976458E-02 | 8.356482E-03 |
| 21 | 0.000000E+00 | 0.000000E+00 | -3.587957E-02 | 7.203771E-02 | -5.600680E-02 | 2.488252E-02 |
| 22 | 1.919785E+01 | 0.000000E+00 | -2.359784E-02 | 5.594690E-02 | -4.745585E-02 | 2.083400E-02 |
| 31 | 0.000000E+00 | 0.000000E+00 | -7.604565E-02 | 3.957190E-02 | -2.035460E-02 | -4.823313E-02 |
| 32 | 0.000000E+00 | 0.000000E+00 | -1.009996E-01 | 7.493960E-02 | -7.924943E-02 | 3.433953E-02 |
| 41 | 0.000000E+00 | 0.000000E+00 | -1.187462E-01 | 4.577141E-02 | -1.221595E-02 | -6.764019E-03 |
| 42 | 0.000000E+00 | 0.000000E+00 | -9.253019E-02 | 4.114149E-02 | -2.415586E-02 | 1.579854E-02 |
| 51 | 0.000000E+00 | 0.000000E+00 | -9.209957E-03 | -1.198863E-02 | 3.120456E-03 | -3.863649E-04 |
| 52 | -5.234100E+00 | 0.000000E+00 | 2.796646E-03 | -7.378047E-03 | 1.800327E-03 | -1.223012E-04 |
| 61 | 0.000000E+00 | 0.000000E+00 | -3.864351E-02 | 1.158760E-02 | -3.476724E-05 | -2.821115E-04 |
| 62 | -1.599078E+01 | 0.000000E+00 | -4.666740E-02 | 1.582941E-02 | -4.261612E-03 | 8.109066E-04 |
| No. | $a_{12}$ | $a_{14}$ | $a_{16}$ | $a_{18}$ | $a_{20}$ | |
| 11 | -5.934765E-03 | 1.977978E-03 | -3.069250E-04 | | | |
| 12 | -1.886405E-03 | 2.626425E-05 | 4.659865E-05 | | | |
| 21 | -3.360485E-03 | -1.146513E-03 | 4.241949E-04 | | | |
| 22 | 4.484942E-03 | -9.450617E-03 | 3.448408E-03 | | | |
| 31 | 8.222758E-02 | -5.364489E-02 | 1.341036E-02 | | | |
| 32 | 3.823136E-03 | -1.065367E-02 | 3.190261E-03 | | | |
| 41 | 6.281420E-03 | -2.421432E-03 | 3.248555E-04 | | | |
| 42 | -5.757393E-03 | 9.749207E-04 | -5.983083E-05 | | | |
| 51 | 2.930174E-05 | 3.703290E-06 | 7.080016E-08 | -2.159878E-07 | 1.721611E-08 | |
| 52 | 2.541540E-05 | -4.848125E-06 | -7.538736E-07 | 2.267872E-07 | -1.304874E-08 | |
| 61 | 3.851634E-05 | -1.817081E-06 | -1.616081E-08 | 4.085718E-09 | -9.369600E-11 | |
| 62 | -1.083568E-04 | 9.759539E-06 | -5.603594E-07 | 1.872575E-08 | -2.812380E-10 | |

FIG. 39

| \multicolumn{7}{|c|}{Fifth Embodiment} |
|---|---|---|---|---|---|---|
| \multicolumn{7}{|c|}{EFL=5.691mm, HFOV=38.297 Degrees, TTL=6.198mm, Fno=1.850, ImgH=4.595mm} |
| No. | | Radius (mm) | Aperture Stop Distance/ Lens Thickness/ Air Gap (mm) | material | Refractive Index | Abbe No. | Focal length (mm) |
| | Object | INFINITY | INFINITY | | | | |
| 80 | Ape. Stop | INFINITY | -0.671 | | | | |
| 11 | First Lens | 1.896 | 0.973 | T1 | plastic | 1.545 | 55.987 | 4.194 |
| 12 | | 9.006 | 0.156 | G12 | | | | |
| 21 | Second Lens | 52.622 | 0.310 | T2 | plastic | 1.671 | 19.243 | -9.287 |
| 22 | | 5.607 | 0.418 | G23 | | | | |
| 31 | Third Lens | 32.898 | 0.308 | T3 | plastic | 1.661 | 20.373 | -70.877 |
| 32 | | 19.327 | 0.292 | G34 | | | | |
| 41 | Fourth Lens | 26.920 | 0.304 | T4 | plastic | 1.661 | 20.373 | 21.904 |
| 42 | | -31.819 | 0.776 | G45 | | | | |
| 51 | Fifth Lens | -31.957 | 0.526 | T5 | plastic | 1.545 | 55.987 | 3.705 |
| 52 | | -1.914 | 0.220 | G56 | | | | |
| 61 | Sixth Lens | -3.633 | 0.532 | T6 | plastic | 1.545 | 55.987 | -2.520 |
| 62 | | 2.331 | 0.795 | G6F | | | | |
| 90 | Filter | INFINITY | 0.210 | | | 1.517 | 64.167 | |
| | | INFINITY | 0.378 | | | | | |
| 91 | Image Plane | INFINITY | 0.000 | | | | | |

FIG. 40

| No. | K | $a_2$ | $a_4$ | $a_6$ | $a_8$ | $a_{10}$ |
|---|---|---|---|---|---|---|
| 11 | 0.000000E+00 | 0.000000E+00 | -3.469373E-03 | 8.815649E-03 | -1.115468E-02 | 1.017766E-02 |
| 12 | 0.000000E+00 | 0.000000E+00 | -2.664137E-02 | 2.740110E-02 | -1.946805E-02 | 8.471512E-03 |
| 21 | 0.000000E+00 | 0.000000E+00 | -3.592321E-02 | 7.246429E-02 | -5.632490E-02 | 2.472124E-02 |
| 22 | 1.858508E+01 | 0.000000E+00 | -1.869171E-02 | 5.514875E-02 | -4.563501E-02 | 2.136482E-02 |
| 31 | 0.000000E+00 | 0.000000E+00 | -8.631674E-02 | 4.152448E-02 | -2.130184E-02 | -4.803565E-02 |
| 32 | 0.000000E+00 | 0.000000E+00 | -1.079320E-01 | 7.673273E-02 | -7.868263E-02 | 3.444198E-02 |
| 41 | 0.000000E+00 | 0.000000E+00 | -1.124344E-01 | 4.414769E-02 | -1.092349E-02 | -5.849536E-03 |
| 42 | 0.000000E+00 | 0.000000E+00 | -9.047792E-02 | 4.085660E-02 | -2.404989E-02 | 1.585927E-02 |
| 51 | 0.000000E+00 | 0.000000E+00 | -1.053837E-02 | -1.233886E-02 | 3.084772E-03 | -3.872079E-04 |
| 52 | -6.760953E+00 | 0.000000E+00 | -6.935858E-04 | -7.412324E-03 | 1.817351E-03 | -1.207399E-04 |
| 61 | 0.000000E+00 | 0.000000E+00 | -3.887973E-02 | 1.153597E-02 | -3.698126E-05 | -2.821559E-04 |
| 62 | -1.470248E+01 | 0.000000E+00 | -4.814292E-02 | 1.576092E-02 | -4.263067E-03 | 8.107997E-04 |

| No. | $a_{12}$ | $a_{14}$ | $a_{16}$ | $a_{18}$ | $a_{20}$ |
|---|---|---|---|---|---|
| 11 | -5.941223E-03 | 1.989868E-03 | -2.962406E-04 | | |
| 12 | -1.882708E-03 | 1.672698E-05 | 4.695751E-05 | | |
| 21 | -3.396394E-03 | -1.150732E-03 | 4.129028E-04 | | |
| 22 | 4.034871E-03 | -9.795848E-03 | 3.559206E-03 | | |
| 31 | 8.269749E-02 | -5.368610E-02 | 1.279852E-02 | | |
| 32 | 3.906692E-03 | -1.060424E-02 | 3.026495E-03 | | |
| 41 | 6.525911E-03 | -2.403919E-03 | 2.804821E-04 | | |
| 42 | -5.741634E-03 | 9.738090E-04 | -6.296035E-05 | | |
| 51 | 2.939135E-05 | 3.755208E-06 | 7.937473E-08 | -2.152484E-07 | 1.710287E-08 |
| 52 | 2.550458E-05 | -4.848976E-06 | -7.551467E-07 | 2.265519E-07 | -1.308234E-08 |
| 61 | 3.851916E-05 | -1.816661E-06 | -1.612670E-08 | 4.087695E-09 | -9.371300E-11 |
| 62 | -1.083659E-04 | 9.759028E-06 | -5.603764E-07 | 1.872602E-08 | -2.811280E-10 |

FIG. 41

| Sixth Embodiment |||||||
|---|---|---|---|---|---|---|
| EFL=5.513mm, HFOV=39.156 Degrees, TTL= 6.188mm, Fno=1.850, ImgH=4.595mm |||||||
| No. | | Radius (mm) | Aperture Stop Distance/ Lens Thickness/ Air Gap (mm) | material | Refractive Index | Abbe No. | Focal length (mm) |
| | Object | INFINITY | INFINITY | | | | |
| 80 | Ape. Stop | INFINITY | -0.671 | | | | |
| 11 | First Lens | 1.902 | 1.048 | T1 | plastic | 1.545 | 55.987 | 4.148 |
| 12 | | 9.525 | 0.094 | G12 | | | | |
| 21 | Second Lens | 32.554 | 0.230 | T2 | plastic | 1.671 | 19.243 | -10.086 |
| 22 | | 5.632 | 0.433 | G23 | | | | |
| 31 | Third Lens | 18.273 | 0.307 | T3 | plastic | 1.661 | 20.373 | -46.663 |
| 32 | | 11.437 | 0.222 | G34 | | | | |
| 41 | Fourth Lens | 44.793 | 0.348 | T4 | plastic | 1.661 | 20.373 | 65.286 |
| 42 | | -1569.670 | 0.554 | G45 | | | | |
| 51 | Fifth Lens | 107.293 | 0.765 | T5 | plastic | 1.545 | 55.987 | 3.400 |
| 52 | | -1.885 | 0.299 | G56 | | | | |
| 61 | Sixth Lens | -3.637 | 0.527 | T6 | plastic | 1.545 | 55.987 | -2.562 |
| 62 | | 2.391 | 0.795 | G6F | | | | |
| 90 | Filter | INFINITY | 0.210 | | | 1.517 | 64.167 | |
| | | INFINITY | 0.355 | | | | | |
| 91 | Image Plane | INFINITY | 0.000 | | | | | |

FIG. 42

| No. | K | $a_2$ | $a_4$ | $a_6$ | $a_8$ | $a_{10}$ |
|---|---|---|---|---|---|---|
| 11 | 0.000000E+00 | 0.000000E+00 | -1.951661E-03 | 8.288793E-03 | -1.108866E-02 | 1.022001E-02 |
| 12 | 0.000000E+00 | 0.000000E+00 | -2.721144E-02 | 2.824867E-02 | -1.958437E-02 | 8.449849E-03 |
| 21 | 0.000000E+00 | 0.000000E+00 | -3.279166E-02 | 7.275198E-02 | -5.581487E-02 | 2.493342E-02 |
| 22 | 1.916055E+01 | 0.000000E+00 | -1.786473E-02 | 5.756068E-02 | -4.769176E-02 | 2.052111E-02 |
| 31 | 0.000000E+00 | 0.000000E+00 | -7.715113E-02 | 3.728762E-02 | -2.056889E-02 | -4.789569E-02 |
| 32 | 0.000000E+00 | 0.000000E+00 | -1.037422E-01 | 7.651641E-02 | -7.916391E-02 | 3.408472E-02 |
| 41 | 0.000000E+00 | 0.000000E+00 | -1.172128E-01 | 4.619986E-02 | -1.175653E-02 | -6.522878E-03 |
| 42 | 0.000000E+00 | 0.000000E+00 | -9.359802E-02 | 4.086495E-02 | -2.414108E-02 | 1.581315E-02 |
| 51 | 0.000000E+00 | 0.000000E+00 | -9.743962E-03 | -1.215041E-02 | 3.105711E-03 | -3.866980E-04 |
| 52 | -5.681872E+00 | 0.000000E+00 | 2.486953E-03 | -7.422867E-03 | 1.795333E-03 | -1.229800E-04 |
| 61 | 0.000000E+00 | 0.000000E+00 | -3.872237E-02 | 1.159395E-02 | -3.431847E-05 | -2.820898E-04 |
| 62 | -1.488567E+01 | 0.000000E+00 | -4.642911E-02 | 1.582643E-02 | -4.262372E-03 | 8.108599E-04 |

| No. | $a_{12}$ | $a_{14}$ | $a_{16}$ | $a_{18}$ | $a_{20}$ |
|---|---|---|---|---|---|
| 11 | -5.935308E-03 | 1.983554E-03 | -2.995738E-04 | | |
| 12 | -1.849328E-03 | 3.153951E-05 | 3.902955E-05 | | |
| 21 | -3.330928E-03 | -1.133952E-03 | 4.353281E-04 | | |
| 22 | 4.431925E-03 | -9.344749E-03 | 3.628133E-03 | | |
| 31 | 8.252634E-02 | -5.354505E-02 | 1.335067E-02 | | |
| 32 | 3.674630E-03 | -1.062739E-02 | 3.308376E-03 | | |
| 41 | 6.334335E-03 | -2.419477E-03 | 2.957286E-04 | | |
| 42 | -5.753420E-03 | 9.754461E-04 | -6.046225E-05 | | |
| 51 | 2.940088E-05 | 3.726544E-06 | 7.343053E-08 | -2.158917E-07 | 1.717755E-08 |
| 52 | 2.533823E-05 | -4.856088E-06 | -7.544376E-07 | 2.268310E-07 | -1.302615E-08 |
| 61 | 3.851712E-05 | -1.817047E-06 | -1.615699E-08 | 4.086366E-09 | -9.360200E-11 |
| 62 | -1.083583E-04 | 9.759589E-06 | -5.603440E-07 | 1.872771E-08 | -2.810380E-10 |

FIG. 43

| \multicolumn{7}{c}{Seventh Embodiment} |
|---|---|---|---|---|---|---|
| \multicolumn{7}{c}{EFL=5.617mm, HFOV=38.588 Degrees, TTL=6.162mm, Fno=1.850, ImgH=4.595mm} |
| No. | | Radius (mm) | Aperture Stop Distance/ Lens Thickness/ Air Gap (mm) | material | Refractive Index | Abbe No. | Focal length (mm) |
|---|---|---|---|---|---|---|---|
| | Object | INFINITY | INFINITY | | | | |
| 80 | Ape. Stop | INFINITY | -0.671 | | | | |
| 11 | First Lens | 1.913 | 1.090 | T1 | plastic | 1.545 | 55.987 | 4.057 |
| 12 | | 11.173 | 0.035 | G12 | | | | |
| 21 | Second Lens | 32.345 | 0.322 | T2 | plastic | 1.671 | 19.243 | -9.992 |
| 22 | | 5.576 | 0.472 | G23 | | | | |
| 31 | Third Lens | -40.471 | 0.344 | T3 | plastic | 1.661 | 20.373 | -22.084 |
| 32 | | 23.245 | 0.224 | G34 | | | | |
| 41 | Fourth Lens | 19.977 | 0.298 | T4 | plastic | 1.661 | 20.373 | 24.719 |
| 42 | | -93.930 | 0.647 | G45 | | | | |
| 51 | Fifth Lens | -266.548 | 0.633 | T5 | plastic | 1.545 | 55.987 | 3.761 |
| 52 | | -2.041 | 0.402 | G56 | | | | |
| 61 | Sixth Lens | -3.634 | 0.327 | T6 | plastic | 1.545 | 55.987 | -2.633 |
| 62 | | 2.457 | 0.795 | G6F | | | | |
| 90 | Filter | INFINITY | 0.210 | | | 1.517 | 64.167 | |
| | | INFINITY | 0.363 | | | | | |
| 91 | Image Plane | INFINITY | 0.000 | | | | | |

FIG. 44

| No. | K | $a_2$ | $a_4$ | $a_6$ | $a_8$ | $a_{10}$ |
|---|---|---|---|---|---|---|
| 11 | 0.000000E+00 | 0.000000E+00 | -2.055402E-03 | 7.888722E-03 | -1.102295E-02 | 1.028865E-02 |
| 12 | 0.000000E+00 | 0.000000E+00 | -3.219525E-02 | 2.950662E-02 | -1.908129E-02 | 8.603250E-03 |
| 21 | 0.000000E+00 | 0.000000E+00 | -3.649743E-02 | 7.025980E-02 | -5.604958E-02 | 2.504404E-02 |
| 22 | 1.864724E+01 | 0.000000E+00 | -1.309763E-02 | 5.225810E-02 | -4.988486E-02 | 2.029515E-02 |
| 31 | 0.000000E+00 | 0.000000E+00 | -7.284412E-02 | 3.508762E-02 | -2.146833E-02 | -4.839680E-02 |
| 32 | 0.000000E+00 | 0.000000E+00 | -1.030840E-01 | 7.585141E-02 | -7.971955E-02 | 3.401059E-02 |
| 41 | 0.000000E+00 | 0.000000E+00 | -1.200163E-01 | 4.392537E-02 | -1.190813E-02 | -6.496527E-03 |
| 42 | 0.000000E+00 | 0.000000E+00 | -9.555553E-02 | 4.064997E-02 | -2.420736E-02 | 1.581627E-02 |
| 51 | 0.000000E+00 | 0.000000E+00 | -9.197297E-03 | -1.222453E-02 | 3.083753E-03 | -3.900503E-04 |
| 52 | -7.966673E+00 | 0.000000E+00 | 1.087625E-03 | -7.533729E-03 | 1.790266E-03 | -1.227036E-04 |
| 61 | 0.000000E+00 | 0.000000E+00 | -3.934902E-02 | 1.156441E-02 | -3.496192E-05 | -2.820840E-04 |
| 62 | -1.979081E+01 | 0.000000E+00 | -4.749927E-02 | 1.583483E-02 | -4.261766E-03 | 8.109131E-04 |
| No. | $a_{12}$ | $a_{14}$ | $a_{16}$ | $a_{18}$ | $a_{20}$ | |
| 11 | -5.913751E-03 | 1.982876E-03 | -3.067983E-04 | | | |
| 12 | -1.799902E-03 | 4.901294E-05 | 3.550337E-05 | | | |
| 21 | -3.267355E-03 | -1.106487E-03 | 4.512557E-04 | | | |
| 22 | 4.643920E-03 | -9.266292E-03 | 3.477955E-03 | | | |
| 31 | 8.219552E-02 | -5.371907E-02 | 1.328356E-02 | | | |
| 32 | 3.716041E-03 | -1.065038E-02 | 3.229196E-03 | | | |
| 41 | 6.341610E-03 | -2.413238E-03 | 3.101993E-04 | | | |
| 42 | -5.747657E-03 | 9.775681E-04 | -5.981270E-05 | | | |
| 51 | 2.899031E-05 | 3.694162E-06 | 7.399452E-08 | -2.148193E-07 | 1.750296E-08 | |
| 52 | 2.540528E-05 | -4.848241E-06 | -7.543303E-07 | 2.266784E-07 | -1.308148E-08 | |
| 61 | 3.851924E-05 | -1.816826E-06 | -1.613682E-08 | 4.088092E-09 | -9.346600E-11 | |
| 62 | -1.083541E-04 | 9.759841E-06 | -5.603326E-07 | 1.872801E-08 | -2.810580E-10 | |

FIG. 45

| Eighth Embodiment ||||||||
|---|---|---|---|---|---|---|---|
| EFL=5.497mm, HFOV=39.187 Degrees, TTL=6.229mm, Fno=1.850, ImgH=4.595mm ||||||||
| No. | | Radius (mm) | Aperture Stop Distance/ Lens Thickness/ Air Gap (mm) | | material | Refractive Index | Abbe No. | Focal length (mm) |
| | Object | INFINITY | INFINITY | | | | | |
| 80 | Ape. Stop | INFINITY | -0.671 | | | | | |
| 11 | First Lens | 1.914 | 1.008 | T1 | plastic | 1.545 | 55.987 | 4.201 |
| 12 | | 9.394 | 0.127 | G12 | | | | |
| 21 | Second Lens | 27.919 | 0.278 | T2 | plastic | 1.671 | 19.243 | -10.346 |
| 22 | | 5.581 | 0.403 | G23 | | | | |
| 31 | Third Lens | 18.225 | 0.327 | T3 | plastic | 1.661 | 20.373 | -53.268 |
| 32 | | 11.960 | 0.198 | G34 | | | | |
| 41 | Fourth Lens | 69.552 | 0.376 | T4 | plastic | 1.661 | 20.373 | 71.252 |
| 42 | | -149.829 | 0.528 | G45 | | | | |
| 51 | Fifth Lens | 188.472 | 0.776 | T5 | plastic | 1.545 | 55.987 | 3.244 |
| 52 | | -1.787 | 0.255 | G56 | | | | |
| 61 | Sixth Lens | -3.633 | 0.549 | T6 | plastic | 1.545 | 55.987 | -2.497 |
| 62 | | 2.300 | 0.795 | G6F | | | | |
| 90 | Filter | INFINITY | 0.210 | | | 1.517 | 64.167 | |
| | | INFINITY | 0.398 | | | | | |
| 91 | Image Plane | INFINITY | 0.000 | | | | | |

FIG. 46

| No. | K | $a_2$ | $a_4$ | $a_6$ | $a_8$ | $a_{10}$ |
|---|---|---|---|---|---|---|
| 11 | 0.000000E+00 | 0.000000E+00 | -2.484375E-03 | 8.131730E-03 | -1.111347E-02 | 1.025063E-02 |
| 12 | 0.000000E+00 | 0.000000E+00 | -2.663135E-02 | 2.788753E-02 | -1.982864E-02 | 8.347809E-03 |
| 21 | 0.000000E+00 | 0.000000E+00 | -3.634719E-02 | 7.203185E-02 | -5.570037E-02 | 2.488506E-02 |
| 22 | 1.873148E+01 | 0.000000E+00 | -2.378175E-02 | 5.655305E-02 | -4.706426E-02 | 2.069662E-02 |
| 31 | 0.000000E+00 | 0.000000E+00 | -7.214527E-02 | 3.669844E-02 | -2.093685E-02 | -4.787975E-02 |
| 32 | 0.000000E+00 | 0.000000E+00 | -1.021760E-01 | 7.503973E-02 | -7.919744E-02 | 3.424229E-02 |
| 41 | 0.000000E+00 | 0.000000E+00 | -1.197988E-01 | 4.727762E-02 | -1.218817E-02 | -6.309188E-03 |
| 42 | 0.000000E+00 | 0.000000E+00 | -9.001604E-02 | 4.103295E-02 | -2.404732E-02 | 1.583547E-02 |
| 51 | 0.000000E+00 | 0.000000E+00 | -1.025185E-02 | -1.215323E-02 | 3.114717E-03 | -3.845825E-04 |
| 52 | -5.170854E+00 | 0.000000E+00 | 1.354019E-03 | -7.251773E-03 | 1.781961E-03 | -1.242599E-04 |
| 61 | 0.000000E+00 | 0.000000E+00 | -3.901716E-02 | 1.162009E-02 | -3.385904E-05 | -2.821431E-04 |
| 62 | -1.392258E+01 | 0.000000E+00 | -4.619604E-02 | 1.577394E-02 | -4.258479E-03 | 8.109093E-04 |
| No. | $a_{12}$ | $a_{14}$ | $a_{16}$ | $a_{18}$ | $a_{20}$ | |
| 11 | -5.936202E-03 | 1.978385E-03 | -3.019939E-04 | | | |
| 12 | -1.878650E-03 | 4.712494E-05 | 3.716370E-05 | | | |
| 21 | -3.413207E-03 | -1.158631E-03 | 4.302203E-04 | | | |
| 22 | 4.603483E-03 | -9.369985E-03 | 3.297124E-03 | | | |
| 31 | 8.268847E-02 | -5.352070E-02 | 1.325887E-02 | | | |
| 32 | 3.807847E-03 | -1.059272E-02 | 3.229126E-03 | | | |
| 41 | 6.508927E-03 | -2.387598E-03 | 2.776932E-04 | | | |
| 42 | -5.744808E-03 | 9.759293E-04 | -6.191287E-05 | | | |
| 51 | 2.935664E-05 | 3.666514E-06 | 7.154957E-08 | -2.149285E-07 | 1.734333E-08 | |
| 52 | 2.535081E-05 | -4.843686E-06 | -7.527897E-07 | 2.270264E-07 | -1.298743E-08 | |
| 61 | 3.851264E-05 | -1.817217E-06 | -1.615579E-08 | 4.087104E-09 | -9.364000E-11 | |
| 62 | -1.083697E-04 | 9.758593E-06 | -5.604435E-07 | 1.872812E-08 | -2.804950E-10 | |

FIG. 47

| Ninth Embodiment |||||||
|---|---|---|---|---|---|---|
| EFL=5.652mm, HFOV=38.611 Degrees, TTL=6.214mm, Fno=1.850, ImgH=4.595mm |||||||
| No. | | Radius (mm) | Aperture Stop Distance/ Lens Thickness/ Air Gap (mm) | | material | Refractive Index | Abbe No. | Focal length (mm) |
| | Object | INFINITY | INFINITY | | | | | |
| 80 | Ape. Stop | INFINITY | -0.671 | | | | | |
| 11 | First Lens | 1.903 | 1.001 | T1 | plastic | 1.545 | 55.987 | 4.234 |
| 12 | | 8.745 | 0.130 | G12 | | | | |
| 21 | Second Lens | 42.602 | 0.277 | T2 | plastic | 1.671 | 19.243 | -9.561 |
| 22 | | 5.608 | 0.385 | G23 | | | | |
| 31 | Third Lens | 24.036 | 0.266 | T3 | plastic | 1.661 | 20.373 | -45.389 |
| 32 | | 13.340 | 0.201 | G34 | | | | |
| 41 | Fourth Lens | 51.197 | 0.395 | T4 | plastic | 1.661 | 20.373 | 33.254 |
| 42 | | -39.026 | 0.732 | G45 | | | | |
| 51 | Fifth Lens | 38.023 | 0.671 | T5 | plastic | 1.545 | 55.987 | 3.394 |
| 52 | | -1.937 | 0.326 | G56 | | | | |
| 61 | Sixth Lens | -3.643 | 0.342 | T6 | plastic | 1.545 | 55.987 | -2.544 |
| 62 | | 2.322 | 0.795 | G6F | | | | |
| 90 | Filter | INFINITY | 0.210 | | | 1.517 | 64.167 | |
| | | INFINITY | 0.483 | | | | | |
| 91 | Image Plane | INFINITY | 0.000 | | | | | |

FIG. 48

| No. | K | $a_2$ | $a_4$ | $a_6$ | $a_8$ | $a_{10}$ |
|---|---|---|---|---|---|---|
| 11 | 0.000000E+00 | 0.000000E+00 | -2.778235E-03 | 8.182989E-03 | -1.104151E-02 | 1.024483E-02 |
| 12 | 0.000000E+00 | 0.000000E+00 | -2.876637E-02 | 2.748463E-02 | -1.973584E-02 | 8.415434E-03 |
| 21 | 0.000000E+00 | 0.000000E+00 | -3.462838E-02 | 7.192346E-02 | -5.614510E-02 | 2.486502E-02 |
| 22 | 1.862812E+01 | 0.000000E+00 | -1.766643E-02 | 5.851667E-02 | -4.771074E-02 | 2.033110E-02 |
| 31 | 0.000000E+00 | 0.000000E+00 | -7.532188E-02 | 3.612315E-02 | -2.144039E-02 | -4.832393E-02 |
| 32 | 0.000000E+00 | 0.000000E+00 | -1.072982E-01 | 7.675120E-02 | -7.895735E-02 | 3.395931E-02 |
| 41 | 0.000000E+00 | 0.000000E+00 | -1.149863E-01 | 4.800002E-02 | -1.053967E-02 | -5.975502E-03 |
| 42 | 0.000000E+00 | 0.000000E+00 | -8.674902E-02 | 4.180344E-02 | -2.399063E-02 | 1.584698E-02 |
| 51 | 0.000000E+00 | 0.000000E+00 | -8.866597E-03 | -1.222744E-02 | 3.081917E-03 | -3.899970E-04 |
| 52 | -7.443793E+00 | 0.000000E+00 | 5.938392E-04 | -7.392766E-03 | 1.808321E-03 | -1.215943E-04 |
| 61 | 0.000000E+00 | 0.000000E+00 | -3.892740E-02 | 1.158100E-02 | -3.501869E-05 | -2.821194E-04 |
| 62 | -1.717165E+01 | 0.000000E+00 | -4.694755E-02 | 1.583784E-02 | -4.260697E-03 | 8.109685E-04 |

| No. | $a_{12}$ | $a_{14}$ | $a_{16}$ | $a_{18}$ | $a_{20}$ |
|---|---|---|---|---|---|
| 11 | -5.932887E-03 | 1.978369E-03 | -3.068242E-04 | | |
| 12 | -1.862514E-03 | 2.800337E-05 | 4.061311E-05 | | |
| 21 | -3.340924E-03 | -1.136808E-03 | 4.236566E-04 | | |
| 22 | 4.311007E-03 | -9.389215E-03 | 3.616083E-03 | | |
| 31 | 8.229214E-02 | -5.372091E-02 | 1.319436E-02 | | |
| 32 | 3.545583E-03 | -1.067686E-02 | 3.316670E-03 | | |
| 41 | 6.506486E-03 | -2.403076E-03 | 2.781385E-04 | | |
| 42 | -5.749198E-03 | 9.729598E-04 | -6.286232E-05 | | |
| 51 | 2.906564E-05 | 3.701917E-06 | 7.379696E-08 | -2.151963E-07 | 1.736196E-08 |
| 52 | 2.546392E-05 | -4.847835E-06 | -7.546732E-07 | 2.265806E-07 | -1.309680E-08 |
| 61 | 3.851669E-05 | -1.816956E-06 | -1.614256E-08 | 4.087808E-09 | -9.348500E-11 |
| 62 | -1.083535E-04 | 9.759709E-06 | -5.603492E-07 | 1.872648E-08 | -2.811810E-10 |

FIG. 49

| Tenth Embodiment ||||||||
|---|---|---|---|---|---|---|---|
| EFL=5.491mm, HFOV=39.193 Degrees, TTL=6.163mm, Fno=1.850, ImgH=4.595mm ||||||||
| No. | | Radius (mm) | Aperture Stop Distance/ Lens Thickness/ Air Gap (mm) | | material | Refractive Index | Abbe No. | Focal length (mm) |
| | Object | INFINITY | INFINITY | | | | | |
| 80 | Ape. Stop | INFINITY | -0.671 | | | | | |
| 11 | First Lens | 1.880 | 0.942 | T1 | plastic | 1.545 | 55.987 | 4.141 |
| 12 | | 9.147 | 0.129 | G12 | | | | |
| 21 | Second Lens | 41.355 | 0.362 | T2 | plastic | 1.671 | 19.243 | -9.630 |
| 22 | | 5.615 | 0.354 | G23 | | | | |
| 31 | Third Lens | 23.176 | 0.324 | T3 | plastic | 1.661 | 20.373 | -47.584 |
| 32 | | 13.321 | 0.223 | G34 | | | | |
| 41 | Fourth Lens | 30.734 | 0.329 | T4 | plastic | 1.661 | 20.373 | 44.423 |
| 42 | | -825.644 | 0.631 | G45 | | | | |
| 51 | Fifth Lens | 77.083 | 0.715 | T5 | plastic | 1.545 | 55.987 | 3.422 |
| 52 | | -1.909 | 0.301 | G56 | | | | |
| 61 | Sixth Lens | -3.640 | 0.478 | T6 | plastic | 1.545 | 55.987 | -2.558 |
| 62 | | 2.373 | 0.795 | G6F | | | | |
| 90 | Filter | INFINITY | 0.210 | | | 1.517 | 64.167 | |
| | | INFINITY | 0.370 | | | | | |
| 91 | Image Plane | INFINITY | 0.000 | | | | | |

FIG. 50

| No. | K | $a_2$ | $a_4$ | $a_6$ | $a_8$ | $a_{10}$ |
|---|---|---|---|---|---|---|
| 11 | 0.000000E+00 | 0.000000E+00 | -2.768625E-03 | 7.889281E-03 | -1.108277E-02 | 1.023874E-02 |
| 12 | 0.000000E+00 | 0.000000E+00 | -2.781233E-02 | 2.800672E-02 | -1.958994E-02 | 8.465062E-03 |
| 21 | 0.000000E+00 | 0.000000E+00 | -3.552736E-02 | 7.197676E-02 | -5.590156E-02 | 2.494081E-02 |
| 22 | 1.892617E+01 | 0.000000E+00 | -2.075139E-02 | 5.790314E-02 | -4.792786E-02 | 2.030448E-02 |
| 31 | 0.000000E+00 | 0.000000E+00 | -7.813307E-02 | 3.730445E-02 | -2.090307E-02 | -4.832157E-02 |
| 32 | 0.000000E+00 | 0.000000E+00 | -1.045439E-01 | 7.640956E-02 | -7.929109E-02 | 3.404643E-02 |
| 41 | 0.000000E+00 | 0.000000E+00 | -1.179143E-01 | 4.530264E-02 | -1.155316E-02 | -6.381398E-03 |
| 42 | 0.000000E+00 | 0.000000E+00 | -9.250242E-02 | 4.106068E-02 | -2.419386E-02 | 1.579509E-02 |
| 51 | 0.000000E+00 | 0.000000E+00 | -8.686327E-03 | -1.215531E-02 | 3.091871E-03 | -3.890777E-04 |
| 52 | -6.355448E+00 | 0.000000E+00 | 1.246747E-03 | -7.408710E-03 | 1.806098E-03 | -1.215249E-04 |
| 61 | 0.000000E+00 | 0.000000E+00 | -3.864743E-02 | 1.158666E-02 | -3.478320E-05 | -2.821095E-04 |
| 62 | -1.555537E+01 | 0.000000E+00 | -4.671577E-02 | 1.583179E-02 | -4.261393E-03 | 8.109167E-04 |
| No. | $a_{12}$ | $a_{14}$ | $a_{16}$ | $a_{18}$ | $a_{20}$ | |
| 11 | -5.932555E-03 | 1.976831E-03 | -3.073716E-04 | | | |
| 12 | -1.844512E-03 | 3.293551E-05 | 3.684276E-05 | | | |
| 21 | -3.350093E-03 | -1.159420E-03 | 4.137161E-04 | | | |
| 22 | 4.348851E-03 | -9.337378E-03 | 3.647860E-03 | | | |
| 31 | 8.227463E-02 | -5.358301E-02 | 1.347372E-02 | | | |
| 32 | 3.692346E-03 | -1.059957E-02 | 3.337737E-03 | | | |
| 41 | 6.356523E-03 | -2.420005E-03 | 3.078606E-04 | | | |
| 42 | -5.757681E-03 | 9.748291E-04 | -6.011246E-05 | | | |
| 51 | 2.912372E-05 | 3.702319E-06 | 7.321786E-08 | -2.152719E-07 | 1.737328E-08 | |
| 52 | 2.548935E-05 | -4.844377E-06 | -7.543299E-07 | 2.266015E-07 | -1.309640E-08 | |
| 61 | 3.851683E-05 | -1.817007E-06 | -1.615257E-08 | 4.086442E-09 | -9.364700E-11 | |
| 62 | -1.083563E-04 | 9.759592E-06 | -5.603531E-07 | 1.872645E-08 | -2.811680E-10 | |

FIG. 51

| Eleventh Embodiment ||||||||
|---|---|---|---|---|---|---|---|
| EFL=5.587mm, HFOV=38.801 Degrees, TTL=6.232mm, Fno=1.850, ImgH=4.595mm ||||||||
| No. | | Radius (mm) | Aperture Stop Distance/ Lens Thickness/ Air Gap (mm) | | material | Refractive Index | Abbe No. | Focal length (mm) |
| | Object | INFINITY | INFINITY | | | | | |
| 80 | Ape. Stop | INFINITY | -0.671 | | | | | |
| 11 | First Lens | 1.888 | 1.000 | T1 | plastic | 1.545 | 55.987 | 4.150 |
| 12 | | 9.174 | 0.121 | G12 | | | | |
| 21 | Second Lens | 42.801 | 0.279 | T2 | plastic | 1.671 | 19.243 | -9.560 |
| 22 | | 5.611 | 0.369 | G23 | | | | |
| 31 | Third Lens | 20.806 | 0.327 | T3 | plastic | 1.661 | 20.373 | -44.998 |
| 32 | | 12.212 | 0.217 | G34 | | | | |
| 41 | Fourth Lens | 34.992 | 0.418 | T4 | plastic | 1.661 | 20.373 | 45.328 |
| 42 | | -221.577 | 0.639 | G45 | | | | |
| 51 | Fifth Lens | 96.112 | 0.693 | T5 | plastic | 1.545 | 55.987 | 3.411 |
| 52 | | -1.895 | 0.313 | G56 | | | | |
| 61 | Sixth Lens | -3.642 | 0.448 | T6 | plastic | 1.545 | 55.987 | -2.553 |
| 62 | | 2.359 | 0.795 | G6F | | | | |
| 90 | Filter | INFINITY | 0.210 | | | 1.517 | 64.167 | |
| | | INFINITY | 0.403 | | | | | |
| 91 | Image Plane | INFINITY | 0.000 | | | | | |

FIG. 52

| No. | K | $a_2$ | $a_4$ | $a_6$ | $a_8$ | $a_{10}$ |
|---|---|---|---|---|---|---|
| 11 | 0.000000E+00 | 0.000000E+00 | -2.278583E-03 | 8.033568E-03 | -1.104533E-02 | 1.025660E-02 |
| 12 | 0.000000E+00 | 0.000000E+00 | -2.792117E-02 | 2.778592E-02 | -1.959116E-02 | 8.471959E-03 |
| 21 | 0.000000E+00 | 0.000000E+00 | -3.489099E-02 | 7.226502E-02 | -5.577029E-02 | 2.500036E-02 |
| 22 | 1.903254E+01 | 0.000000E+00 | -2.148551E-02 | 5.787161E-02 | -4.758833E-02 | 2.027872E-02 |
| 31 | 0.000000E+00 | 0.000000E+00 | -7.662311E-02 | 3.708302E-02 | -2.099625E-02 | -4.858153E-02 |
| 32 | 0.000000E+00 | 0.000000E+00 | -1.065836E-01 | 7.645611E-02 | -7.926887E-02 | 3.405416E-02 |
| 41 | 0.000000E+00 | 0.000000E+00 | -1.184652E-01 | 4.613882E-02 | -1.134486E-02 | -6.330759E-03 |
| 42 | 0.000000E+00 | 0.000000E+00 | -8.854628E-02 | 4.103154E-02 | -2.420399E-02 | 1.579255E-02 |
| 51 | 0.000000E+00 | 0.000000E+00 | -9.079776E-03 | -1.215611E-02 | 3.093803E-03 | -3.887782E-04 |
| 52 | -6.530654E+00 | 0.000000E+00 | 1.374408E-03 | -7.410328E-03 | 1.805332E-03 | -1.213883E-04 |
| 61 | 0.000000E+00 | 0.000000E+00 | -3.861734E-02 | 1.158606E-02 | -3.493219E-05 | -2.821141E-04 |
| 62 | -1.635288E+01 | 0.000000E+00 | -4.666336E-02 | 1.583515E-02 | -4.261255E-03 | 8.109231E-04 |
| No. | $a_{12}$ | $a_{14}$ | $a_{16}$ | $a_{18}$ | $a_{20}$ | |
| 11 | -5.928451E-03 | 1.979624E-03 | -3.056665E-04 | | | |
| 12 | -1.834487E-03 | 3.062718E-05 | 3.435692E-05 | | | |
| 21 | -3.325591E-03 | -1.146395E-03 | 4.208267E-04 | | | |
| 22 | 4.313571E-03 | -9.357708E-03 | 3.662700E-03 | | | |
| 31 | 8.218996E-02 | -5.356676E-02 | 1.352832E-02 | | | |
| 32 | 3.703324E-03 | -1.056523E-02 | 3.359282E-03 | | | |
| 41 | 6.401075E-03 | -2.422371E-03 | 2.971885E-04 | | | |
| 42 | -5.757265E-03 | 9.754082E-04 | -5.990196E-05 | | | |
| 51 | 2.916415E-05 | 3.707665E-06 | 7.361697E-08 | -2.152025E-07 | 1.741890E-08 | |
| 52 | 2.550272E-05 | -4.842870E-06 | -7.542272E-07 | 2.266080E-07 | -1.309649E-08 | |
| 61 | 3.851655E-05 | -1.816998E-06 | -1.614996E-08 | 4.086824E-09 | -9.360200E-11 | |
| 62 | -1.083558E-04 | 9.759627E-06 | -5.603508E-07 | 1.872662E-08 | -2.811570E-10 | |

FIG. 53

| Twelfth Embodiment | | | | | | |
|---|---|---|---|---|---|---|
| EFL=5.551mm, HFOV=39.006 Degrees, TTL=6.208mm, Fno=1.850, ImgH=4.595mm | | | | | | |
| No. | | Radius (mm) | Aperture Stop Distance/ Lens Thickness/ Air Gap (mm) | material | Refractive Index | Abbe No. | Focal length (mm) |
| | Object | INFINITY | INFINITY | | | | |
| 80 | Ape. Stop | INFINITY | -0.671 | | | | |
| 11 | First Lens | 1.893 | 1.007 | T1 | plastic | 1.545 | 55.987 | 4.160 |
| 12 | | 9.202 | 0.123 | G12 | | | |
| 21 | Second Lens | 38.057 | 0.283 | T2 | plastic | 1.671 | 19.243 | -9.745 |
| 22 | | 5.610 | 0.377 | G23 | | | |
| 31 | Third Lens | 17.201 | 0.303 | T3 | plastic | 1.661 | 20.373 | -117.520 |
| 32 | | 14.007 | 0.228 | G34 | | | |
| 41 | Fourth Lens | -341.943 | 0.391 | T4 | plastic | 1.661 | 20.373 | -512.564 |
| 42 | | -45099240819.443 | 0.565 | G45 | | | |
| 51 | Fifth Lens | 46.953 | 0.722 | T5 | plastic | 1.545 | 55.987 | 3.342 |
| 52 | | -1.889 | 0.311 | G56 | | | |
| 61 | Sixth Lens | -3.640 | 0.506 | T6 | plastic | 1.545 | 55.987 | -2.577 |
| 62 | | 2.408 | 0.795 | G6F | | | |
| 90 | Filter | INFINITY | 0.210 | | 1.517 | 64.167 | |
| | | INFINITY | 0.387 | | | | |
| 91 | Image Plane | INFINITY | 0.000 | | | | |

FIG. 54

| No. | K | $a_2$ | $a_4$ | $a_6$ | $a_8$ | $a_{10}$ |
|---|---|---|---|---|---|---|
| 11 | 0.000000E+00 | 0.000000E+00 | -2.641781E-03 | 8.163006E-03 | -1.107369E-02 | 1.022289E-02 |
| 12 | 0.000000E+00 | 0.000000E+00 | -2.728493E-02 | 2.776130E-02 | -1.977476E-02 | 8.388147E-03 |
| 21 | 0.000000E+00 | 0.000000E+00 | -3.458389E-02 | 7.245421E-02 | -5.590632E-02 | 2.490254E-02 |
| 22 | 1.907422E+01 | 0.000000E+00 | -2.107961E-02 | 5.798371E-02 | -4.753017E-02 | 2.067141E-02 |
| 31 | 0.000000E+00 | 0.000000E+00 | -7.656943E-02 | 3.800010E-02 | -2.076275E-02 | -4.823306E-02 |
| 32 | 0.000000E+00 | 0.000000E+00 | -1.038999E-01 | 7.661078E-02 | -7.923412E-02 | 3.401662E-02 |
| 41 | 0.000000E+00 | 0.000000E+00 | -1.182043E-01 | 4.562884E-02 | -1.138662E-02 | -6.257636E-03 |
| 42 | 0.000000E+00 | 0.000000E+00 | -9.317759E-02 | 4.114120E-02 | -2.416065E-02 | 1.580375E-02 |
| 51 | 0.000000E+00 | 0.000000E+00 | -9.115357E-03 | -1.214694E-02 | 3.093231E-03 | -3.891729E-04 |
| 52 | -5.990290E+00 | 0.000000E+00 | 2.333565E-03 | -7.457528E-03 | 1.800102E-03 | -1.218642E-04 |
| 61 | 0.000000E+00 | 0.000000E+00 | -3.864697E-02 | 1.158857E-02 | -3.470508E-05 | -2.821071E-04 |
| 62 | -1.566699E+01 | 0.000000E+00 | -4.664827E-02 | 1.582738E-02 | -4.261616E-03 | 8.109111E-04 |
| No. | $a_{12}$ | $a_{14}$ | $a_{16}$ | $a_{18}$ | $a_{20}$ | |
| 11 | -5.939162E-03 | 1.977863E-03 | -3.056761E-04 | | | |
| 12 | -1.867145E-03 | 3.228222E-05 | 4.345090E-05 | | | |
| 21 | -3.350145E-03 | -1.144841E-03 | 4.317444E-04 | | | |
| 22 | 4.441005E-03 | -9.393308E-03 | 3.563162E-03 | | | |
| 31 | 8.226895E-02 | -5.363760E-02 | 1.340327E-02 | | | |
| 32 | 3.651417E-03 | -1.063815E-02 | 3.312998E-03 | | | |
| 41 | 6.400916E-03 | -2.441591E-03 | 2.606719E-04 | | | |
| 42 | -5.754370E-03 | 9.756820E-04 | -6.009826E-05 | | | |
| 51 | 2.908383E-05 | 3.696550E-06 | 7.306563E-08 | -2.150502E-07 | 1.747708E-08 | |
| 52 | 2.547639E-05 | -4.843437E-06 | -7.539129E-07 | 2.266965E-07 | -1.307866E-08 | |
| 61 | 3.851681E-05 | -1.817019E-06 | -1.615388E-08 | 4.086329E-09 | -9.365500E-11 | |
| 62 | -1.083563E-04 | 9.759603E-06 | -5.603519E-07 | 1.872657E-08 | -2.811570E-10 | |

FIG. 55

| | | Thirteenth Embodiment | | | | | |
|---|---|---|---|---|---|---|---|
| | | EFL=5.516mm, HFOV=39.029 Degrees, TTL=6.207mm, Fno=1.850, ImgH=4.595mm | | | | | |
| No. | | Radius (mm) | Aperture Stop Distance/ Lens Thickness/ Air Gap (mm) | | material | Refractive Index | Abbe No. | Focal length (mm) |
| | Object | INFINITY | INFINITY | | | | | |
| 80 | Ape. Stop | INFINITY | -0.671 | | | | | |
| 11 | First Lens | 1.881 | 1.003 | T1 | plastic | 1.545 | 55.987 | 4.130 |
| 12 | | 9.182 | 0.119 | G12 | | | | |
| 21 | Second Lens | 42.985 | 0.282 | T2 | plastic | 1.671 | 19.243 | -9.556 |
| 22 | | 5.612 | 0.376 | G23 | | | | |
| 31 | Third Lens | 26.745 | 0.348 | T3 | plastic | 1.661 | 20.373 | -53.364 |
| 32 | | 15.192 | 0.224 | G34 | | | | |
| 41 | Fourth Lens | 27.932 | 0.355 | T4 | plastic | 1.661 | 20.373 | 41.575 |
| 42 | | -3932.162 | 0.664 | G45 | | | | |
| 51 | Fifth Lens | 139.167 | 0.745 | T5 | plastic | 1.545 | 55.987 | 3.479 |
| 52 | | -1.923 | 0.312 | G56 | | | | |
| 61 | Sixth Lens | -3.640 | 0.498 | T6 | plastic | 1.545 | 55.987 | -2.463 |
| 62 | | 2.237 | 0.795 | G6F | | | | |
| 90 | Filter | INFINITY | 0.210 | | | 1.517 | 64.167 | |
| | | INFINITY | 0.277 | | | | | |
| 91 | Image Plane | INFINITY | 0.000 | | | | | |

FIG. 56

| No. | K | $a_2$ | $a_4$ | $a_6$ | $a_8$ | $a_{10}$ |
|---|---|---|---|---|---|---|
| 11 | 0.000000E+00 | 0.000000E+00 | -2.295042E-03 | 7.986815E-03 | -1.104529E-02 | 1.025816E-02 |
| 12 | 0.000000E+00 | 0.000000E+00 | -2.802830E-02 | 2.800704E-02 | -1.957977E-02 | 8.472680E-03 |
| 21 | 0.000000E+00 | 0.000000E+00 | -3.491785E-02 | 7.232544E-02 | -5.572229E-02 | 2.502089E-02 |
| 22 | 1.903338E+01 | 0.000000E+00 | -2.141915E-02 | 5.823863E-02 | -4.788057E-02 | 2.028880E-02 |
| 31 | 0.000000E+00 | 0.000000E+00 | -7.759197E-02 | 3.670388E-02 | -2.113577E-02 | -4.842789E-02 |
| 32 | 0.000000E+00 | 0.000000E+00 | -1.037076E-01 | 7.654617E-02 | -7.949396E-02 | 3.401920E-02 |
| 41 | 0.000000E+00 | 0.000000E+00 | -1.185642E-01 | 4.522476E-02 | -1.139270E-02 | -6.266232E-03 |
| 42 | 0.000000E+00 | 0.000000E+00 | -9.179430E-02 | 4.102398E-02 | -2.422302E-02 | 1.577583E-02 |
| 51 | 0.000000E+00 | 0.000000E+00 | -8.805625E-03 | -1.215906E-02 | 3.092329E-03 | -3.889610E-04 |
| 52 | -6.889103E+00 | 0.000000E+00 | 1.183274E-03 | -7.421572E-03 | 1.804568E-03 | -1.215608E-04 |
| 61 | 0.000000E+00 | 0.000000E+00 | -3.861423E-02 | 1.158725E-02 | -3.479453E-05 | -2.821099E-04 |
| 62 | -1.510308E+01 | 0.000000E+00 | -4.671038E-02 | 1.583366E-02 | -4.261304E-03 | 8.109210E-04 |
| No. | $a_{12}$ | $a_{14}$ | $a_{16}$ | $a_{18}$ | $a_{20}$ | |
| 11 | -5.927362E-03 | 1.980677E-03 | -3.050883E-04 | | | |
| 12 | -1.837056E-03 | 3.467178E-05 | 3.974075E-05 | | | |
| 21 | -3.311580E-03 | -1.136221E-03 | 4.297103E-04 | | | |
| 22 | 4.349756E-03 | -9.336101E-03 | 3.718461E-03 | | | |
| 31 | 8.221219E-02 | -5.367395E-02 | 1.344598E-02 | | | |
| 32 | 3.604871E-03 | -1.060983E-02 | 3.401698E-03 | | | |
| 41 | 6.355250E-03 | -2.437220E-03 | 3.048296E-04 | | | |
| 42 | -5.764261E-03 | 9.730253E-04 | -6.071599E-05 | | | |
| 51 | 2.912257E-05 | 3.698125E-06 | 7.309435E-08 | -2.154508E-07 | 1.721500E-08 | |
| 52 | 2.548757E-05 | -4.844340E-06 | -7.542906E-07 | 2.266113E-07 | -1.309381E-08 | |
| 61 | 3.851694E-05 | -1.816987E-06 | -1.615010E-08 | 4.086959E-09 | -9.365500E-11 | |
| 62 | -1.083559E-04 | 9.759621E-06 | -5.603500E-07 | 1.872669E-08 | -2.811510E-10 | |

FIG. 57

| Embodiment | 1st | 2nd | 3rd | 4th | 5th | 6th | 7th | 8th | 9th | 10th | 11th | 12th | 13th |
|---|---|---|---|---|---|---|---|---|---|---|---|---|---|
| T1 | 0.970 | 0.938 | 0.994 | 0.981 | 0.973 | 1.048 | 1.090 | 1.008 | 1.001 | 0.942 | 1.000 | 1.007 | 1.003 |
| G12 | 0.124 | 0.139 | 0.103 | 0.127 | 0.156 | 0.094 | 0.035 | 0.127 | 0.130 | 0.129 | 0.121 | 0.123 | 0.119 |
| T2 | 0.307 | 0.304 | 0.346 | 0.308 | 0.310 | 0.230 | 0.322 | 0.278 | 0.277 | 0.362 | 0.279 | 0.283 | 0.282 |
| G23 | 0.370 | 0.375 | 0.334 | 0.401 | 0.418 | 0.433 | 0.472 | 0.403 | 0.385 | 0.354 | 0.369 | 0.377 | 0.376 |
| T3 | 0.301 | 0.301 | 0.318 | 0.400 | 0.308 | 0.307 | 0.344 | 0.327 | 0.266 | 0.324 | 0.327 | 0.303 | 0.348 |
| G34 | 0.301 | 0.289 | 0.294 | 0.229 | 0.292 | 0.222 | 0.224 | 0.198 | 0.201 | 0.223 | 0.217 | 0.228 | 0.224 |
| T4 | 0.268 | 0.376 | 0.309 | 0.345 | 0.304 | 0.348 | 0.298 | 0.376 | 0.395 | 0.329 | 0.418 | 0.391 | 0.355 |
| G45 | 0.594 | 0.558 | 0.631 | 0.482 | 0.776 | 0.554 | 0.647 | 0.528 | 0.732 | 0.631 | 0.639 | 0.565 | 0.664 |
| T5 | 0.764 | 0.742 | 0.695 | 0.748 | 0.526 | 0.765 | 0.633 | 0.776 | 0.671 | 0.715 | 0.693 | 0.722 | 0.745 |
| G56 | 0.294 | 0.341 | 0.316 | 0.313 | 0.220 | 0.299 | 0.402 | 0.255 | 0.326 | 0.301 | 0.313 | 0.311 | 0.312 |
| T6 | 0.471 | 0.419 | 0.439 | 0.505 | 0.532 | 0.527 | 0.327 | 0.549 | 0.342 | 0.478 | 0.448 | 0.506 | 0.498 |
| G6F | 0.795 | 0.795 | 0.795 | 0.795 | 0.795 | 0.795 | 0.795 | 0.795 | 0.795 | 0.795 | 0.795 | 0.795 | 0.795 |
| TF | 0.210 | 0.210 | 0.210 | 0.210 | 0.210 | 0.210 | 0.210 | 0.210 | 0.210 | 0.210 | 0.210 | 0.210 | 0.210 |
| GFP | 0.398 | 0.365 | 0.343 | 0.406 | 0.378 | 0.355 | 0.363 | 0.398 | 0.483 | 0.370 | 0.403 | 0.387 | 0.277 |
| BFL | 1.403 | 1.370 | 1.348 | 1.411 | 1.383 | 1.360 | 1.368 | 1.403 | 1.488 | 1.375 | 1.408 | 1.392 | 1.282 |
| EFL | 5.535 | 5.401 | 5.464 | 5.544 | 5.691 | 5.513 | 5.617 | 5.497 | 5.652 | 5.491 | 5.587 | 5.551 | 5.516 |
| TTL | 6.169 | 6.151 | 6.127 | 6.249 | 6.198 | 6.188 | 6.162 | 6.229 | 6.214 | 6.163 | 6.232 | 6.208 | 6.207 |
| TL | 4.766 | 4.781 | 4.779 | 4.839 | 4.815 | 4.828 | 4.794 | 4.826 | 4.726 | 4.788 | 4.824 | 4.816 | 4.925 |
| ALT | 3.081 | 3.081 | 3.102 | 3.287 | 2.953 | 3.225 | 3.014 | 3.314 | 2.952 | 3.150 | 3.164 | 3.211 | 3.230 |
| AAG | 1.684 | 1.700 | 1.678 | 1.552 | 1.863 | 1.603 | 1.780 | 1.512 | 1.775 | 1.638 | 1.660 | 1.605 | 1.696 |

| Embodiment | 1st | 2nd | 3rd | 4th | 5th | 6th | 7th | 8th | 9th | 10th | 11th | 12th | 13th |
|---|---|---|---|---|---|---|---|---|---|---|---|---|---|
| (T1+T4+G45)/(G12+T2+G34) | 2.500 | 2.560 | 2.600 | 2.726 | 2.708 | 3.570 | 3.501 | 3.167 | 3.499 | 2.663 | 3.329 | 3.096 | 3.234 |
| υ2+υ3+υ4+υ6 | 115.976 | 131.995 | 115.976 | 115.976 | 115.976 | 115.976 | 115.976 | 115.976 | 115.976 | 115.976 | 115.976 | 115.976 | 115.976 |
| (G45+T5)/G34 | 4.514 | 4.500 | 4.511 | 5.380 | 4.460 | 5.931 | 5.720 | 6.575 | 6.967 | 6.028 | 6.125 | 5.645 | 6.288 |
| ALT/(G12+T2+G23) | 3.842 | 3.771 | 3.958 | 3.933 | 3.340 | 4.262 | 3.633 | 4.101 | 3.728 | 3.727 | 4.110 | 4.100 | 4.154 |
| AAG/(T5+G56) | 1.591 | 1.570 | 1.659 | 1.462 | 2.498 | 1.506 | 1.720 | 1.466 | 1.780 | 1.612 | 1.651 | 1.554 | 1.605 |
| (T6+BFL)/(T2+G34) | 3.080 | 3.019 | 2.791 | 3.571 | 3.182 | 4.170 | 3.103 | 4.098 | 3.825 | 3.163 | 3.738 | 3.717 | 3.520 |
| (T2+G23+T3)/G45 | 1.648 | 1.757 | 1.584 | 2.300 | 1.334 | 1.751 | 1.761 | 1.910 | 1.267 | 1.649 | 1.525 | 1.702 | 1.514 |
| TL/BFL | 3.397 | 3.491 | 3.546 | 3.430 | 3.483 | 3.550 | 3.505 | 3.440 | 3.177 | 3.483 | 3.427 | 3.459 | 3.842 |
| EFL/(G12+T4+G56) | 8.064 | 6.313 | 7.508 | 7.061 | 8.371 | 7.443 | 7.649 | 7.248 | 6.645 | 7.235 | 6.555 | 6.724 | 7.017 |
| (G45+ALT)/(T3+G34) | 6.102 | 6.165 | 6.095 | 6.000 | 6.213 | 7.135 | 6.444 | 7.309 | 7.875 | 6.914 | 6.990 | 7.114 | 6.811 |
| (T1+G23+T6)/(G12+G45) | 2.520 | 2.487 | 2.408 | 3.100 | 2.062 | 3.100 | 2.770 | 2.990 | 2.003 | 2.336 | 2.389 | 2.744 | 2.396 |
| TTL/(G45+BFL) | 3.089 | 3.191 | 3.097 | 3.302 | 2.871 | 3.233 | 3.058 | 3.226 | 2.799 | 3.073 | 3.045 | 3.171 | 3.190 |
| (T1+T2+T3)/T4 | 5.895 | 4.100 | 5.373 | 4.896 | 5.241 | 4.561 | 5.900 | 4.291 | 3.909 | 4.952 | 3.840 | 4.073 | 4.599 |
| (G45+T5+G56)/(G12+T2) | 3.829 | 3.710 | 3.654 | 3.549 | 3.265 | 5.000 | 4.707 | 3.846 | 4.251 | 3.355 | 4.110 | 3.937 | 4.290 |
| EFL/(G34+G45+G56) | 4.653 | 4.550 | 4.404 | 5.414 | 4.417 | 5.123 | 4.414 | 5.602 | 4.487 | 4.752 | 4.777 | 5.025 | 4.597 |
| (T4+G45)/T6 | 1.831 | 2.228 | 2.138 | 1.636 | 2.028 | 1.710 | 2.889 | 1.647 | 3.300 | 2.009 | 2.361 | 1.890 | 2.046 |
| AAG/(G23+T5) | 1.484 | 1.522 | 1.630 | 1.351 | 1.974 | 1.338 | 1.610 | 1.282 | 1.680 | 1.532 | 1.563 | 1.461 | 1.512 |
| (T3+T4+T5)/T6 | 2.832 | 3.388 | 3.010 | 2.952 | 2.136 | 2.692 | 3.900 | 2.695 | 3.900 | 2.862 | 3.211 | 2.797 | 2.907 |
| (T1+G12)/G56 | 3.716 | 3.161 | 3.470 | 3.536 | 5.135 | 3.812 | 2.800 | 4.451 | 3.472 | 3.553 | 3.582 | 3.630 | 3.599 |
| T1/T2 | 3.154 | 3.089 | 2.869 | 3.186 | 3.141 | 4.553 | 3.381 | 3.626 | 3.615 | 2.601 | 3.585 | 3.561 | 3.561 |
| (G45+T6)/T4 | 3.978 | 2.596 | 3.467 | 2.863 | 4.312 | 3.112 | 3.272 | 2.864 | 2.719 | 3.371 | 2.600 | 2.741 | 3.274 |

OPTICAL IMAGING LENS

BACKGROUND OF THE INVENTION

1. Field of the Invention

The present invention generally relates to an optical imaging lens. Specifically speaking, the present invention is directed to an optical imaging lens for use in a portable electronic device such as a mobile phone, a camera, a tablet personal computer, or a personal digital assistant (PDA) for taking pictures or for recording videos.

2. Description of the Prior Art

In recent years, an optical imaging lens improves along with its wider and wider applications. In addition to being lighter, thinner, shorter and smaller, the improvement of the imaging quality, such as curvature aberration or chromatic aberration, is getting more and more important. However, to meet the demands, it is disadvantageous to reduce the thickness of a mobile phone or of a camera if the distance from the object-side surface of the first lens element to the image plane of an optical imaging lens becomes greater.

Accordingly, it is always a target of the design in the art to design a lighter, thinner, shorter and smaller optical imaging lens with good imaging quality. Further, it is also a trend to design in the future if clear and sharp images are possible to capture when the optical imaging lens is used in nights.

SUMMARY OF THE INVENTION

In the light of the above, various embodiments of the present invention propose an optical imaging lens of six lens elements which has reduced system length, ensured imaging quality, better captured images in nights, good optical performance and is technically possible. The optical imaging lens of six lens elements of the present invention from an object side to an image side in order along an optical axis has a first lens element, a second lens element, a third lens element, a fourth lens element, a fifth lens element and a sixth lens element. Each first lens element, second lens element, third lens element, fourth lens element, fifth lens element and sixth lens element respectively has an object-side surface which faces toward the object side and allows imaging rays to pass through as well as an image-side surface which faces toward the image side and allows the imaging rays to pass through.

In order to facilitate clearness of the parameters represented by the present invention and the drawings, it is defined in this specification and the drawings: T1 is a thickness of the first lens element along the optical axis; T2 is a thickness of the second lens element along the optical axis; T3 is a thickness of the third lens element along the optical axis; T4 is a thickness of the fourth lens element along the optical axis; T5 is a thickness of the fifth lens element along the optical axis; and T6 is a thickness of the sixth lens element along the optical axis. G12 is an air gap between the first lens element and the second lens element along the optical axis; G23 is an air gap between the second lens element and the third lens element along the optical axis; G34 is an air gap between the third lens element and the fourth lens element along the optical axis; G45 is an air gap between the fourth lens element and the fifth lens element along the optical axis; G56 is an air gap between the fifth lens element and the sixth lens element along the optical axis. ALT is a sum of thicknesses of all the six lens elements along the optical axis. AAG is a sum of five air gaps from the first lens element to the sixth lens element along the optical axis. In addition, TTL is a distance from the object-side surface of the first lens element to an image plane along the optical axis, and that is the system length of the optical imaging lens; EFL is an effective focal length of the optical imaging lens; TL is a distance from the object-side surface of the first lens element to the image-side surface of the sixth lens element along the optical axis. BFL is a distance from the image-side surface of the sixth lens element to the image plane along the optical axis. An Abbe number of the second lens element is ν2, an Abbe number of the third lens element is ν3, and an Abbe number of the fourth lens element is ν4 and an Abbe number of the sixth lens element is ν6.

In one embodiment, the third lens element has negative refracting power and a periphery region of the image-side surface of the third lens element is convex, an optical axis region of the image-side surface of the fourth lens element is convex, an optical axis region of the image-side surface of the fifth lens element is convex, and an optical axis region of the object-side surface of the sixth lens element is concave. Only the above-mentioned six lens elements of the optical imaging lens have refracting power to satisfy the relationship: ν2+ν3+ν4+ν6≤130.000 and (T1+T4+G45)/(G12+T2+G34)≥2.500.

In the optical imaging lens of the present invention, the embodiments may also selectively satisfy the following optical conditions:
1. (G45+T5)/G34≥4.400;
2. ALT/(G12+T2+G23)≥3.000;
3. AAG/(T5+G56)≤2.500;
4. (T6+BFL)/(T2+G34)≥2.700;
5. (T2+G23+T3)/G45≤2.300;
6. TL/BFL≤4.000;
7. EFL/(G12+T4+G56)≥5.100;
8. (G45+ALT)/(T3+G34)≥6.000;
9. (T1+G23+T6)/(G12+G45)≤3.100;
10. TTL/(G45+BFL)≤3.400;
11. (T1+T2+T3)/T4≤5.900;
12. (G45+T5+G56)/(G12+T2)≤5.000;
13. EFL/(G34+G45+G56)≤5.700;
14. (T4+G45)/T6≤3.300;
15. AAG/(G23+T5)≤2.100;
16. (T3+T4+T5)/T6≤3.900;
17. (T1+G12)/G56≥2.800;
18. T1/T2≥2.600;
19. (G45+T6)/T4≥2.500.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 18 illustrates a seventh embodiment of the optical imaging lens of the present invention.

FIG. 19A illustrates the longitudinal spherical aberration on the image plane of the seventh embodiment.

FIG. 19B illustrates the field curvature aberration on the sagittal direction of the seventh embodiment.

FIG. 19C illustrates the field curvature aberration on the tangential direction of the seventh embodiment.

FIG. 19D illustrates the distortion aberration of the seventh embodiment.

FIG. 22 illustrates a ninth embodiment of the optical imaging lens of the present invention.

FIG. 23A illustrates the longitudinal spherical aberration on the image plane of the ninth embodiment.

FIG. 23B illustrates the field curvature aberration on the sagittal direction of the ninth embodiment.

FIG. 23C illustrates the field curvature aberration on the tangential direction of the ninth embodiment.

FIG. 23D illustrates the distortion aberration of the ninth embodiment.

FIG. 28 illustrates a twelfth embodiment of the optical imaging lens of the present invention.

FIG. 29A illustrates the longitudinal spherical aberration on the image plane of the twelfth embodiment.

FIG. 29B illustrates the field curvature aberration on the sagittal direction of the twelfth embodiment.

FIG. 29C illustrates the field curvature aberration on the tangential direction of the twelfth embodiment.

FIG. 29D illustrates the distortion aberration of the twelfth embodiment.

FIG. 32 shows the optical data of the first embodiment of the optical imaging lens.

FIG. 33 shows the aspheric surface data of the first embodiment.

FIG. 34 shows the optical data of the second embodiment of the optical imaging lens.

FIG. 35 shows the aspheric surface data of the second embodiment.

FIG. 36 shows the optical data of the third embodiment of the optical imaging lens.

FIG. 37 shows the aspheric surface data of the third embodiment.

FIG. 38 shows the optical data of the fourth embodiment of the optical imaging lens.

FIG. 39 shows the aspheric surface data of the fourth embodiment.

FIG. 40 shows the optical data of the fifth embodiment of the optical imaging lens.

FIG. 41 shows the aspheric surface data of the fifth embodiment.

FIG. 42 shows the optical data of the sixth embodiment of the optical imaging lens.

FIG. 43 shows the aspheric surface data of the sixth embodiment.

FIG. 44 shows the optical data of the seventh embodiment of the optical imaging lens.

FIG. 45 shows the aspheric surface data of the seventh embodiment.

FIG. 46 shows the optical data of the eighth embodiment of the optical imaging lens.

FIG. 47 shows the aspheric surface data of the eighth embodiment.

FIG. 48 shows the optical data of the ninth embodiment of the optical imaging lens.

FIG. 49 shows the aspheric surface data of the ninth embodiment.

FIG. 50 shows the optical data of the tenth embodiment of the optical imaging lens.

FIG. 51 shows the aspheric surface data of the tenth embodiment.

FIG. 52 shows the optical data of the eleventh embodiment of the optical imaging lens.

FIG. 53 shows the aspheric surface data of the eleventh embodiment.

FIG. 54 shows the optical data of the twelfth embodiment of the optical imaging lens.

FIG. 55 shows the aspheric surface data of the twelfth embodiment.

FIG. 56 shows the optical data of the thirteenth embodiment of the optical imaging lens.

FIG. 57 shows the aspheric surface data of the thirteenth embodiment.

FIG. 58 shows some important parameters in the embodiments.

FIG. 59 shows some important ratios in the embodiments.

DETAILED DESCRIPTION

The terms "optical axis region", "periphery region", "concave", and "convex" used in this specification and claims should be interpreted based on the definition listed in the specification by the principle of lexicographer.

Figure 1:
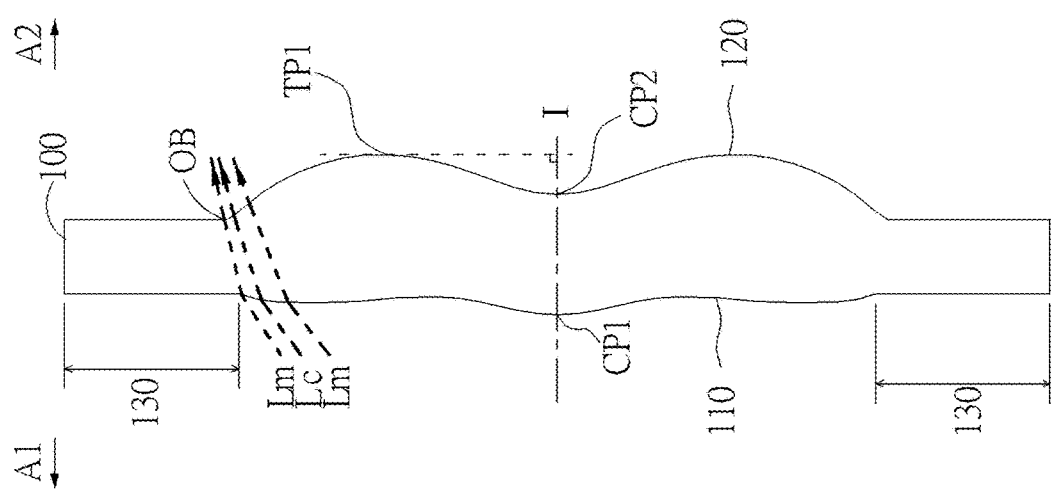

In the present disclosure, the optical system may comprise at least one lens element to receive imaging rays that are incident on the optical system over a set of angles ranging from parallel to an optical axis to a half field of view (HFOV) angle with respect to the optical axis. The imaging rays pass through the optical system to produce an image on an image plane. The term "a lens element having positive refracting power (or negative refracting power)" means that the paraxial refracting power of the lens element in Gaussian optics is positive (or negative). The term "an object-side (or image-side) surface of a lens element" refers to a specific region of that surface of the lens element at which imaging rays can pass through that specific region. Imaging rays include at least two types of rays: a chief ray Lc and a marginal ray Lm (as shown in FIG. 1). An object-side (or image-side) surface of a lens element can be characterized as having several regions, including an optical axis region, a periphery region, and, in some cases, one or more intermediate regions, as discussed more fully below.

Figure 4:
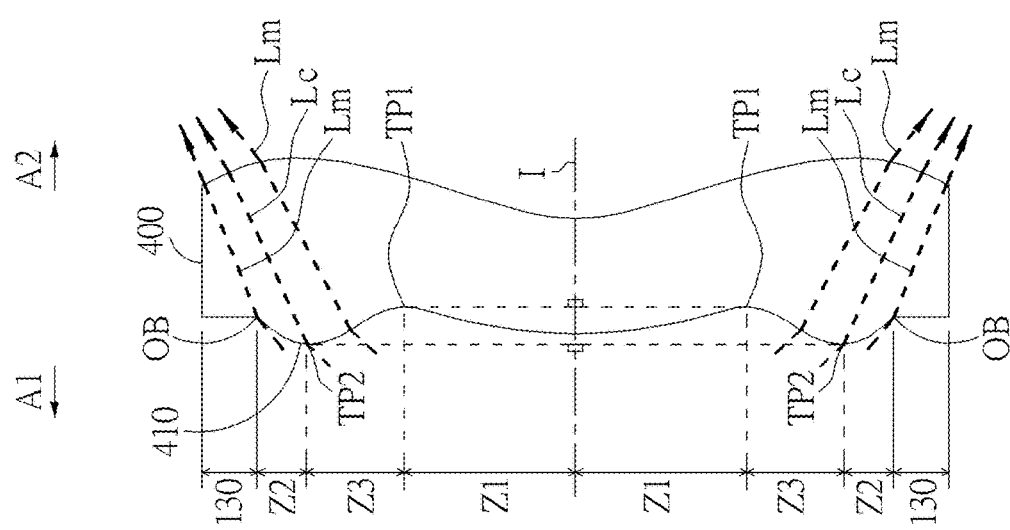

FIG. 1 is a radial cross-sectional view of a lens element 100. Two referential points for the surfaces of the lens element 100 can be defined: a central point, and a transition point. The central point of a surface of a lens element is a point of intersection of that surface and the optical axis I. As illustrated in FIG. 1, a first central point CP1 may be present on the object-side surface 110 of lens element 100 and a second central point CP2 may be present on the image-side surface 120 of the lens element 100. The transition point is a point on a surface of a lens element, at which the line tangent to that point is perpendicular to the optical axis I. The optical boundary OB of a surface of the lens element is defined as a point at which the radially outermost marginal ray Lm passing through the surface of the lens element intersects the surface of the lens element. All transition points lie between the optical axis I and the optical boundary OB of the surface of the lens element. If multiple transition points are present on a single surface, then these transition points are sequentially named along the radial direction of the surface with reference numerals starting from the first transition point. For example, the first transition point, e.g., TP1, (closest to the optical axis I), the second transition point, e.g., TP2 (as shown in FIG. 4), and the Nth transition point (farthest from the optical axis I).

The region of a surface of the lens element from the central point to the first transition point TP1 is defined as the optical axis region, which includes the central point. The region located radially outside of the farthest Nth transition point from the optical axis I to the optical boundary OB of the surface of the lens element is defined as the periphery region. In some embodiments, there may be intermediate regions present between the optical axis region and the periphery region, with the number of intermediate regions depending on the number of the transition points.

The shape of a region is convex if a collimated ray being parallel to the optical axis I and passing through the region is bent toward the optical axis I such that the ray intersects the optical axis I on the image side A2 of the lens element. The shape of a region is concave if the extension line of a collimated ray being parallel to the optical axis I and passing through the region intersects the optical axis I on the object side A1 of the lens element.

Additionally, referring to FIG. 1, the lens element 100 may also have a mounting portion 130 extending radially outward from the optical boundary OB. The mounting portion 130 is typically used to physically secure the lens element to a corresponding element of the optical system (not shown). Imaging rays do not reach the mounting portion 130. The structure and shape of the mounting portion 130 are only examples to explain the technologies, and should not be taken as limiting the scope of the present disclosure. The mounting portion 130 of the lens elements discussed below may be partially or completely omitted in the following drawings.

Figure 2:
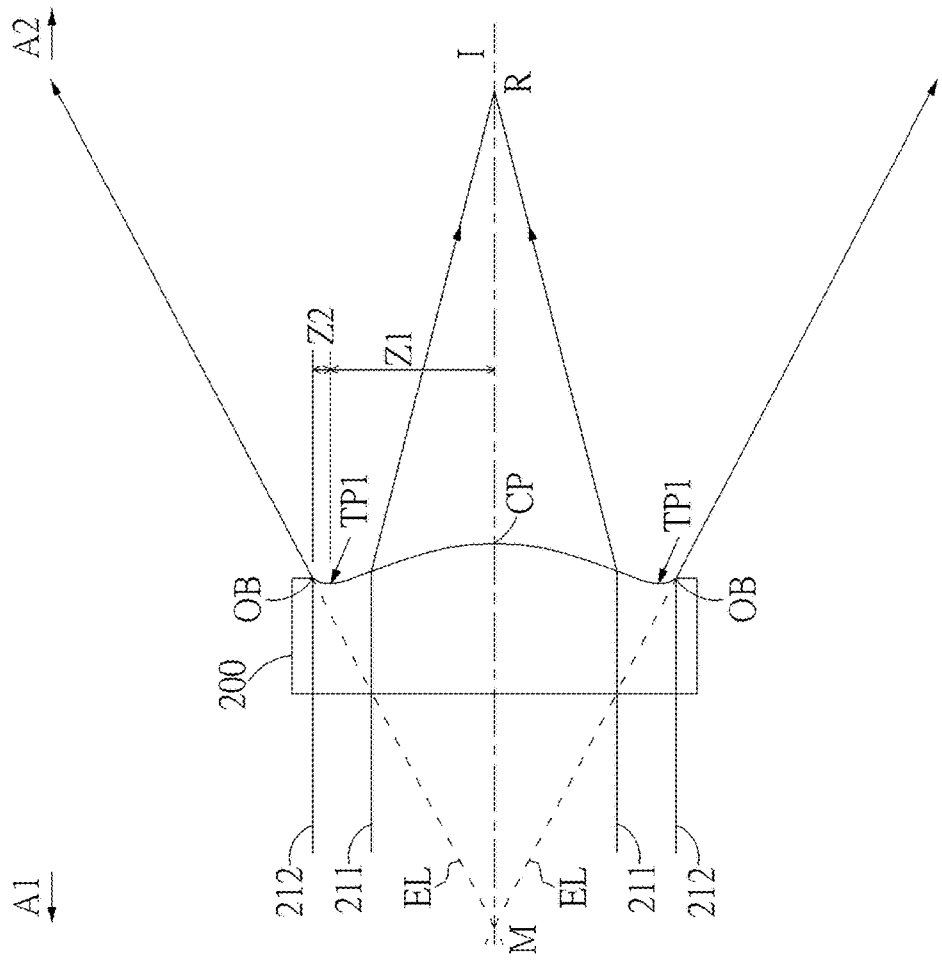
FIGS. 1-5 illustrate the methods for determining the surface shapes and for determining an optical axis region and a periphery region of one lens element.

Referring to FIG. 2, optical axis region Z1 is defined between central point CP and first transition point TP1. Periphery region Z2 is defined between TP1 and the optical boundary OB of the surface of the lens element. Collimated ray 211 intersects the optical axis I on the image side A2 of lens element 200 after passing through optical axis region Z1, i.e., the focal point of collimated ray 211 after passing through optical axis region Z1 is on the image side A2 of the lens element 200 at point R in FIG. 2. Accordingly, since the ray itself intersects the optical axis I on the image side A2 of the lens element 200, optical axis region Z1 is convex. On the contrary, collimated ray 212 diverges after passing through periphery region Z2. The extension line EL of collimated ray 212 after passing through periphery region Z2 intersects the optical axis I on the object side A1 of lens element 200, i.e., the focal point of collimated ray 212 after passing through periphery region Z2 is on the object side A1 at point M in FIG. 2. Accordingly, since the extension line EL of the ray intersects the optical axis I on the object side A1 of the lens element 200, periphery region Z2 is concave. In the lens element 200 illustrated in FIG. 2, the first transition point TP1 is the border of the optical axis region and the periphery region, i.e., TP1 is the point at which the shape changes from convex to concave.

Alternatively, there is another way for a person having ordinary skill in the art to determine whether an optical axis region is convex or concave by referring to the sign of "Radius" (the "R" value), which is the paraxial radius of shape of a lens surface in the optical axis region. The R value is commonly used in conventional optical design software such as Zemax and CodeV. The R value usually appears in the lens data sheet in the software. For an object-side surface, a positive R value defines that the optical axis region of the object-side surface is convex, and a negative R value defines that the optical axis region of the object-side surface is concave. Conversely, for an image-side surface, a positive R value defines that the optical axis region of the image-side surface is concave, and a negative R value defines that the optical axis region of the image-side surface is convex. The result found by using this method should be consistent with the method utilizing intersection of the optical axis by rays/extension lines mentioned above, which determines surface shape by referring to whether the focal point of a collimated ray being parallel to the optical axis I is on the object-side or the image-side of a lens element. As used herein, the terms "a shape of a region is convex (concave)," "a region is convex (concave)," and "a convex-(concave-) region," can be used alternatively.

Figure 5:
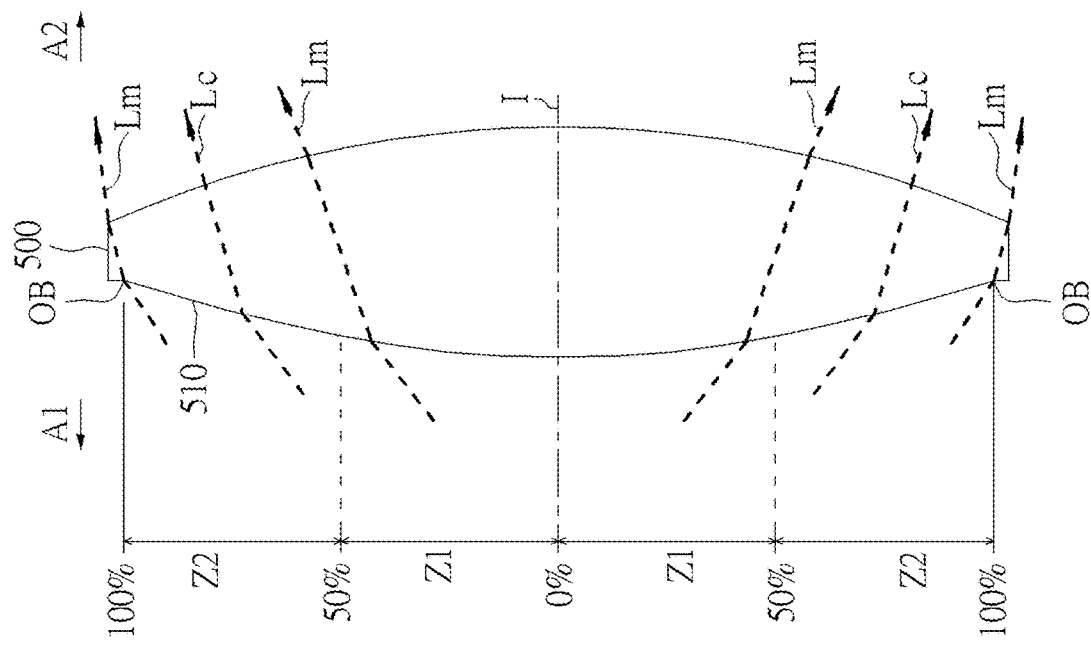
Figure 3:
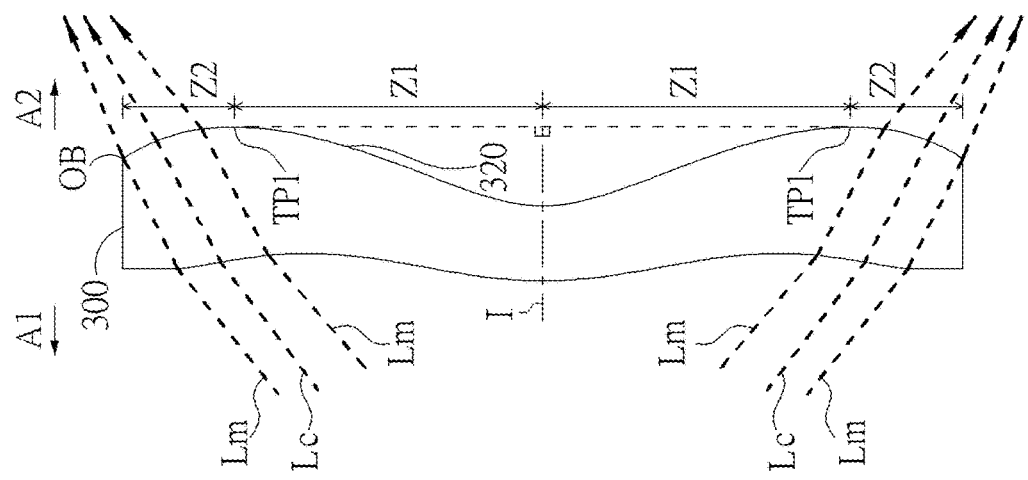

FIG. 3, FIG. 4 and FIG. 5 illustrate examples of determining the shape of lens element regions and the boundaries of regions under various circumstances, including the optical axis region, the periphery region, and intermediate regions as set forth in the present specification.

FIG. 3 is a radial cross-sectional view of a lens element 300. As illustrated in FIG. 3, only one transition point TP1 appears within the optical boundary OB of the image-side surface 320 of the lens element 300. Optical axis region Z1 and periphery region Z2 of the image-side surface 320 of lens element 300 are illustrated. The R value of the image-side surface 320 is positive (i.e., R>0). Accordingly, the optical axis region Z1 is concave.

In general, the shape of each region demarcated by the transition point will have an opposite shape to the shape of the adjacent region(s). Accordingly, the transition point will define a transition in shape, changing from concave to convex at the transition point or changing from convex to concave. In FIG. 3, since the shape of the optical axis region Z1 is concave, the shape of the periphery region Z2 will be convex as the shape changes at the transition point TP1.

FIG. 4 is a radial cross-sectional view of a lens element 400. Referring to FIG. 4, a first transition point TP1 and a second transition point TP2 are present on the object-side surface 410 of lens element 400. The optical axis region Z1 of the object-side surface 410 is defined between the optical axis I and the first transition point TP1. The R value of the object-side surface 410 is positive (i.e., R>0). Accordingly, the optical axis region Z1 is convex.

The periphery region Z2 of the object-side surface 410, which is also convex, is defined between the second transition point TP2 and the optical boundary OB of the object-side surface 410 of the lens element 400. Further, intermediate region Z3 of the object-side surface 410, which is concave, is defined between the first transition point TP1 and the second transition point TP2. Referring once again to FIG. 4, the object-side surface 410 includes an optical axis region Z1 located between the optical axis I and the first transition point TP1, an intermediate region Z3 located between the first transition point TP1 and the second transition point TP2, and a periphery region Z2 located between the second transition point TP2 and the optical boundary OB of the object-side surface 410. Since the shape of the optical axis region Z1 is designed to be convex, the shape of the intermediate region Z3 is concave as the shape of the intermediate region Z3 changes at the first transition point TP1, and the shape of the periphery region Z2 is convex as the shape of the periphery region Z2 changes at the second transition point TP2.

FIG. 5 is a radial cross-sectional view of a lens element 500. Lens element 500 has no transition point on the object-side surface 510 of the lens element 500. For a surface of a lens element with no transition point, for example, the object-side surface 510 the lens element 500, the optical axis region Z1 is defined as the region between 0-50% of the distance between the optical axis I and the optical boundary OB of the surface of the lens element and the periphery region is defined as the region between 50%-100% of the distance between the optical axis I and the optical boundary OB of the surface of the lens element. Referring to lens element 500 illustrated in FIG. 5, the optical axis region Z1 of the object-side surface 510 is defined between the optical axis I and 50% of the distance between the optical axis I and the optical boundary OB. The R value of the object-side surface 510 is positive (i.e., R>0). Accordingly, the optical axis region Z1 is convex. For the object-side surface 510 of the lens element 500, because there is no transition point, the periphery region Z2 of the object-side surface 510 is also convex. It should be noted that lens element 500 may have a mounting portion (not shown) extending radially outward from the periphery region Z2.

Figure 6:
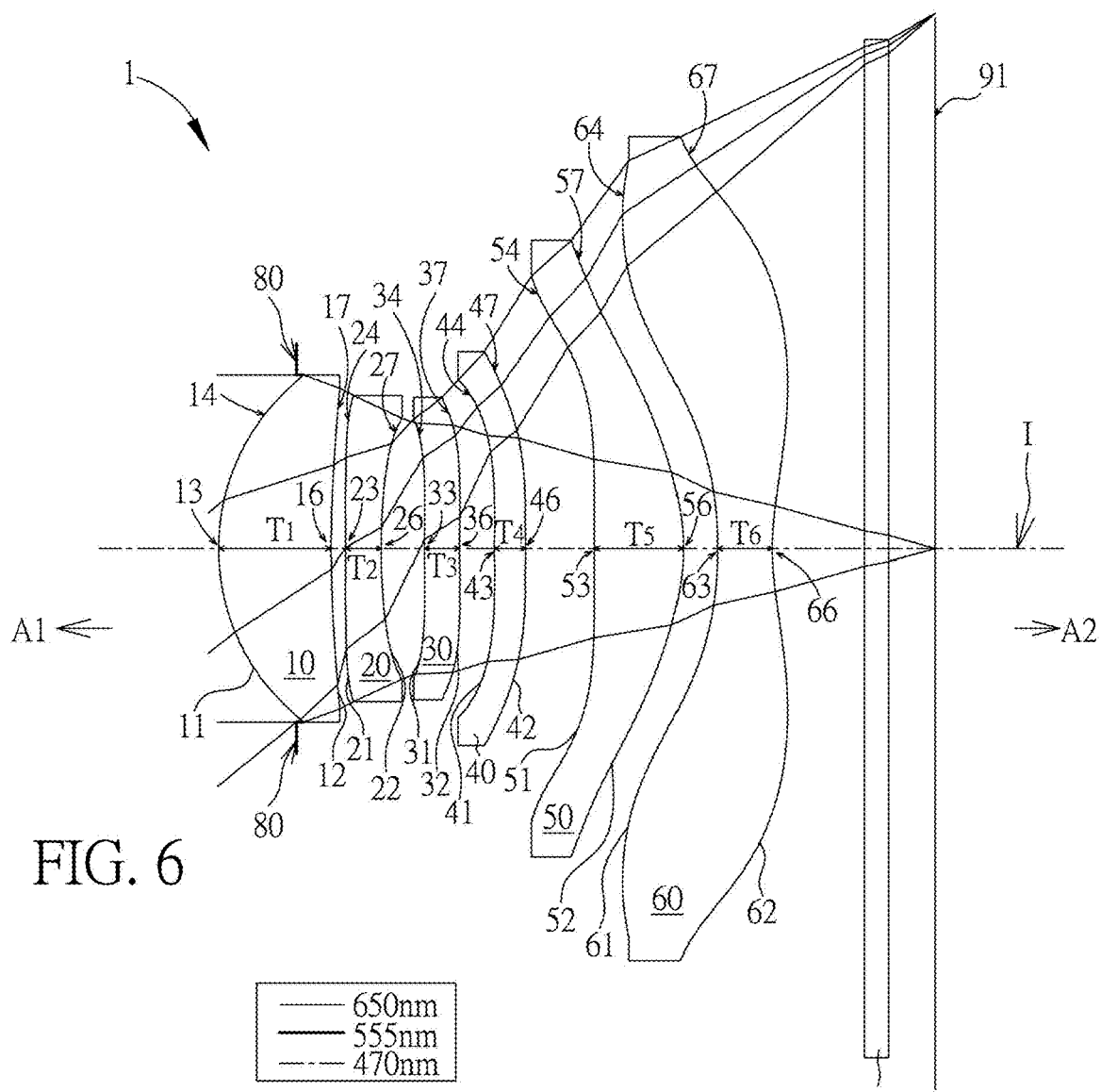
FIG. 6 illustrates a first embodiment of the optical imaging lens of the present invention.

As shown in FIG. 6, the optical imaging lens 1 of six lens elements of the present invention, sequentially located from an object side A1 (where an object is located) to an image side A2 along an optical axis I, has an aperture stop 80, a first lens element 10, a second lens element 20, a third lens element 30, a fourth lens element 40, a fifth lens element 50, a sixth lens element 60 and an image plane 91. Generally speaking, the first lens element 10, the second lens element 20, the third lens element 30, the fourth lens element 40, the fifth lens element 50 and the sixth lens element 60 may be made of a transparent plastic material but the present invention is not limited to this, and each lens element has an appropriate refracting power. In the present invention, lens elements having refracting power included by the optical imaging lens 1 are only the six lens elements (the first lens element 10, the second lens element 20, the third lens element 30, the fourth lens element 40, the fifth lens element 50 and the sixth lens element 60) described above. The optical axis I is the optical axis of the entire optical imaging lens 1, and the optical axis of each of the lens elements coincides with the optical axis of the optical imaging lens 1.

Furthermore, the optical imaging lens 1 includes an aperture stop (ape. stop) 80 disposed in an appropriate position. In FIG. 6, the aperture stop 80 is disposed between the object side A1 and the first lens element 10. When imaging rays emitted or reflected by an object (not shown) which is located at the object side A1 enters the optical imaging lens 1 of the present invention, it forms a clear and sharp image on the image plane 91 at the image side A2 after passing through the aperture stop 80, the first lens element 10, the second lens element 20, the third lens element 30, the fourth lens element 40, the fifth lens element 50, the sixth lens element 60, and a filter 90. In one embodiment of the present invention, the filter 90 may be a filter of various suitable functions to filter out light of a specific wavelength, for embodiment, the filter 90 may be an infrared cut filter (infrared cut-off filter), placed between the sixth lens element 60 and the image plane 91 to keep the infrared light in the imaging rays from reaching the image plane 91 to jeopardize the imaging quality.

The first lens element 10, the second lens element 20, the third lens element 30, the fourth lens element 40, the fifth lens element 50 and the sixth lens element 60 of the optical imaging lens 1 each has an object-side surface 11, 21, 31, 41, 51 and 61 facing toward the object side A1 and allowing imaging rays to pass through as well as an image-side surface 12, 22, 32, 42, 52 and 62 facing toward the image side A2 and allowing the imaging rays to pass through. Furthermore, each object-side surface and image-side surface of lens elements in the optical imaging lens of present invention has optical axis region and periphery region.

Each lens element in the optical imaging lens 1 of the present invention further has a thickness T along the optical axis I. For embodiment, the first lens element 10 has a first lens element thickness T1, the second lens element 20 has a second lens element thickness T2, the third lens element 30 has a third lens element thickness T3, the fourth lens element 40 has a fourth lens element thickness T4, the fifth lens element 50 has a fifth lens element thickness T5, and the sixth lens element 60 has a sixth lens element thickness T6. Therefore, a sum of thicknesses of all the six lens elements in the optical imaging lens 1 along the optical axis I is ALT=T1+T2+T3+T4+T5+T6.

In addition, between two adjacent lens elements in the optical imaging lens 1 of the present invention there may be an air gap along the optical axis I. In embodiments, there is an air gap G12 between the first lens element 10 and the second lens element 20, an air gap G23 between the second lens element 20 and the third lens element 30, an air gap G34 between the third lens element 30 and the fourth lens element 40, an air gap G45 between the fourth lens element 40 and the fifth lens element 50 as well as an air gap G56 between the fifth lens element 50 and the sixth lens element 60. Therefore, a sum of five air gaps from the first lens element 10 to the sixth lens element 60 along the optical axis I is AAG=G12+G23+G34+G45+G56.

In addition, a distance from the object-side surface 11 of the first lens element 10 to the image plane 91, namely a system length of the optical imaging lens 1 along the optical axis I is TTL; an effective focal length of the optical imaging lens is EFL; a distance from the object-side surface 11 of the first lens element 10 to the image-side surface 62 of the sixth lens element 60 along the optical axis I is TL. An air gap between the image-side surface 62 of the sixth lens element 60 and the filter 90 along the optical axis I is G6F; a thickness of the filter 90 along the optical axis I is TF; an air gap between the filter 90 and the image plane 91 along the optical axis I is GFP; and a distance from the image-side surface 62 of the sixth lens element 60 to the image plane 91 along the optical axis I is BFL. Therefore, BFL=G6F+TF+GFP. ImgH is an image height of the optical imaging lens 1. HFOV stands for the half field of view of the entire optical imaging lens 1.

Furthermore, a focal length of the first lens element 10 is f1; a focal length of the second lens element 20 is f2; a focal length of the third lens element 30 is f3; a focal length of the fourth lens element 40 is f4; a focal length of the fifth lens element 50 is f5; a focal length of the sixth lens element 60 is f6; a refractive index of the first lens element 10 is n1; a refractive index of the second lens element 20 is n2; a refractive index of the third lens element 30 is n3; a refractive index of the fourth lens element 40 is n4; a refractive index of the fifth lens element 50 is n5; a refractive index of the sixth lens element 60 is n6; an Abbe number of the first lens element 10 is v1; an Abbe number of the second lens element 20 is v2; an Abbe number of the third lens element 30 is v3; and an Abbe number of the fourth lens element 40 is v4; an Abbe number of the fifth lens element 50 is v5; and an Abbe number of the sixth lens element 60 is v6.

First Embodiment

Figures 7A, 7B, 7C, 7D:
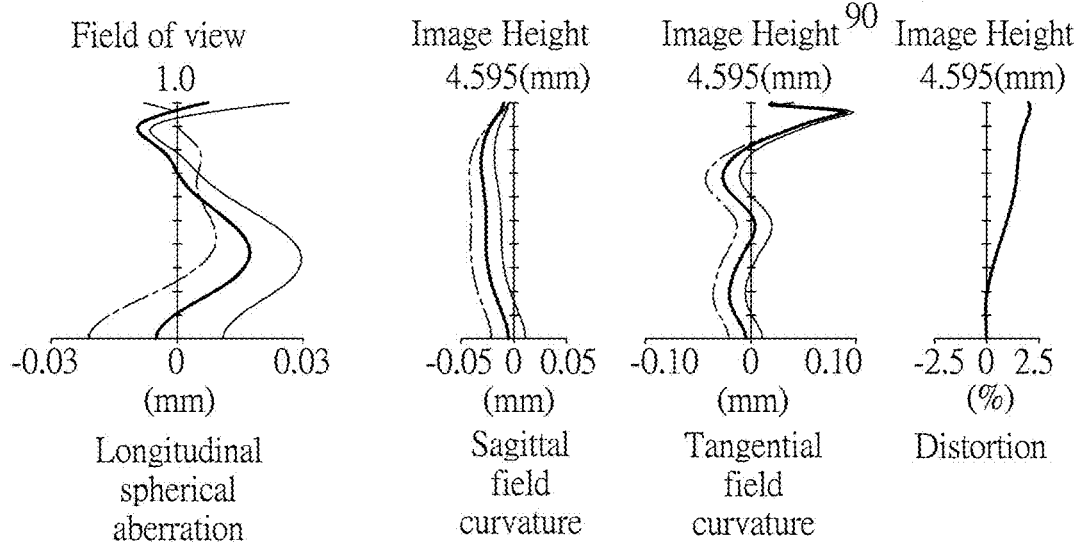
FIG. 7A illustrates the longitudinal spherical aberration on the image plane of the first embodiment.
FIG. 7B illustrates the field curvature aberration on the sagittal direction of the first embodiment.
FIG. 7C illustrates the field curvature aberration on the tangential direction of the first embodiment.
FIG. 7D illustrates the distortion aberration of the first embodiment.

Please refer to FIG. 6 which illustrates the first embodiment of the optical imaging lens 1 of the present invention. Please refer to FIG. 7A for the longitudinal spherical aberration on the image plane 91 of the first embodiment; please refer to FIG. 7B for the field curvature aberration on the sagittal direction; please refer to FIG. 7C for the field curvature aberration on the tangential direction; and please refer to FIG. 7D for the distortion aberration. The Y axis of the spherical aberration in each embodiment is "field of view" for 1.0. The Y axis of the field curvature aberration and the distortion aberration in each embodiment stands for the "image height" (ImgH), which is 4.595 mm.

Only the six lens elements 10, 20, 30, 40, 50 and 60 of the optical imaging lens 1 of the first embodiment have refracting power. The optical imaging lens 1 also has an aperture stop 80, a filter 90, and an image plane 91. The aperture stop 80 is provided between the object side A1 and the first lens element 10.

The first lens element 10 has positive refracting power. An optical axis region 13 and a periphery region 14 of the object-side surface 11 of the first lens element 10 are convex. An optical axis region 16 and a periphery region 17 of the image-side surface 12 of the first lens element 10 are concave. Besides, both the object-side surface 11 and the image-side surface 12 of the first lens element 10 are aspherical surfaces, but it is not limited thereto.

The second lens element 20 has negative refracting power. An optical axis region 23 and a periphery region 24 of the object-side surface 21 of the second lens element 20 are convex. An optical axis region 26 and a periphery region 27 of the image-side surface 22 of the second lens element 20 are concave. Besides, both the object-side surface 21 and the image-side surface 22 of the second lens element 20 are aspherical surfaces, but it is not limited thereto.

The third lens element 30 has negative refracting power. An optical axis region 33 of the object-side surface 31 of the third lens element 30 is convex and a periphery region 34 of the object-side surface 31 of the third lens element 30 is concave. An optical axis region 36 of the image-side surface 32 of the third lens element 30 is concave and a periphery region 37 of the image-side surface 32 of the third lens element 30 is convex. Besides, both the object-side surface 31 and the image-side surface 32 of the third lens element 30 are aspherical surfaces, but it is not limited thereto.

The fourth lens element 40 has positive refracting power. An optical axis region 43 of the fourth lens element 40 is convex and a periphery region 44 of the object-side surface 41 of the fourth lens element 40 is concave. An optical axis region 46 and a periphery region 47 of the image-side surface 42 of the fourth lens element 40 are convex. Besides, both the object-side surface 41 and the image-side surface 42 of the fourth lens element 40 are aspherical surfaces, but it is not limited thereto.

The fifth lens element 50 has positive refracting power. An optical axis region 53 of the object-side surface 51 of the fifth lens element 50 is convex and a periphery region 54 of the object-side surface 51 of the fifth lens element 50 is concave. An optical axis region 56 and a periphery region 57 of the image-side surface 52 of the fifth lens element 50 are convex. Besides, both the object-side surface 51 and the image-side surface 52 of the fifth lens element 50 are aspherical surfaces, but it is not limited thereto.

The sixth lens element 60 has negative refracting power. An optical axis region 63 of the object-side surface 61 of the sixth lens element 60 is concave and a periphery region 64 of the object-side surface 61 of the sixth lens element 60 is convex. An optical axis region 66 of the image-side surface 62 of the sixth lens element 60 is concave and a periphery region 67 of the image-side surface 62 of the sixth lens element 60 is convex. Besides, both the object-side surface 61 and the image-side surface 62 of the sixth lens element 60 are aspherical surfaces, but it is not limited thereto. The filter 90 is disposed between the image-side surface 62 of the sixth lens element 60 and the image plane 91.

In the first lens element 10, the second lens element 20, the third lens element 30, the fourth lens element 40, the fifth lens element 50 and the sixth lens element 60 of the optical imaging lens element 1 of the present invention, there are 12 surfaces, such as the object-side surfaces 11/21/31/41/51/61 and the image-side surfaces 12/22/32/42/52/62. If a surface is aspherical, these aspheric coefficients are defined according to the following formula:

$$Z(Y) = \frac{Y^2}{R} \Big/ \left(1 + \sqrt{1-(1+K)\frac{Y^2}{R^2}}\right) + \sum_{i=1}^{n} a_{2i} \times Y^{2i}$$

In which:
R represents the curvature radius of the lens element surface;
Z represents the depth of an aspherical surface (the perpendicular distance between the point of the aspherical surface at a distance Y from the optical axis I and the tangent plane of the vertex on the optical axis I of the aspherical surface);
Y represents a vertical distance from a point on the aspherical surface to the optical axis I;
K is a conic constant; and $a_{2i}$ is the aspheric coefficient of the $2i^{th}$ order.

The optical data of the first embodiment of the optical imaging lens 1 are shown in FIG. 32 while the aspheric surface data are shown in FIG. 33. In the present embodiments of the optical imaging lens, the f-number of the entire optical imaging lens is Fno, EFL is the effective focal length, HFOV stands for the half field of view of the entire optical imaging lens, and the unit for the radius, the thickness and the focal length is in millimeters (mm). In this embodiment, EFL=5.535 mm; HFOV=39.082 degrees; TTL=6.169 mm; Fno=1.850; ImgH=4.595 mm.

Second Embodiment

Figure 8:
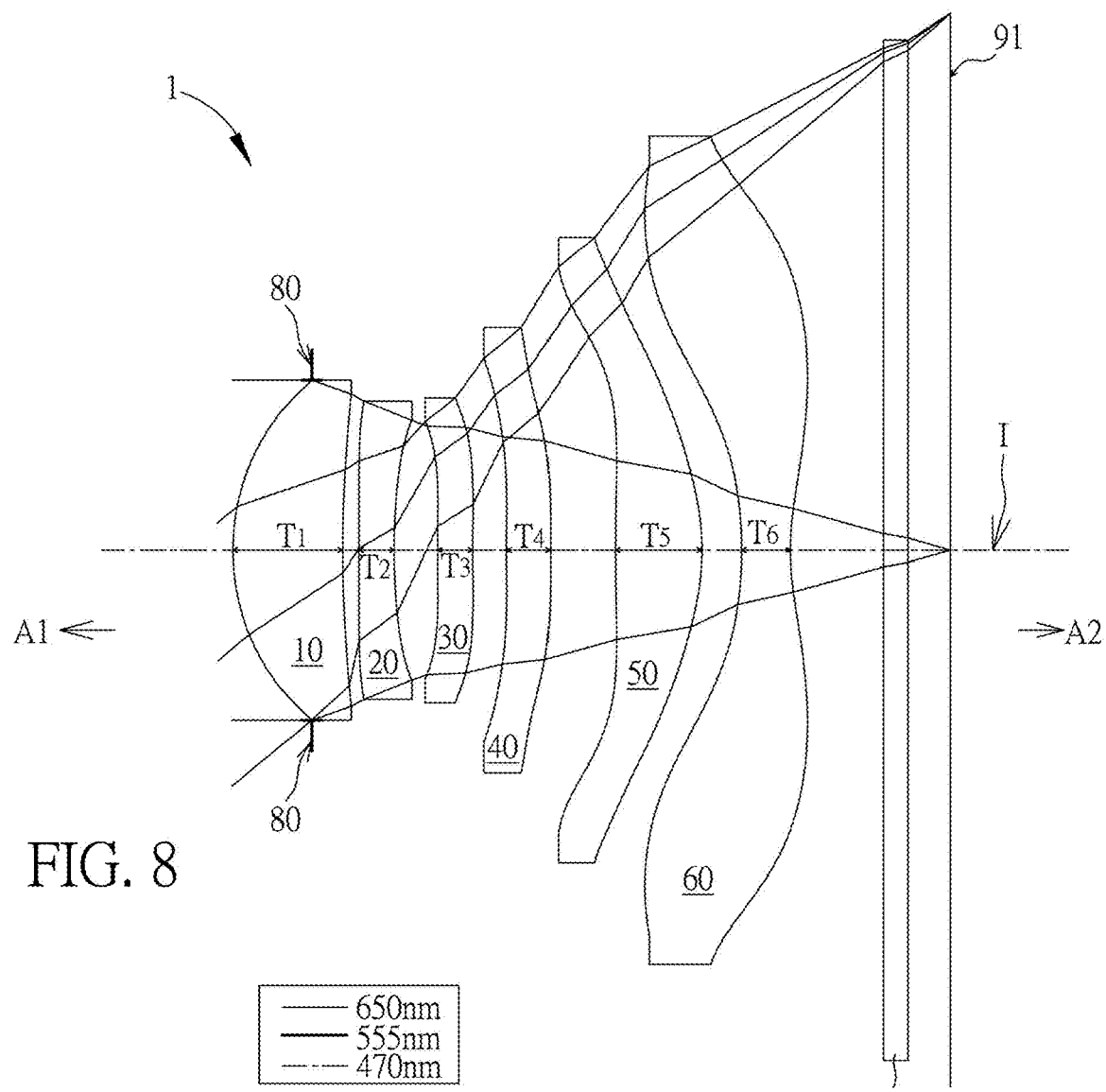
FIG. 8 illustrates a second embodiment of the optical imaging lens of the present invention.
Figures 9A, 9B, 9C, 9D:
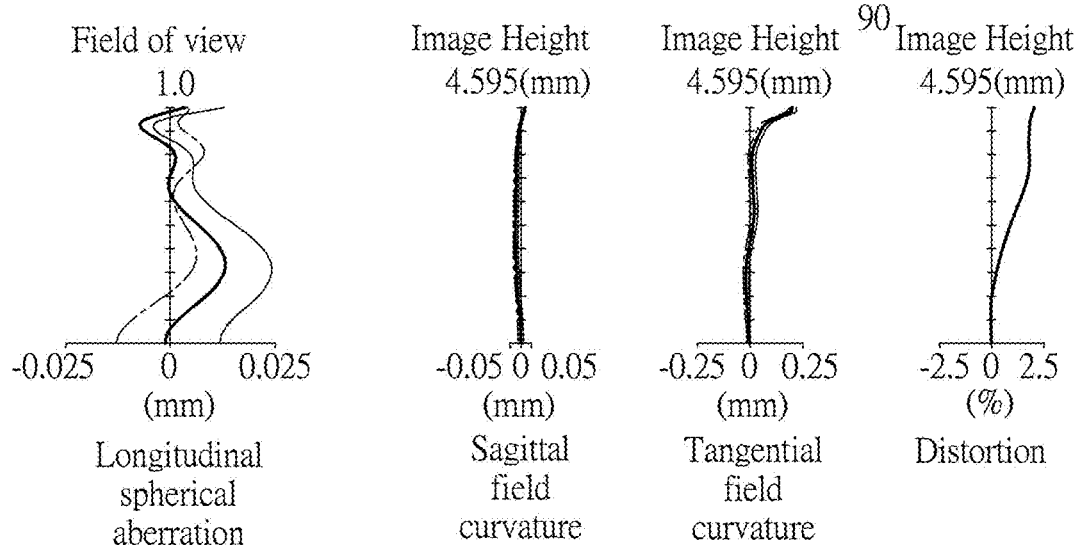
FIG. 9A illustrates the longitudinal spherical aberration on the image plane of the second embodiment.
FIG. 9B illustrates the field curvature aberration on the sagittal direction of the second embodiment.
FIG. 9C illustrates the field curvature aberration on the tangential direction of the second embodiment.
FIG. 9D illustrates the distortion aberration of the second embodiment.

Please refer to FIG. 8 which illustrates the second embodiment of the optical imaging lens 1 of the present invention. It is noted that from the second embodiment to the following embodiments, in order to simplify the figures, only the components different from what the first embodiment has, and the basic lens elements will be labeled in figures. Other components that are the same as what the first embodiment has, such as a convex surface or a concave surface, are omitted in the following embodiments. Please refer to FIG. 9A for the longitudinal spherical aberration on the image plane 91 of the second embodiment, please refer to FIG. 9B for the field curvature aberration on the sagittal direction, please refer to FIG. 9C for the field curvature aberration on the tangential direction, and please refer to FIG. 9D for the distortion aberration. The components in this embodiment are similar to those in the first embodiment, but the optical data such as the refracting power, the radius, the lens thickness, the aspheric surface or the back focal length in this embodiment are different from the optical data in the first embodiment.

The optical data of the second embodiment of the optical imaging lens are shown in FIG. 34 while the aspheric surface data are shown in FIG. 35. In this embodiment, EFL=5.401 mm; HFOV=39.826 degrees; TTL=6.151 mm; Fno=1.850; ImgH=4.595 mm. In particular, 1) the HFOV of the optical imaging lens in this embodiment is larger than that of the optical imaging lens in the first embodiment, 2) TTL of the optical imaging lens in this embodiment is shorter than that of the optical imaging lens in the first embodiment, 3) the longitudinal spherical aberration of the optical imaging lens in this embodiment is better than that of the optical imaging lens in the first embodiment.

Third Embodiment

Figure 10:
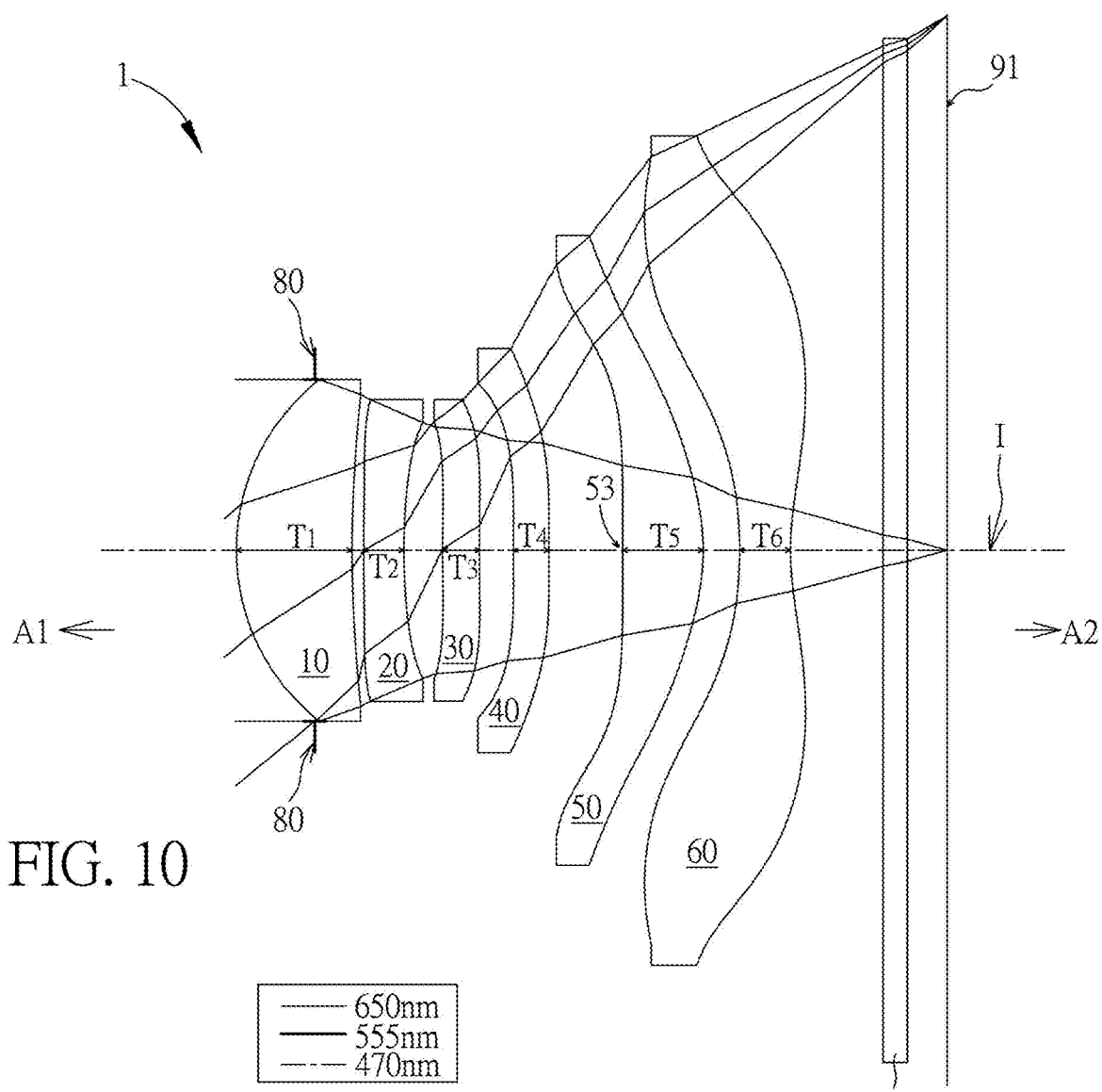
FIG. 10 illustrates a third embodiment of the optical imaging lens of the present invention.
Figures 11A, 11B, 11C, 11D:
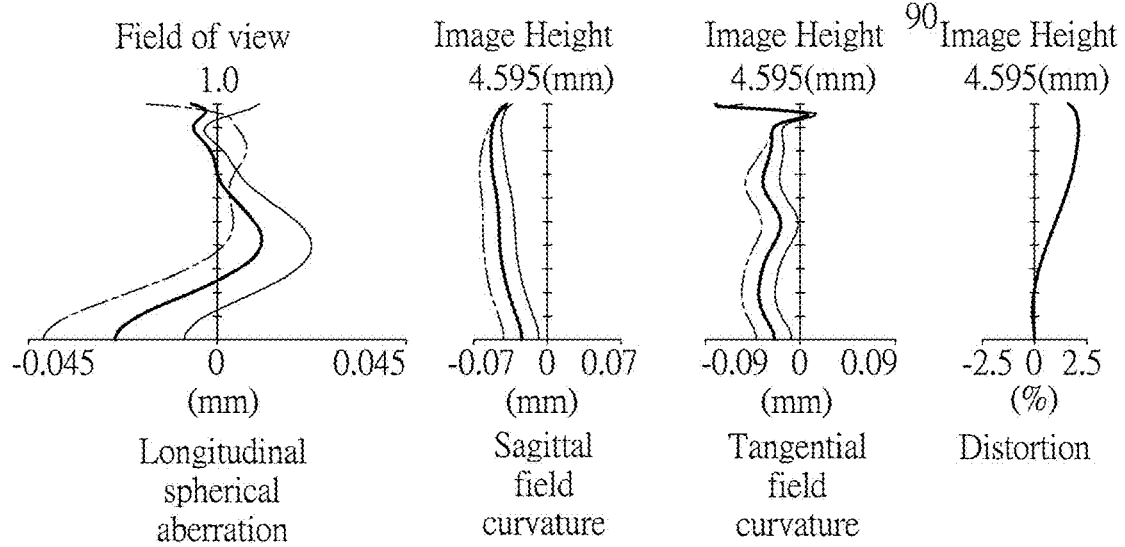
FIG. 11A illustrates the longitudinal spherical aberration on the image plane of the third embodiment.
FIG. 11B illustrates the field curvature aberration on the sagittal direction of the third embodiment.
FIG. 11C illustrates the field curvature aberration on the tangential direction of the third embodiment.
FIG. 11D illustrates the distortion aberration of the third embodiment.

Please refer to FIG. 10 which illustrates the third embodiment of the optical imaging lens 1 of the present invention. Please refer to FIG. 11A for the longitudinal spherical aberration on the image plane 91 of the third embodiment; please refer to FIG. 11B for the field curvature aberration on the sagittal direction; please refer to FIG. 11C for the field curvature aberration on the tangential direction; and please refer to FIG. 11D for the distortion aberration. The components in this embodiment are similar to those in the first embodiment, but the optical data such as the refracting power, the radius, the lens thickness, the aspheric surface or the back focal length in this embodiment are different from the optical data in the first embodiment. Besides, in this embodiment, an optical axis region 53 of the object-side surface 51 of the fifth lens element 50 is concave.

The optical data of the third embodiment of the optical imaging lens are shown in FIG. 36 while the aspheric surface data are shown in FIG. 37. In this embodiment, EFL=5.464 mm; HFOV=39.365 degrees; TTL=6.127 mm; Fno=1.850; ImgH=4.595 mm. In particular, 1) the HFOV of the optical imaging lens in this embodiment is larger than that of the optical imaging lens in the first embodiment, 2) TTL of the optical imaging lens in this embodiment is shorter than that of the optical imaging lens in the first embodiment, 3) the field curvature aberration on the tangential direction of the optical imaging lens in this embodiment is better than that of the optical imaging lens in the first embodiment.

Fourth Embodiment

Figure 12:
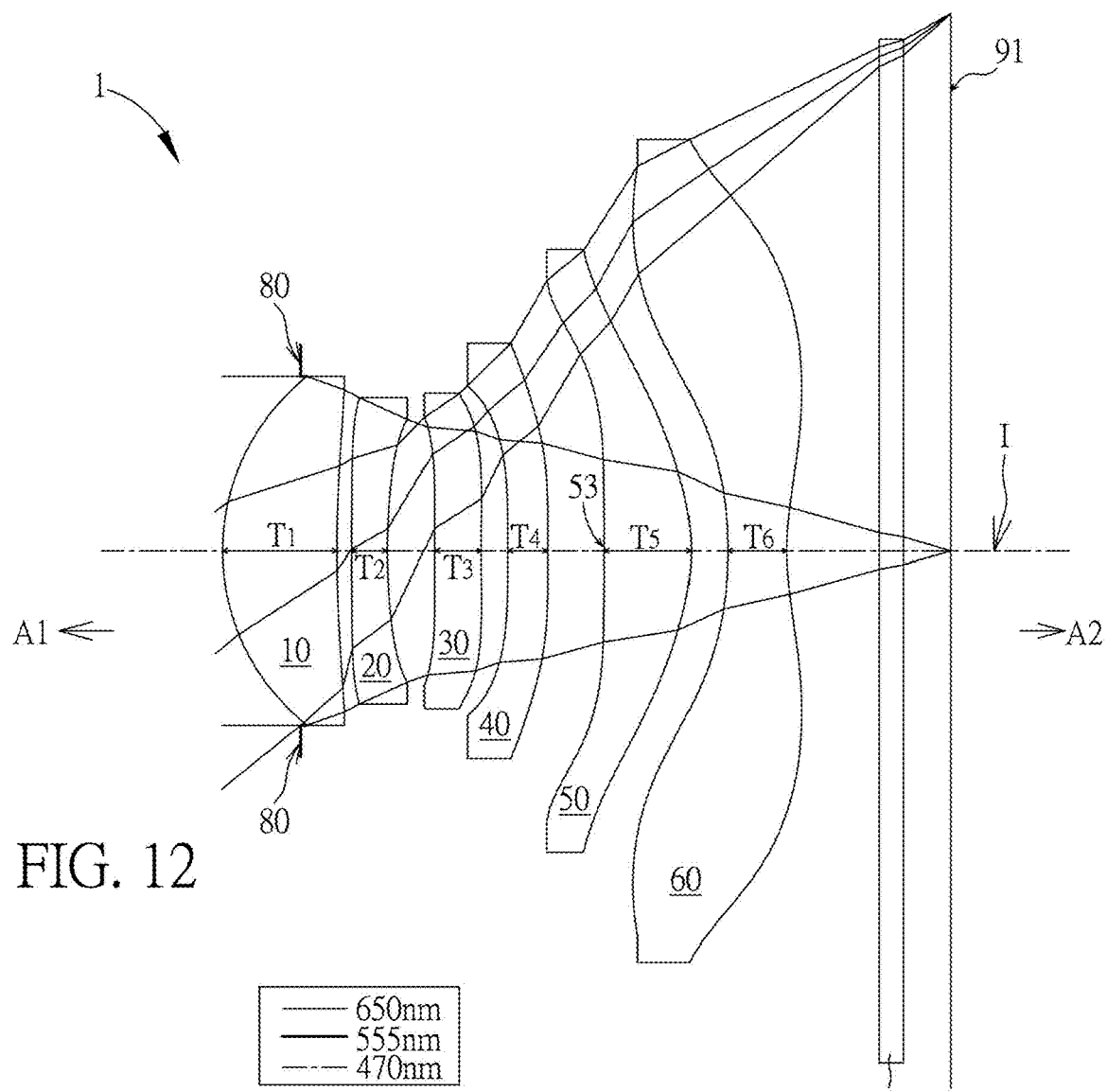
FIG. 12 illustrates a fourth embodiment of the optical imaging lens of the present invention.
Figures 13A, 13B, 13C, 13D:
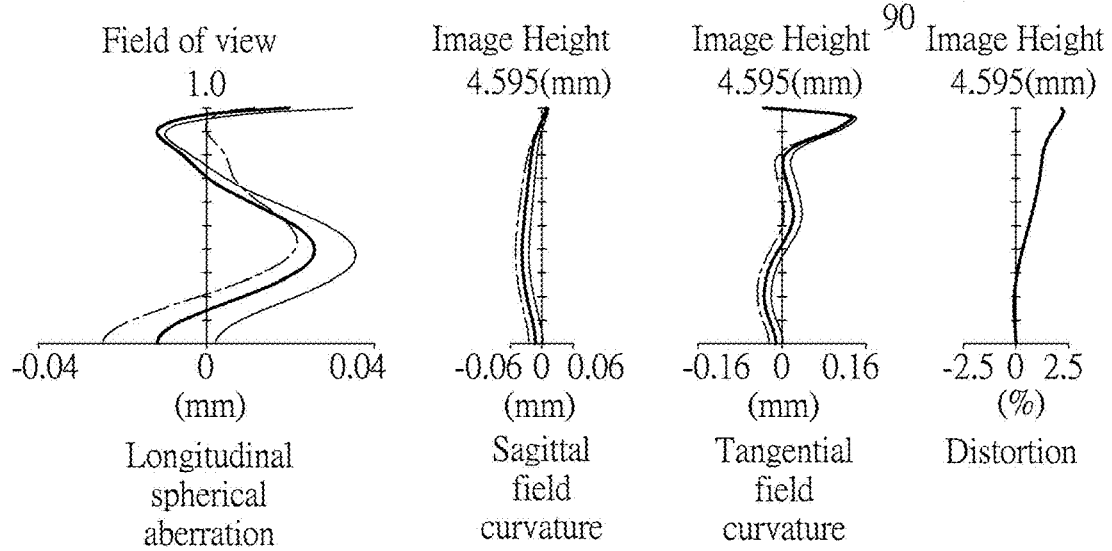
FIG. 13A illustrates the longitudinal spherical aberration on the image plane of the fourth embodiment.
FIG. 13B illustrates the field curvature aberration on the sagittal direction of the fourth embodiment.
FIG. 13C illustrates the field curvature aberration on the tangential direction of the fourth embodiment.
FIG. 13D illustrates the distortion aberration of the fourth embodiment.

Please refer to FIG. 12 which illustrates the fourth embodiment of the optical imaging lens 1 of the present invention. Please refer to FIG. 13A for the longitudinal spherical aberration on the image plane 91 of the fourth embodiment; please refer to FIG. 13B for the field curvature aberration on the sagittal direction; please refer to FIG. 13C for the field curvature aberration on the tangential direction; and please refer to FIG. 13D for the distortion aberration. The components in this embodiment are similar to those in the first embodiment, but the optical data such as the refracting power, the radius, the lens thickness, the aspheric surface or the back focal length in this embodiment are different from the optical data in the first embodiment. Besides, in this embodiment, an optical axis region 53 of the object-side surface 51 of the fifth lens element 50 is concave.

The optical data of the fourth embodiment of the optical imaging lens are shown in FIG. 38 while the aspheric surface data are shown in FIG. 39. In this embodiment, EFL=5.544 mm; HFOV=38.927 degrees; TTL=6.249 mm; Fno=1.850; ImgH=4.595 mm.

Fifth Embodiment

Figure 14:
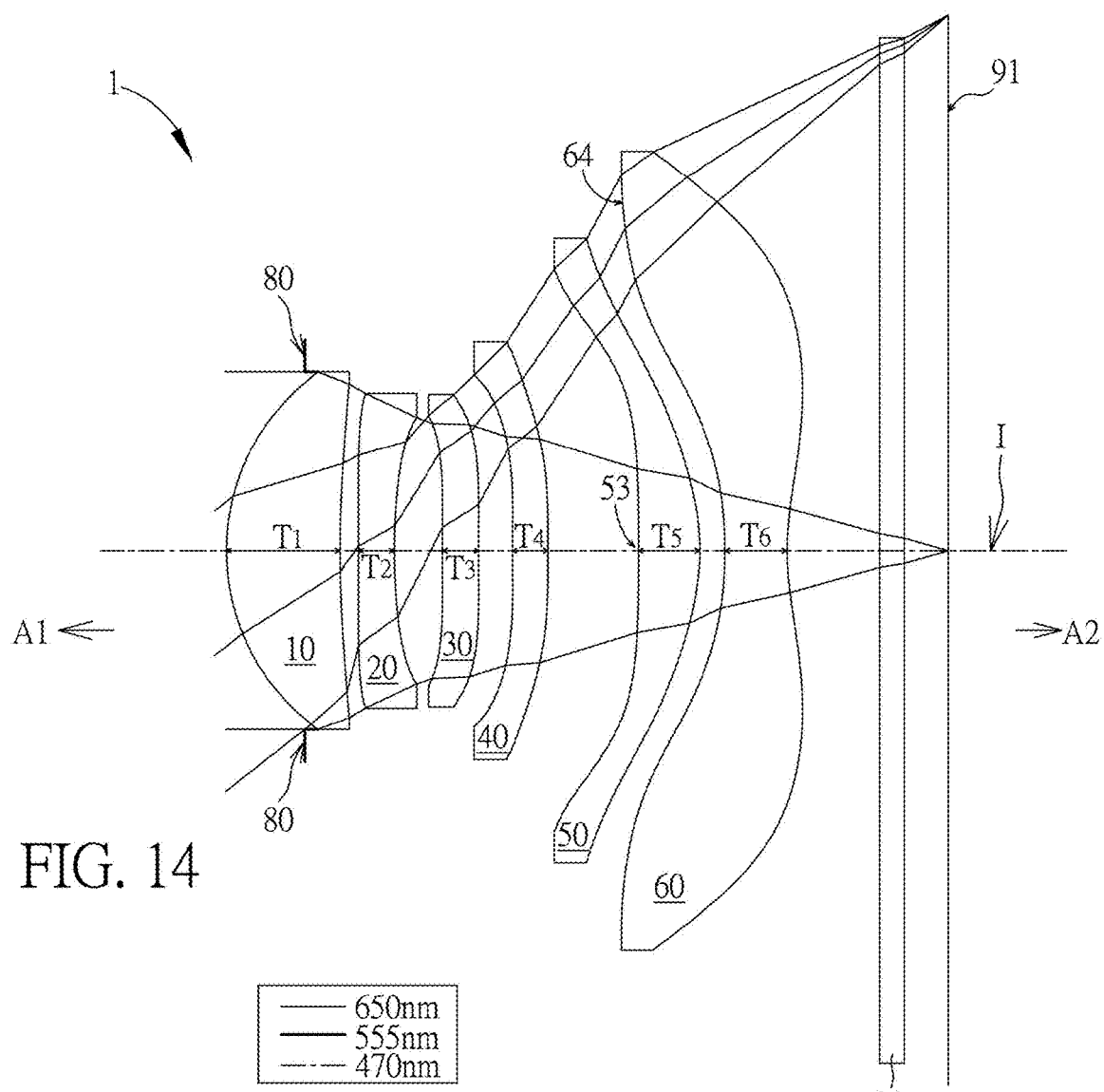
FIG. 14 illustrates a fifth embodiment of the optical imaging lens of the present invention.
Figures 15A, 15B, 15C, 15D:
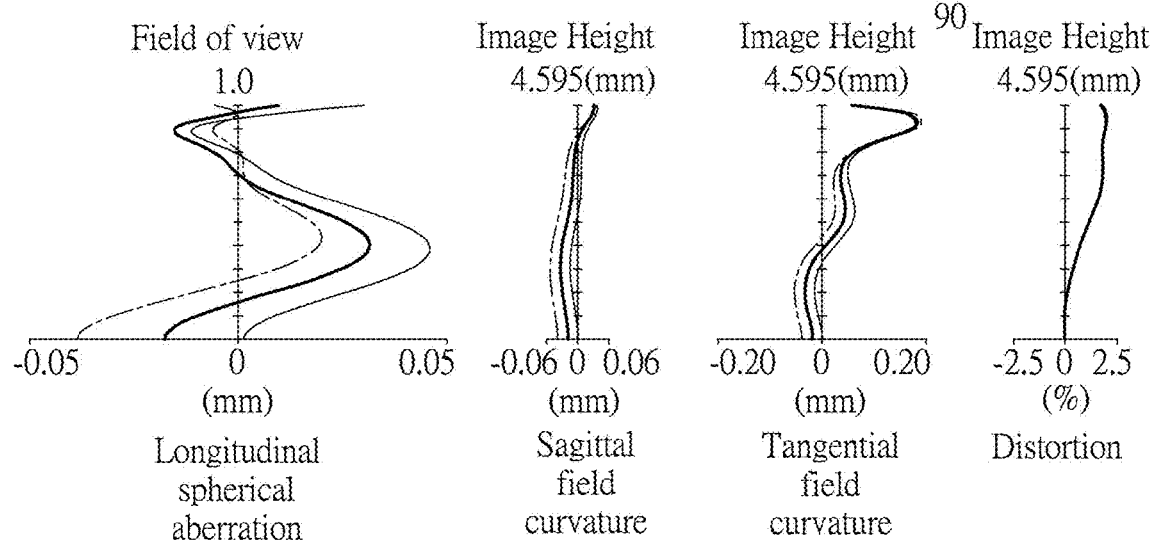
FIG. 15A illustrates the longitudinal spherical aberration on the image plane of the fifth embodiment.
FIG. 15B illustrates the field curvature aberration on the sagittal direction of the fifth embodiment.
FIG. 15C illustrates the field curvature aberration on the tangential direction of the fifth embodiment.
FIG. 15D illustrates the distortion aberration of the fifth embodiment.

Please refer to FIG. 14 which illustrates the fifth embodiment of the optical imaging lens 1 of the present invention. Please refer to FIG. 15A for the longitudinal spherical aberration on the image plane 91 of the fifth embodiment; please refer to FIG. 15B for the field curvature aberration on the sagittal direction; please refer to FIG. 15C for the field curvature aberration on the tangential direction, and please refer to FIG. 15D for the distortion aberration. The components in this embodiment are similar to those in the first embodiment, but the optical data such as the refracting power, the radius, the lens thickness, the aspheric surface or the back focal length in this embodiment are different from the optical data in the first embodiment. Besides, in this embodiment, an optical axis region 53 of the object-side surface 51 of the fifth lens element 50 is concave, and a periphery region 64 of the object-side surface 61 of the sixth lens element 60 is concave.

The optical data of the fifth embodiment of the optical imaging lens are shown in FIG. 40 while the aspheric surface data are shown in FIG. 41. In this embodiment, EFL=5.691 mm; HFOV=38.297 degrees; TTL=6.198 mm; Fno=1.850; ImgH=4.595 mm.

Sixth Embodiment

Figure 16:
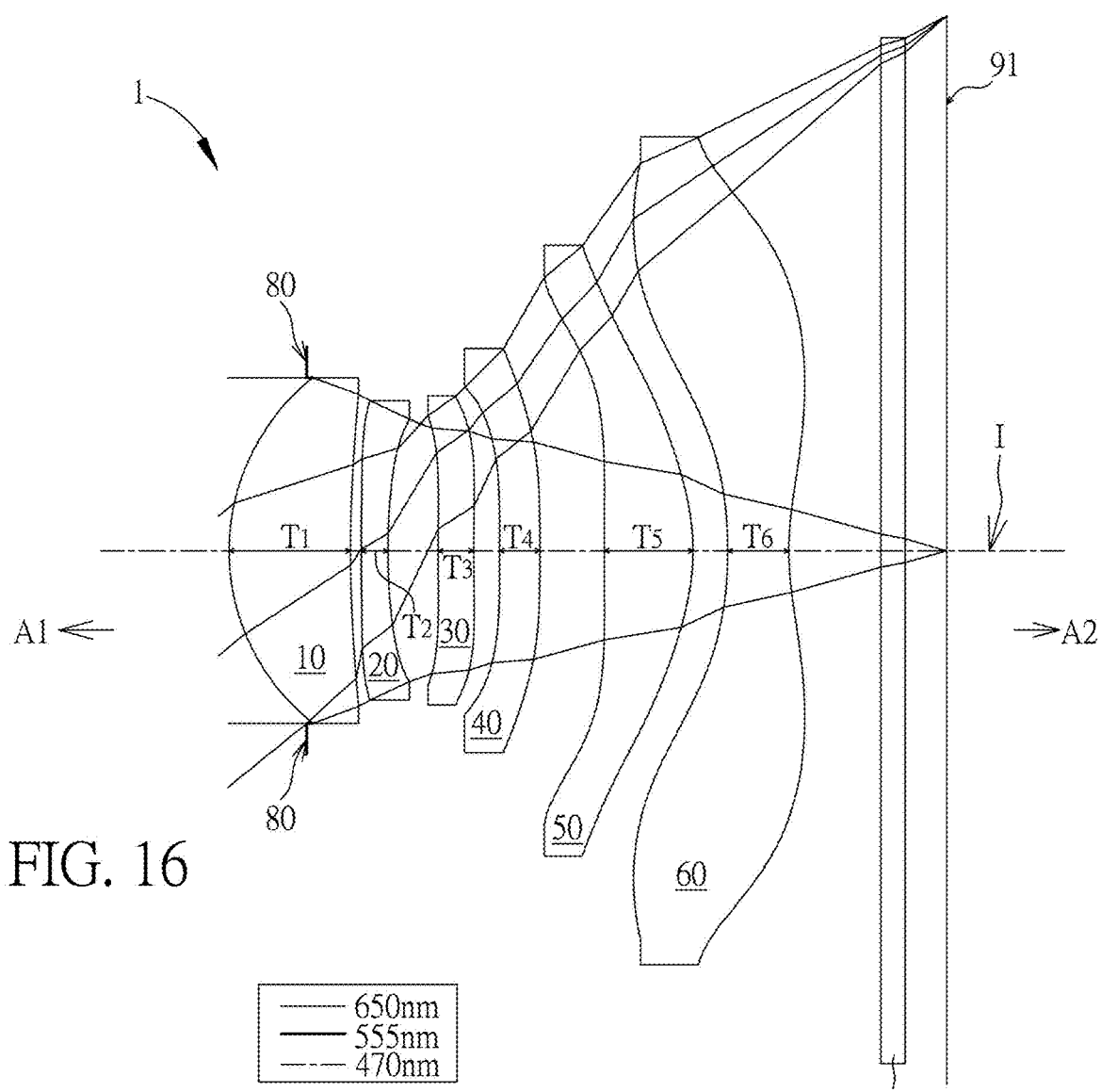
FIG. 16 illustrates a sixth embodiment of the optical imaging lens of the present invention.
Figures 17A, 17B, 17C, 17D:
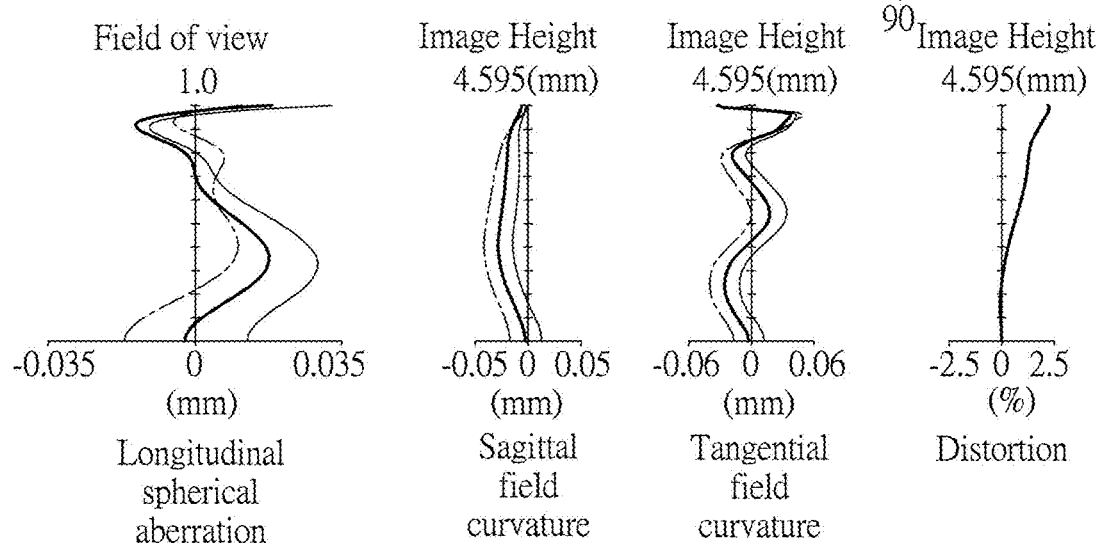
FIG. 17A illustrates the longitudinal spherical aberration on the image plane of the sixth embodiment.
FIG. 17B illustrates the field curvature aberration on the sagittal direction of the sixth embodiment.
FIG. 17C illustrates the field curvature aberration on the tangential direction of the sixth embodiment.
FIG. 17D illustrates the distortion aberration of the sixth embodiment.

Please refer to FIG. 16 which illustrates the sixth embodiment of the optical imaging lens 1 of the present invention. Please refer to FIG. 17A for the longitudinal spherical aberration on the image plane 91 of the sixth embodiment; please refer to FIG. 17B for the field curvature aberration on the sagittal direction; please refer to FIG. 17C for the field curvature aberration on the tangential direction, and please refer to FIG. 17D for the distortion aberration. The components in this embodiment are similar to those in the first embodiment, but the optical data such as the refracting power, the radius, the lens thickness, the aspheric surface or the back focal length in this embodiment are different from the optical data in the first embodiment.

The optical data of the sixth embodiment of the optical imaging lens are shown in FIG. 42 while the aspheric surface data are shown in FIG. 43. In this embodiment, EFL=5.513 mm; HFOV=39.156 degrees; TTL=6.188 mm; Fno=1.850; ImgH=4.595 mm. In particular, 1) the HFOV of the optical imaging lens in this embodiment is larger than that of the optical imaging lens in the first embodiment, 2) the field curvature aberration on the tangential direction of the optical imaging lens in this embodiment is better than that of the optical imaging lens in the first embodiment.

Seventh Embodiment

Please refer to FIG. 18 which illustrates the seventh embodiment of the optical imaging lens 1 of the present invention. Please refer to FIG. 19A for the longitudinal spherical aberration on the image plane 91 of the seventh embodiment; please refer to FIG. 19B for the field curvature aberration on the sagittal direction; please refer to FIG. 19C for the field curvature aberration on the tangential direction, and please refer to FIG. 19D for the distortion aberration. The components in this embodiment are similar to those in the first embodiment, but the optical data such as the refracting power, the radius, the lens thickness, the aspheric surface or the back focal length in this embodiment are different from the optical data in the first embodiment. Besides, in this embodiment, an optical axis region 33 of the object-side surface 31 of the third lens element 30 is concave and an optical axis region 53 of the object-side surface 51 of the fifth lens element 50 is concave.

The optical data of the seventh embodiment of the optical imaging lens are shown in FIG. 44 while the aspheric surface data are shown in FIG. 45. In this embodiment, EFL=5.617 mm; HFOV=38.588 degrees; TTL=6.162 mm; Fno=1.850; ImgH=4.595 mm. In particular, 1) TTL of the optical imaging lens in this embodiment is shorter than that of the optical imaging lens in the first embodiment, 2) the distortion aberration of the optical imaging lens in this embodiment is better than that of the optical imaging lens in the first embodiment.

Eighth Embodiment

Figure 20:
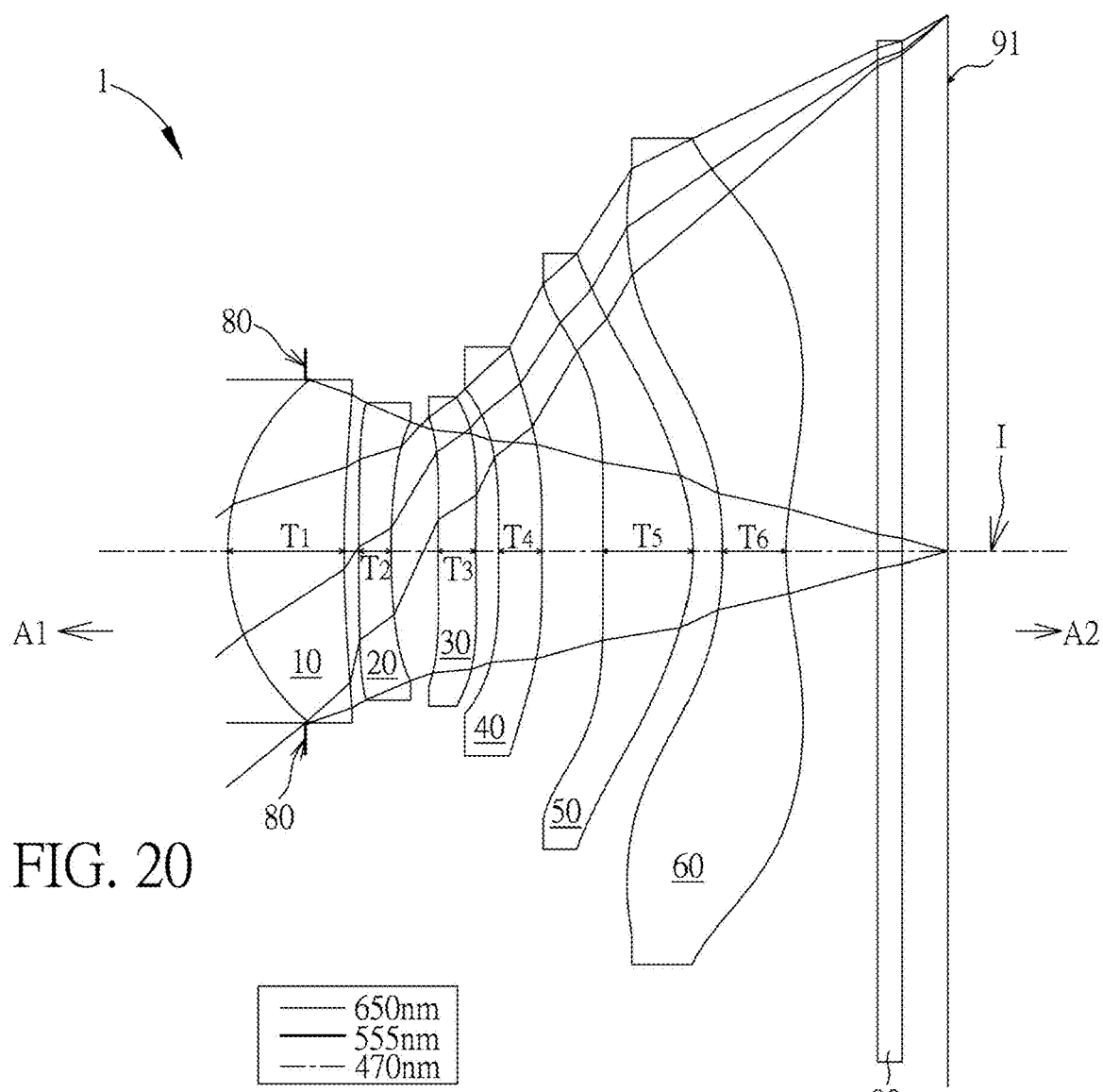
FIG. 20 illustrates an eighth embodiment of the optical imaging lens of the present invention.
Figures 21A, 21B, 21C, 21D:
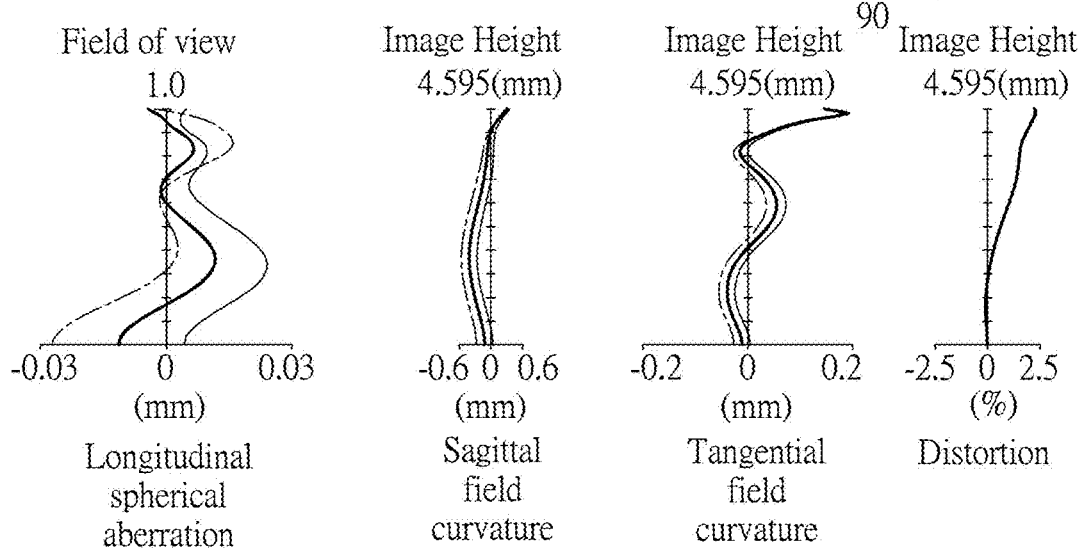
FIG. 21A illustrates the longitudinal spherical aberration on the image plane of the eighth embodiment.
FIG. 21B illustrates the field curvature aberration on the sagittal direction of the eighth embodiment.
FIG. 21C illustrates the field curvature aberration on the tangential direction of the eighth embodiment.
FIG. 21D illustrates the distortion aberration of the eighth embodiment.

Please refer to FIG. 20 which illustrates the eighth embodiment of the optical imaging lens 1 of the present invention. Please refer to FIG. 21A for the longitudinal spherical aberration on the image plane 91 of the eighth embodiment; please refer to FIG. 21B for the field curvature aberration on the sagittal direction; please refer to FIG. 21C for the field curvature aberration on the tangential direction, and please refer to FIG. 21D for the distortion aberration. The components in this embodiment are similar to those in the first embodiment, but the optical data such as the refracting power, the radius, the lens thickness, the aspheric surface or the back focal length in this embodiment are different from the optical data in the first embodiment.

The optical data of the eighth embodiment of the optical imaging lens are shown in FIG. 46 while the aspheric surface data are shown in FIG. 47. In this embodiment, EFL=5.497 mm; HFOV=39.187 degrees; TTL=6.229 mm; Fno=1.850; ImgH=4.595 mm. In particular, the HFOV of the optical imaging lens in this embodiment is larger than that of the optical imaging lens in the first embodiment.

Ninth Embodiment

Please refer to FIG. 22 which illustrates the ninth embodiment of the optical imaging lens 1 of the present invention.

Please refer to FIG. 23A for the longitudinal spherical aberration on the image plane 91 of the ninth embodiment; please refer to FIG. 23B for the field curvature aberration on the sagittal direction; please refer to FIG. 23C for the field curvature aberration on the tangential direction, and please refer to FIG. 23D for the distortion aberration. The components in this embodiment are similar to those in the first embodiment, but the optical data such as the refracting power, the radius, the lens thickness, the aspheric surface or the back focal length in this embodiment are different from the optical data in the first embodiment.

The optical data of the ninth embodiment of the optical imaging lens are shown in FIG. 48 while the aspheric surface data are shown in FIG. 49. In this embodiment, EFL=5.652 mm; HFOV=38.611 degrees; TTL=6.214 mm; Fno=1.850; ImgH=4.595 mm. In particular, the distortion aberration of the optical imaging lens in this embodiment is better than that of the optical imaging lens in the first embodiment.

Tenth Embodiment

Figure 24:
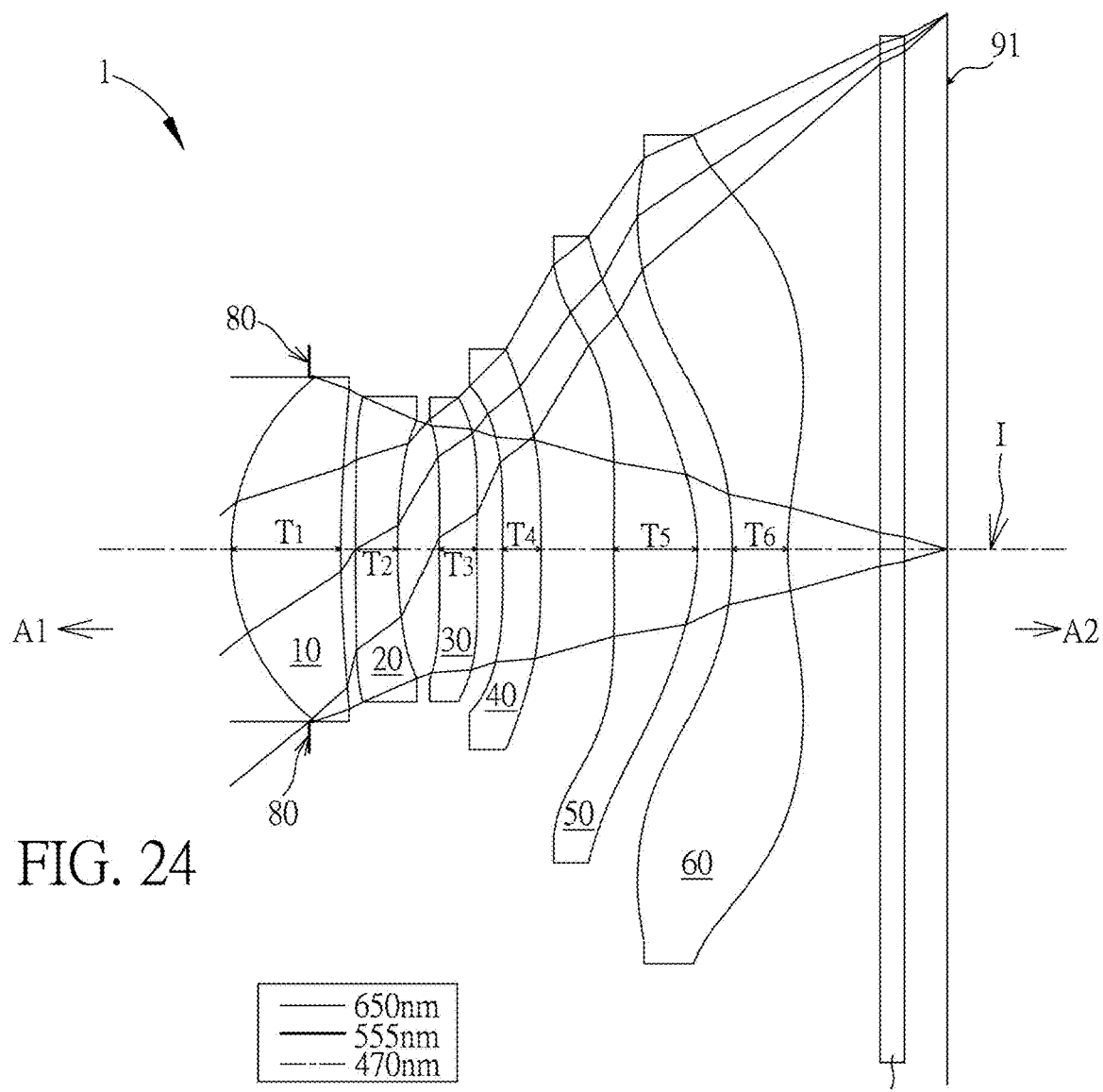
FIG. 24 illustrates a tenth embodiment of the optical imaging lens of the present invention.
Figures 25A, 25B, 25C, 25D:
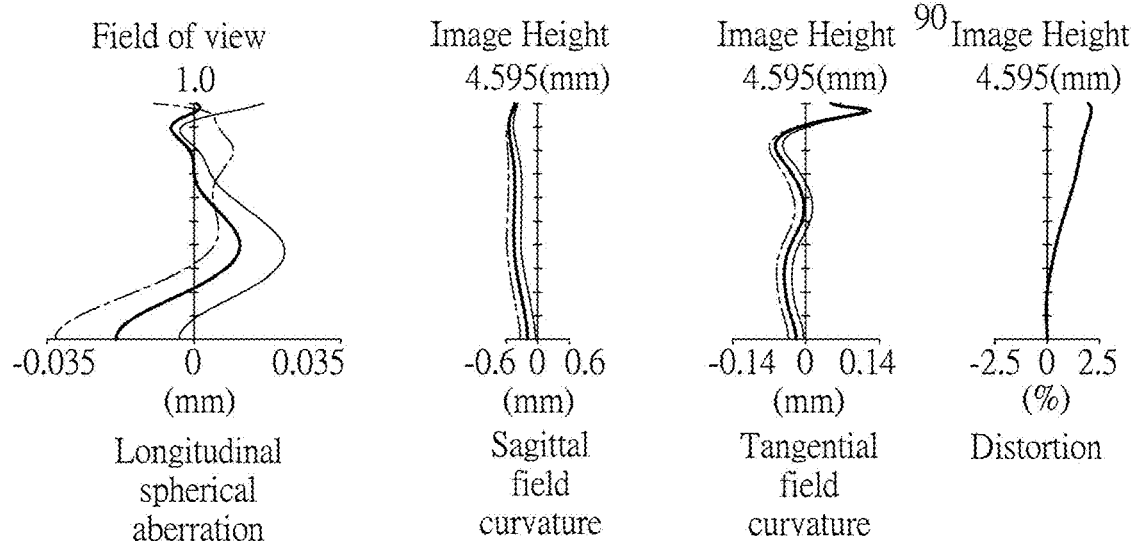
FIG. 25A illustrates the longitudinal spherical aberration on the image plane of the tenth embodiment.
FIG. 25B illustrates the field curvature aberration on the sagittal direction of the tenth embodiment.
FIG. 25C illustrates the field curvature aberration on the tangential direction of the tenth embodiment.
FIG. 25D illustrates the distortion aberration of the tenth embodiment.

Please refer to FIG. 24 which illustrates the tenth embodiment of the optical imaging lens 1 of the present invention. Please refer to FIG. 25A for the longitudinal spherical aberration on the image plane 91 of the tenth embodiment; please refer to FIG. 25B for the field curvature aberration on the sagittal direction; please refer to FIG. 25C for the field curvature aberration on the tangential direction, and please refer to FIG. 25D for the distortion aberration. The components in this embodiment are similar to those in the first embodiment, but the optical data such as the refracting power, the radius, the lens thickness, the aspheric surface or the back focal length in this embodiment are different from the optical data in the first embodiment.

The optical data of the tenth embodiment of the optical imaging lens are shown in FIG. 50 while the aspheric surface data are shown in FIG. 51. In this embodiment, EFL=5.491 mm; HFOV=39.193 degrees; TTL=6.163 mm; Fno=1.850; ImgH=4.595 mm. In particular, 1) the HFOV of the optical imaging lens in this embodiment is larger than that of the optical imaging lens in the first embodiment, and 2) TTL of the optical imaging lens in this embodiment is shorter than that of the optical imaging lens in the first embodiment.

Eleventh Embodiment

Figure 26:
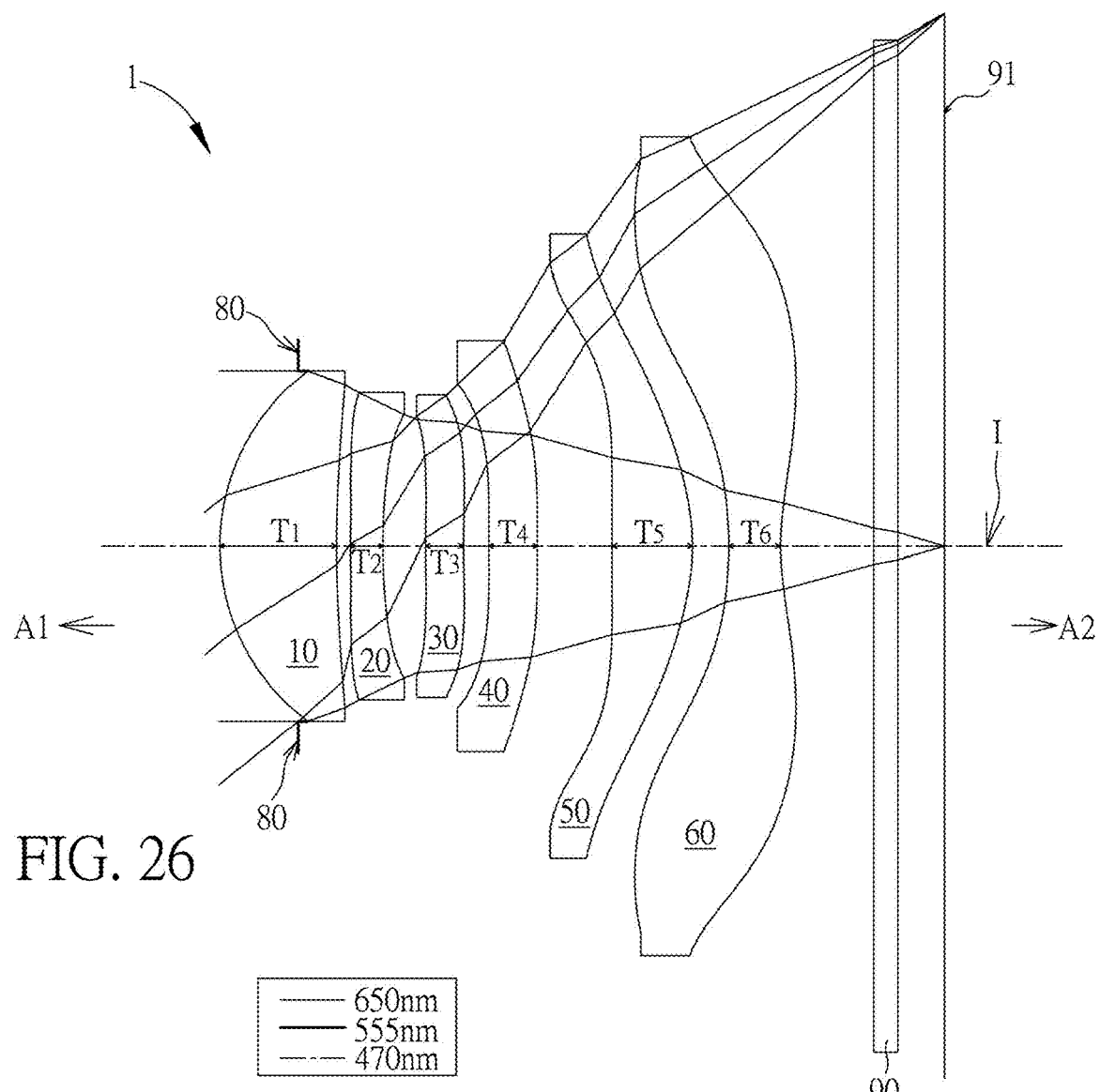
FIG. 26 illustrates an eleventh embodiment of the optical imaging lens of the present invention.
Figures 27A, 27B, 27C, 27D:
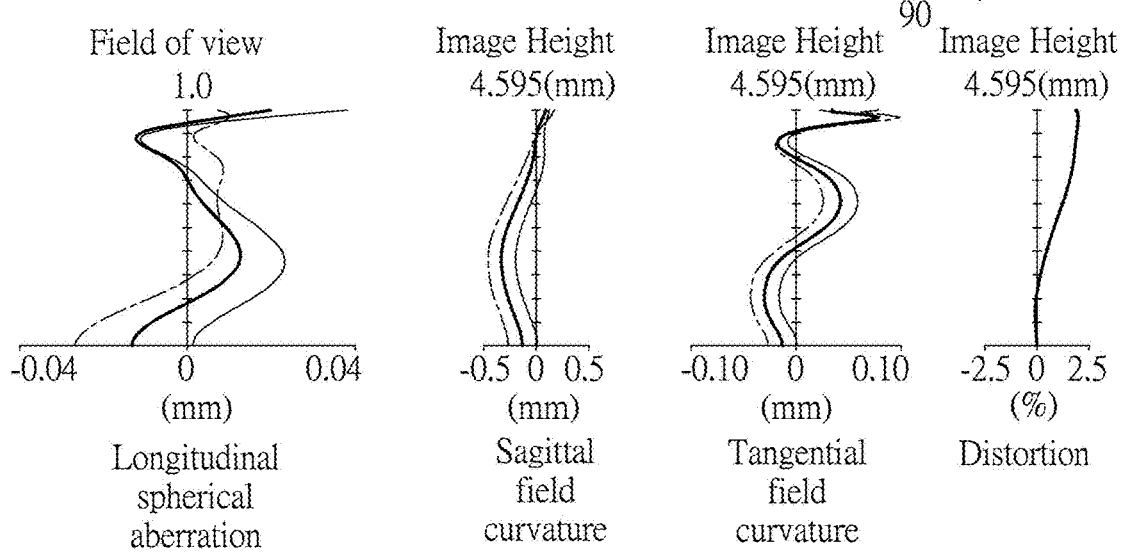
FIG. 27A illustrates the longitudinal spherical aberration on the image plane of the eleventh embodiment.
FIG. 27B illustrates the field curvature aberration on the sagittal direction of the eleventh embodiment.
FIG. 27C illustrates the field curvature aberration on the tangential direction of the eleventh embodiment.
FIG. 27D illustrates the distortion aberration of the eleventh embodiment.

Please refer to FIG. 26 which illustrates the eleventh embodiment of the optical imaging lens 1 of the present invention. Please refer to FIG. 27A for the longitudinal spherical aberration on the image plane 91 of the eleventh embodiment; please refer to FIG. 27B for the field curvature aberration on the sagittal direction; please refer to FIG. 27C for the field curvature aberration on the tangential direction, and please refer to FIG. 27D for the distortion aberration. The components in this embodiment are similar to those in the first embodiment, but the optical data such as the refracting power, the radius, the lens thickness, the aspheric surface or the back focal length in this embodiment are different from the optical data in the first embodiment.

The optical data of the eleventh embodiment of the optical imaging lens are shown in FIG. 52 while the aspheric surface data are shown in FIG. 53. In this embodiment, EFL=5.587 mm; HFOV=38.801 degrees; TTL=6.232 mm; Fno=1.850; ImgH=4.595 mm.

Twelfth Embodiment

Please refer to FIG. 28 which illustrates the twelfth embodiment of the optical imaging lens 1 of the present invention. Please refer to FIG. 29A for the longitudinal spherical aberration on the image plane 91 of the twelfth embodiment; please refer to FIG. 29B for the field curvature aberration on the sagittal direction; please refer to FIG. 29C for the field curvature aberration on the tangential direction, and please refer to FIG. 29D for the distortion aberration. The components in this embodiment are similar to those in the first embodiment, but the optical data such as the refracting power, the radius, the lens thickness, the aspheric surface or the back focal length in this embodiment are different from the optical data in the first embodiment. Besides, in this embodiment, the fourth lens element 40 has negative refracting power and the optical axis region 43 of the object-side surface 41 of the fourth lens element 40 is concave.

The optical data of the twelfth embodiment of the optical imaging lens are shown in FIG. 54 while the aspheric surface data are shown in FIG. 55. In this embodiment, EFL=5.551 mm; HFOV=39.006 degrees; TTL=6.208 mm; Fno=1.850; ImgH=4.595 mm.

Thirteenth Embodiment

Figure 30:
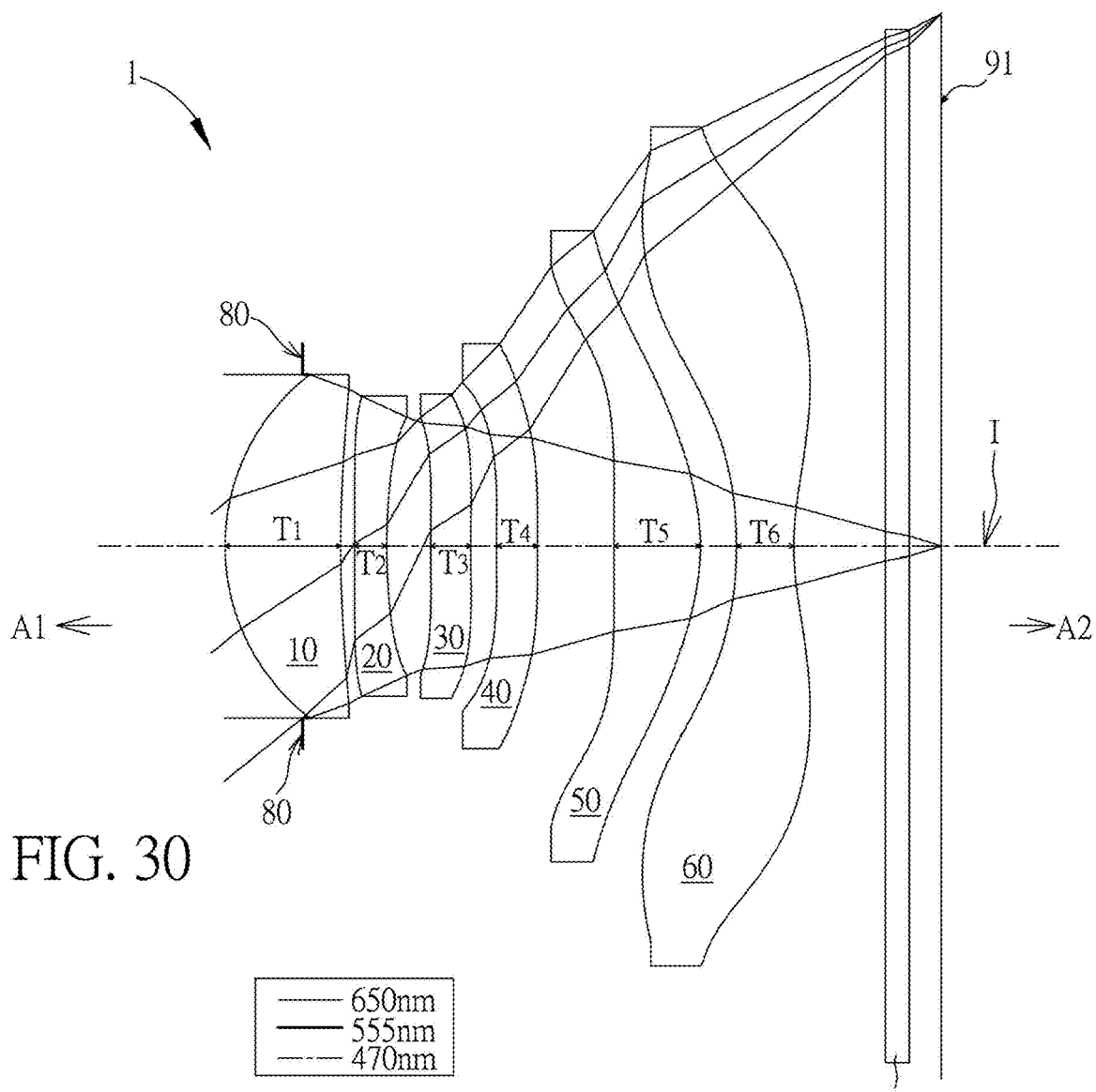
FIG. 30 illustrates a thirteenth embodiment of the optical imaging lens of the present invention.
Figures 31A, 31B, 31C, 31D:
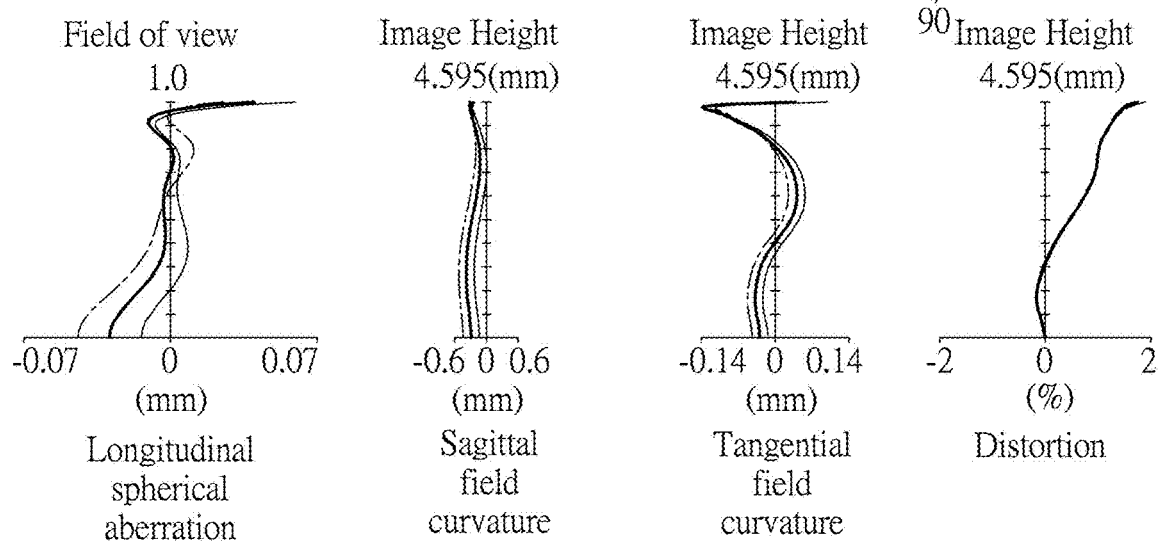
FIG. 31A illustrates the longitudinal spherical aberration on the image plane of the thirteenth embodiment.
FIG. 31B illustrates the field curvature aberration on the sagittal direction of the thirteenth embodiment.
FIG. 31C illustrates the field curvature aberration on the tangential direction of the thirteenth embodiment.
FIG. 31D illustrates the distortion aberration of the thirteenth embodiment.

Please refer to FIG. 30 which illustrates the thirteenth embodiment of the optical imaging lens 1 of the present invention. Please refer to FIG. 31A for the longitudinal spherical aberration on the image plane 91 of the thirteenth embodiment; please refer to FIG. 31B for the field curvature aberration on the sagittal direction; please refer to FIG. 31C for the field curvature aberration on the tangential direction, and please refer to FIG. 31D for the distortion aberration. The components in this embodiment are similar to those in the first embodiment, but the optical data such as the refracting power, the radius, the lens thickness, the aspheric surface or the back focal length in this embodiment are different from the optical data in the first embodiment.

The optical data of the thirteenth embodiment of the optical imaging lens are shown in FIG. 56 while the aspheric surface data are shown in FIG. 57. In this embodiment, EFL=5.516 mm; HFOV=39.029 degrees; TTL=6.207 mm; Fno=1.850; ImgH=4.595 mm. In particular, the distortion aberration of the optical imaging lens in this embodiment is better than that of the optical imaging lens in the first embodiment.

Some important parameters and ratios in each embodiment are shown in FIG. 58 and in FIG. 59.

The applicants found that by the following designs, the lens configuration of the present invention has the following features and corresponding advantages:

1. The third lens element 30 has negative refracting power, a periphery region 37 of the image-side surface 32 of the third lens element 30 is convex, an optical axis region 46 of the image-side surface 42 of the fourth lens element 40 is convex, an optical axis region 56 of the image-side surface 52 of the fifth lens element 50 is convex and an optical axis region 63 of the object-side surface 61 of the sixth lens element 60 is concave. The combination helps correct the spherical aberration and the field curvature aberration as well as to reduce the distortion aberration of the optical system. In addition, when the materials of the lens elements satisfy the relationship: v2+v3+v4+v6≤130.000, it helps the optical imaging lens 1 have the efficacy which corrects the chromatic aberration more effectively. The preferable range is $110.000 \leq v2+v3+v4+v6 \leq 130.000$.

2. In addition to the design of the surface curvatures, refracting power and the materials in each embodiment of the present invention, it may more effectively obtain a greater image height of the optical imaging lens in addition to the effective reduction of the length of the optical imaging lens when the numerical condition $(T1+T4+G45)/(G12+T2+G34) \geq 2.500$ is satisfied. In such a way, the pixel size of the entire optical imaging lens may be suitably increased to facilitate the image sensor to receive more incident light for use in dark environment. The preferable range is $2.500 \leq (T1+T4+G45)/(G12+T2+G34) \leq 3.600$.

3. The air gaps between the adjacent lens elements should be decreased or the thickness of each lens element should be appropriately reduced to decrease the TTL and to keep the imaging quality, to facilitate the assembly and to increase the fabrication yield. However, the assembly or the manufacturing difficulty or the imaging quality should be taken into consideration as well to balance the air gaps and the thickness. If the following numerical conditions are selectively satisfied, the optical imaging lens of the present invention may have better optical arrangements:

1) $(G45+T5)/G34 \geq 4.400$, and the preferable range is $4.400 \leq (G45+T5)/G34 \leq 7.000$;
2) $ALT/(G12+T2+G23) \geq 3.000$, and the preferable range is $3.000 \leq ALT/(G12+T2+G23) \leq 4.300$;
3) $AAG/(T5+G56) \leq 2.500$, and the preferable range is $1.300 \leq AAG/(T5+G56) \leq 2.500$;
4) $(T6+BFL)/(T2+G34) \geq 2.700$, and the preferable range is $2.700 \leq (T6+BFL)/(T2+G34) \leq 4.200$;
5) $(T2+G23+T3)/G45 \leq 2.300$, and the preferable range is $1.100 \leq (T2+G23+T3)/G45 \leq 2.300$;
6) $TL/BFL \leq 4.000$, and the preferable range is $3.000 \leq TL/BFL \leq 4.000$;
7) $(G45+ALT)/(T3+G34) \geq 6.000$, and the preferable range is $6.000 \leq (G45+ALT)/(T3+G34) \leq 8.000$;
8) $(T1+G23+T6)/(G12+G45) \leq 3.100$, and the preferable range is $2.000 \leq (T1+G23+T6)/(G12+G45) \leq 3.100$;
9) $TTL/(G45+BFL) \leq 3.400$, and the preferable range is $2.700 \leq TTL/(G45+BFL) \leq 3.400$;
10) $(T1+T2+T3)/T4 \leq 5.900$, and the preferable range is $3.800 \leq (T1+T2+T3)/T4 \leq 5.900$;
11) $(G45+T5+G56)/(G12+T2) \leq 5.000$, and the preferable range is $3.200 \leq (G45+T5+G56)/(G12+T2) \leq 5.000$;
12) $EFL/(G34+G45+G56) \leq 5.700$, and the preferable range is $4.300 \leq EFL/(G34+G45+G56) \leq 5.700$;
13) $(T4+G45)/T6 \leq 3.300$, and the preferable range is $1.500 \leq (T4+G45)/T6 \leq 3.300$;
14) $AAG/(G23+T5) \leq 2.100$, and the preferable range is $1.100 \leq AAG/(G23+T5) \leq 2.100$;
15) $(T3+T4+T5)/T6 \leq 3.900$, and the preferable range is $2.000 \leq (T3+T4+T5)/T6 \leq 3.900$;
16) $(T1+G12)/G56 \geq 2.800$, and the preferable range is $2.800 \leq (T1+G12)/G56 \leq 5.200$;
17) $T1/T2 \geq 2.600$, and the preferable range is $2.600 \leq T1/T2 \leq 4.600$;
18) $(G45+T6)/T4 \geq 2.500$, and the preferable range is $2.500 \leq (G45+T6)/T4 \leq 4.400$.

4. The optical imaging lens of the present invention may have longer effective focal length and telescopic function if the following numerical condition is satisfied:

$EFL/(G12+T4+G56) \geq 5.100$, and the preferable range is $5.100 \leq EFL/(G12+T4+G56) \leq 8.400$.

Any arbitrary combination of the parameters of the embodiments can be selected to increase the lens limitation so as to facilitate the design of the same structure of the present invention.

In the light of the unpredictability of the optical imaging lens, the above conditional formulas preferably suggest the above principles to have a shorter total length of the optical imaging lens, better captured images in dark environment, better imaging quality or a better fabrication yield to overcome the drawbacks of prior art. The lens elements of the present invention are made of a transparent plastic material to decrease the weight of the optical imaging lens and to decrease the cost.

The numeral value ranges within the maximum and minimum values obtained from the combination ratio relationships of the optical parameters disclosed in each embodiment of the invention can all be implemented accordingly.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical imaging lens, from an object side to an image side in order along an optical axis comprising: a first lens element, a second lens element, a third lens element, a fourth lens element, a fifth lens element, and a sixth lens element, the first lens element to the sixth lens element each having an object-side surface facing toward the object side and allowing imaging rays to pass through as well as an image-side surface facing toward the image side and allowing the imaging rays to pass through, wherein:

the third lens element has negative refracting power and a periphery region of the image-side surface of the third lens element is convex;

an optical axis region of the image-side surface of the fourth lens element is convex;

an optical axis region of the image-side surface of the fifth lens element is convex; and an optical axis region of the object-side surface of the sixth lens element is concave;

wherein only the above-mentioned six lens elements of the optical imaging lens have refracting power;

wherein, T1 is a thickness of the first lens element along the optical axis, T2 is a thickness of the second lens element along the optical axis, T4 is a thickness of the fourth lens element along the optical axis, G12 is an air gap between the first lens element and the second lens element along the optical axis, G34 is an air gap between the third lens element and the fourth lens element along the optical axis, G45 is an air gap between the fourth lens element and the fifth lens element along the optical axis, Abbe number of the second lens element is v2, an Abbe number of the third lens element is v3, an Abbe number of the fourth lens element is v4 and an Abbe number of the sixth lens element is v6, and the optical imaging lens satisfies the relationship: $v2+v3+v4+v6 \leq 130.000$ and $(T1+T4+G45)/(G12+T2+G34) \geq 2.500$.

2. The optical imaging lens of claim 1, wherein T5 is a thickness of the fifth lens element along the optical axis, and the optical imaging lens satisfies the relationship: $(G45+T5)/G34 \geq 4.400$.

3. The optical imaging lens of claim 1, wherein ALT is a sum of thicknesses of all the six lens elements along the optical axis and G23 is an air gap between the second lens element and the third lens element along the optical axis, and the optical imaging lens satisfies the relationship: ALT/(G12+T2+G23)≥3.000.

4. The optical imaging lens of claim 1, wherein AAG is a sum of five air gaps from the first lens element to the sixth lens element along the optical axis, T5 is a thickness of the fifth lens element along the optical axis and G56 is an air gap between the fifth lens element and the sixth lens element along the optical axis, and the optical imaging lens satisfies the relationship: AAG/(T5+G56)≤2.500.

5. The optical imaging lens of claim 1, wherein BFL is a distance from the image-side surface of the sixth lens element to the image plane along the optical axis and T6 is a thickness of the sixth lens element along the optical axis, and the optical imaging lens satisfies the relationship: (T6+BFL)/(T2+G34)≥2.700.

6. The optical imaging lens of claim 1, wherein T3 is a thickness of the third lens element along the optical axis and G23 is an air gap between the second lens element and the third lens element along the optical axis, and the optical imaging lens satisfies the relationship: (T2+G23+T3)/G45≤2.300.

7. The optical imaging lens of claim 1, wherein TL is a distance from the object-side surface of the first lens element to the image-side surface of the sixth lens element along the optical axis and BFL is a distance from the image-side surface of the sixth lens element to the image plane along the optical axis, and the optical imaging lens satisfies the relationship: TL/BFL≤4.000.

8. The optical imaging lens of claim 1, wherein EFL is an effective focal length of the optical imaging lens and G56 is an air gap between the fifth lens element and the sixth lens element along the optical axis, and the optical imaging lens satisfies the relationship: EFL/(G12+T4+G56)≥5.100.

9. The optical imaging lens of claim 1, wherein ALT is a sum of thicknesses of all the six lens elements along the optical axis and T3 is a thickness of the third lens element along the optical axis, and the optical imaging lens satisfies the relationship: (G45+ALT)/(T3+G34)≥6.000.

10. The optical imaging lens of claim 1, wherein T6 is a thickness of the sixth lens element along the optical axis and G23 is an air gap between the second lens element and the third lens element along the optical axis, and the optical imaging lens satisfies the relationship: (T1+G23+T6)/(G12+G45)≤3.100.

11. The optical imaging lens of claim 1, wherein TTL is a distance from the object-side surface of the first lens element to an image plane along the optical axis and BFL is a distance from the image-side surface of the sixth lens element to the image plane along the optical axis, and the optical imaging lens satisfies the relationship: TTL/(G45+BFL)≤3.400.

12. The optical imaging lens of claim 1, wherein T3 is a thickness of the third lens element along the optical axis, and the optical imaging lens satisfies the relationship: (T1+T2+T3)/T4≤5.900.

13. The optical imaging lens of claim 1, wherein T5 is a thickness of the fifth lens element along the optical axis and G56 is an air gap between the fifth lens element and the sixth lens element along the optical axis, and the optical imaging lens satisfies the relationship: (G45+T5+G56)/(G12+T2)≤5.000.

14. The optical imaging lens of claim 1, wherein EFL is an effective focal length of the optical imaging lens and G56 is an air gap between the fifth lens element and the sixth lens element along the optical axis, and the optical imaging lens satisfies the relationship: EFL/(G34+G45+G56)≤5.700.

15. The optical imaging lens of claim 1, wherein T6 is a thickness of the sixth lens element along the optical axis, and the optical imaging lens satisfies the relationship: (T4+G45)/T6≤3.300.

16. The optical imaging lens of claim 1, wherein AAG is a sum of five air gaps from the first lens element to the sixth lens element along the optical axis, T5 is a thickness of the fifth lens element along the optical axis and G23 is an air gap between the second lens element and the third lens element along the optical axis, and the optical imaging lens satisfies the relationship: AAG/(G23+T5)≤2.100.

17. The optical imaging lens of claim 1, wherein T3 is a thickness of the third lens element along the optical axis, T5 is a thickness of the fifth lens element along the optical axis and T6 is a thickness of the sixth lens element along the optical axis, and the optical imaging lens satisfies the relationship: (T3+T4+T5)/T6≤3.900.

18. The optical imaging lens of claim 1, wherein G56 is an air gap between the fifth lens element and the sixth lens element along the optical axis, and the optical imaging lens satisfies the relationship: (T1+G12)/G56≥2.800.

19. The optical imaging lens of claim 1, satisfying the relationship: T1/T2≥2.600.

20. The optical imaging lens of claim 1, wherein T6 is a thickness of the sixth lens element along the optical axis, and the optical imaging lens satisfies the relationship: (G45+T6)/T4≥2.500.

* * * * *